US011726502B2

(12) United States Patent
Johnson et al.

(10) Patent No.: US 11,726,502 B2
(45) Date of Patent: Aug. 15, 2023

(54) CONTROL SYSTEMS FOR UNMANNED AERIAL VEHICLES

(71) Applicant: Teledyne FLIR Detection, Inc., Stillwater, OK (US)

(72) Inventors: Samuel A. Johnson, Arvada, CO (US); Samir S. Mistry, Billerica, MA (US); Erika Tsutsumi, Boston, MA (US); Chad Thomson, Louisville, CO (US); John Aleman, Somerville, MA (US); Bretton E. Anderson, Westford, MA (US); Felipe Bohorquez, Cambridge, MA (US); Terrance Bordelon, Danvers, MA (US); Ben Corman, Danvers, MA (US); Dion Gonano, Danvers, MA (US); Laura Major, Danvers, MA (US); Ben Minerd, Danvers, MA (US); Megan Mitchell, Danvers, MA (US)

(73) Assignee: Teledyne FLIR Detection, Inc., Stillwater, OK (US)

(*) Notice: Subject to any disclaimer, the term of this patent is extended or adjusted under 35 U.S.C. 154(b) by 0 days.

(21) Appl. No.: 17/713,196

(22) Filed: Apr. 4, 2022

(65) Prior Publication Data
US 2022/0334599 A1 Oct. 20, 2022

Related U.S. Application Data

(63) Continuation of application No. 16/548,043, filed on Aug. 22, 2019, now Pat. No. 11,294,397, which is a (Continued)

(51) Int. Cl.
*G05D 1/10* (2006.01)
*B64C 39/02* (2023.01)
(Continued)

(52) U.S. Cl.
CPC ........... *G05D 1/106* (2019.05); *B64C 39/024* (2013.01); *G01S 15/93* (2013.01); *G01S 17/933* (2013.01);
(Continued)

(58) Field of Classification Search
CPC .... G05D 1/106; G05D 1/0022; G05D 1/0038; G05D 1/0016; G05D 1/0866;
(Continued)

(56) References Cited

U.S. PATENT DOCUMENTS 9,488,979 B1\* 11/2016 Chambers ............. B64C 39/024
9,563,201 B1\* 2/2017 Tofte ..................... G05D 1/0038
(Continued)

FOREIGN PATENT DOCUMENTS

WO WO 2015/175379 11/2015
WO WO 2016/115155 7/2016

OTHER PUBLICATIONS

U.S. Appl. No. 62/368,811, filed Jul. 29, 2016.\*
11. U.S. Appl. No. 62/368,811, filed Jul. 29, 2016.

*Primary Examiner* — Muhammad Shafi
(74) *Attorney, Agent, or Firm* — Haynes and Boone, LLP

(57) ABSTRACT

A method for controlling an unmanned aerial vehicle within a flight operating space. The unmanned aerial vehicle includes one or more sensor arrays on each spar. The method includes determining, using a plurality of sensor arrays, a flight path for the unmanned aerial vehicle. The method also includes receiving, by at least one sensor array of the plurality of sensor arrays, sensor data identifying at least one object in the operating space. The sensor data is transmitted over a communications bus connecting components of the UAV. The method further includes determining, by one or more processors onboard the unmanned aerial vehicle, a flight path around the at least one object. The method also
(Continued)

includes generating, by the one or more onboard processors, a first signal to cause the unmanned aerial vehicle to navigate within the operating space around the at least one object.

20 Claims, 76 Drawing Sheets

Related U.S. Application Data continuation-in-part of application No. PCT/US2018/053226, filed on Sep. 27, 2018, said application No. 16/548,043 is a continuation-in-part of application No. PCT/US2018/019570, filed on Feb. 23, 2018, said application No. PCT/US2018/053226 is a continuation-in-part of application No. PCT/US2017/061195, filed on Nov. 10, 2017.

(60) Provisional application No. 62/725,228, filed on Aug. 30, 2018, provisional application No. 62/672,366, filed on May 16, 2018, provisional application No. 62/564,175, filed on Sep. 27, 2017, provisional application No. 62/541,637, filed on Aug. 4, 2017, provisional application No. 62/463,539, filed on Feb. 24, 2017.

(51) Int. Cl.
*G01S 15/93* (2020.01)
*G05D 1/00* (2006.01)
*G01S 17/933* (2020.01)
*G01S 13/933* (2020.01)

(52) U.S. Cl.
CPC ......... *G05D 1/0022* (2013.01); *G05D 1/0038* (2013.01); *B64U 2201/20* (2023.01); *G01S 13/933* (2020.01)

(58) Field of Classification Search
CPC ...... G01S 15/93; G01S 17/933; G01S 13/933; B64C 39/024; B64C 2201/146; B64C 27/006; B64C 2201/141; B64C 2201/128; B64C 2201/148; B64C 2201/123; B64C 2201/027
USPC .......................................................... 701/2
See application file for complete search history.

(56) References Cited

U.S. PATENT DOCUMENTS

| | | | |
|---|---|---|---|
| 2013/0085629 A1* | 4/2013 | Washington | G05D 1/0055 701/15 |
| 2013/0233964 A1 | 9/2013 | Woodworth et al. | |
| 2014/0131510 A1* | 5/2014 | Wang | B64C 27/00 244/17.23 |
| 2016/0125746 A1* | 5/2016 | Kunzi | G01S 15/87 701/11 |
| 2016/0291136 A1 | 10/2016 | Lindskog et al. | |
| 2018/0118374 A1* | 5/2018 | Lombardini | B60L 9/00 |

* cited by examiner

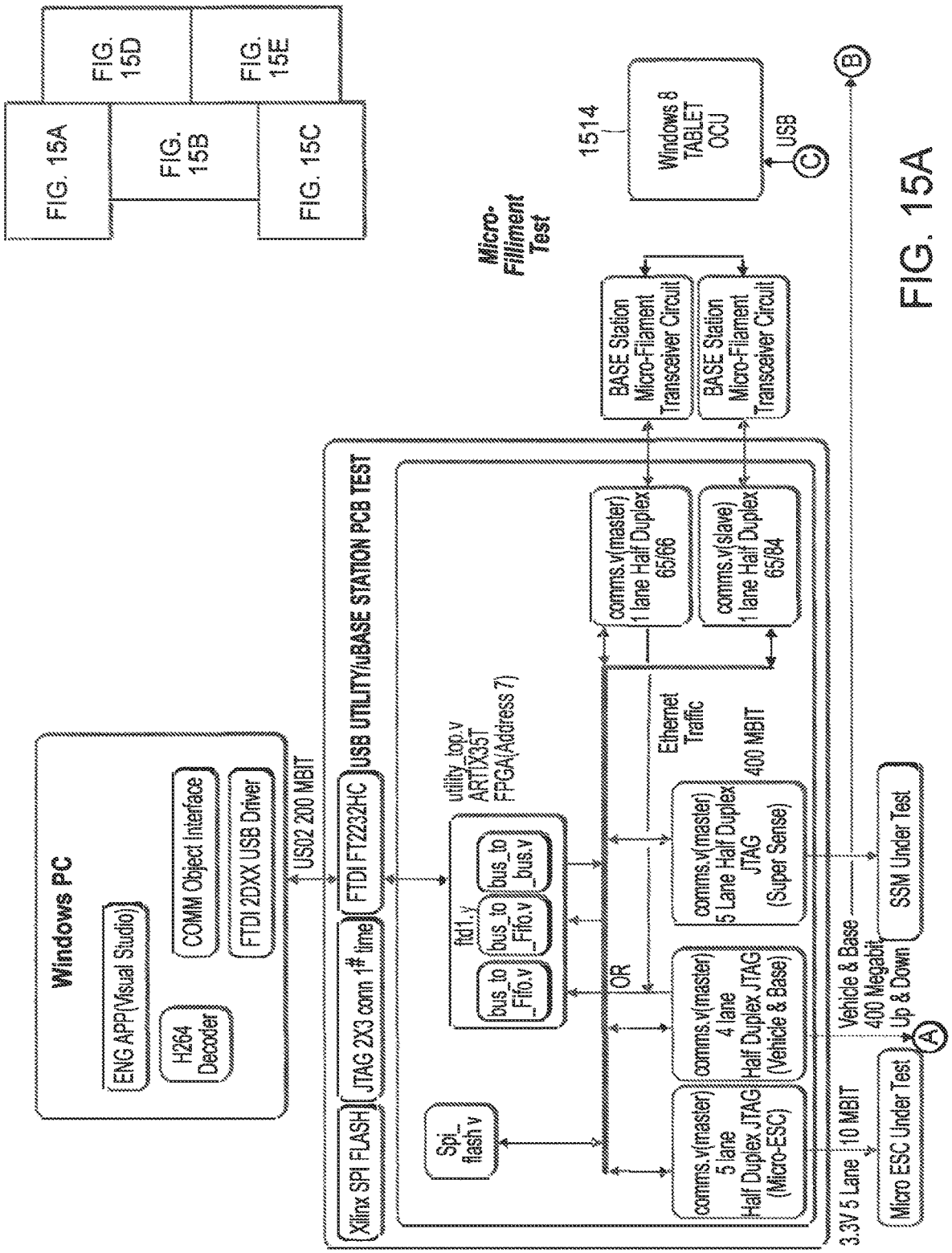

4682 — Switch to Base Station Battery- *Toast Notification Add Base Station Battery Icon*

CONTROL SYSTEMS FOR UNMANNED AERIAL VEHICLES

CROSS-REFERENCE TO RELATED APPLICATIONS

This application is a continuation of U.S. patent application Ser. No. 16/548,043 filed on Aug. 22, 2019 and entitled "CONTROL SYSTEMS FOR UNMANNED AERIAL VEHICLES," which in turn claims priority to U.S. Provisional Patent Application No. 62/725,228 filed on Aug. 30, 2018 and also to PCT/US2018/019570 filed on Feb. 23, 2018, all of which are incorporated herein by reference in their entirety. U.S. patent application Ser. No. 16/548,043 is a continuation-in-part of PCT/US2018/019570 filed on Feb. 23, 2018, which in turn claims priority to U.S. Provisional Patent Application No. 62/463,539 filed on Feb. 24, 2017 and U.S. Provisional Patent Application No. 62/541,637 filed on Aug. 4, 2017, all of which are incorporated herein by reference in their entirety. U.S. patent application Ser. No. 16/548,043 is a continuation-in-part of PCT/US2018/053226 filed on Sep. 27, 2018, which in turn claims priority to U.S. Provisional Patent Application No. 62/672,366 filed on May 16, 2018 and U.S. Provisional Patent Application No. 62/564,175 filed on Sep. 27, 2017, all of which are incorporated herein by reference in their entirety. PCT/US2018/053226 is a continuation-in-part of PCT/US2017/061195 filed on Nov. 10, 2017, which is incorporated herein by reference in its entirety.

BACKGROUND

This invention relates to control systems for unmanned aerial vehicles (UAVs).

In recent years the use of UAVs has become widespread, particularly in military and recreational applications. Until recently, commercial use of UAVs was limited due to regulatory and technological constraints of UAVs (e.g., safety, limited range, poor reliability, etc.) as well as the relatively high cost of UAVs.

Due to advances in technology and an increased prevalence of UAVs, UAVs are becoming cost effective and sufficiently reliable for use in commercial applications.

At the same time, there is a need for a cost effective, efficient means of controlling and maneuvering UAVs within confined aerospace, such as gaps between buildings and/or trees or within buildings or enclosures, and for delivering items to customers at the customer's location. It is unclear how UAVs will accurately maneuver within constrained areas or to accurately navigate in proximity to objects above ground.

SUMMARY

The present invention relates to systems and methods for controlling an unmanned aerial vehicle within a flight operating space. The method include determining, using a plurality of sensor arrays mounted to the unmanned aerial vehicle, a flight path for the unmanned aerial vehicle, wherein the plurality of sensor arrays are positioned on the unmanned aerial vehicle to provide a field of view on different sides of the vehicle. For example, the sensor arrays perceive objects in at least 3 directions that are at least 90 degrees apart, for example. Each sensor array includes an imaging device and a distance measurement device. The method also includes receiving, by at least one sensor array of the plurality of sensor arrays, sensor data identifying at least one object in the operating space. The method further includes determining, by one or more processors, a spatial relationship between a first location of the unmanned aerial vehicle and the at least one object in the operating space. The method also includes determining, by one or more processors onboard the unmanned aerial vehicle, a flight path around the at least one object based on the sensor data and the spatial relationship. The method further includes generating, by the one or more onboard processors, a first signal to cause the unmanned aerial vehicle to navigate within the operating space around the at least one object.

In an exemplary embodiment, the unmanned vehicle is a multi-rotor vehicle (e.g. quadcopters, hexacopters, octocopters). Multi-rotor vehicles generally have motors rigidly mounted to the airframe and control vehicle motion by adjusting speed of rotation of individual motors based on an selected model of all rotors generating thrust in one or more directions. This makes for a system which can be controlled in roll, pitch, yaw, and net thrust. Such a multi-rotor vehicle can move in space by holding a particular roll or pitch angle and varying the net thrust. Under certain circumstances, this approach can lead to system instability as the vehicle hovers. Hover quality can be improved by controlling each axis independently of the vehicle's roll and pitch.

Approaches described herein can employ thrusters which include rotors mounted to a multi-rotor helicopter frame in which spars have dihedral and twist. That is, the thrust directions can be fixed, and not all parallel. Each thruster generates an individual thrust line which is generally not aligned with the thrust lines of other thrusters. Free-body analysis yields the forces and moments acting on the body from each thruster. The forces and moments are summed together to produce a unique mapping from motor thrust to net body forces and moments. A desired input including roll, pitch, and yaw moments and forward, lateral, and vertical thrusts can be received and used to calculate the necessary change in motor speeds, to achieve the desired input and resulting thrust.

In some aspects, the aerial vehicle is configured to maintain a desired spatial orientation while at the same time generating a net thrust that varies in magnitude and/or direction. In some aspects, a sensor such as a still or video camera is statically coupled to the multi-rotor vehicle and an orientation of the vehicle is maintained such that the camera remains pointed in a given direction while the net thrust vector generated by the vehicle causes the vehicle to move in space. Note that the sensor can comprise the camera, the IMU, the GPS sensor, the pressure sensor, or other sensors that control flight operation. The control system can include a processor that computes updated motor speeds and twist angles, for example.

Preferred embodiments employ an onboard control system that communicates with an external flight management system to control flight operations of the unmanned aerial vehicle. The control system on the unmanned aerial vehicle can comprise a system-on-chip (SOC) that includes one or more integrated circuits having one or more memories to process sensor data and uses stored instructions regarding flight path, payload operation and numerous flight control operations as described herein. The one or more integrated circuits can include field programmable gate arrays (FPGA) and/or application specific integrated circuits (ASIC), for example, an integrated circuit. The integrated circuit can comprise a communications bus that receives data from the sensor arrays and routes the sensor data for processing to provide flight control data and communicate sensor data to the external flight management system.

The flight control system on the vehicle can be connected to one or more sensor arrays to control flight operations of the vehicle including collision avoidance, navigation, and to compensate for collision events encountered during flight. A bumper can be used to maintain flight operation of the vehicle in the event of a collision. The bumper can comprise one or more bumper guards attached to the vehicle. A preferred embodiment of a bumper device can further comprise one or more bumper elements or guards that extend around the vehicle. The flight control system can utilize thrust vectoring as described herein to control rotations of the vehicle after a collision and thereby assist in maintaining flight. Bumpers can utilize a spring mounted frame that is attached to the vehicle air frame. Spring strands can extend above and/or below the vehicle to manage impact of the vehicle with respect to obstructions encountered vertical movements of the vehicle.

Tether communications enables processing data on a ground station where computational resources are essentially unconstrained. Inputs that are not required at very high rates to maintain flight stability and collision avoidance are good candidates for ground processing. For example, video processing to build maps or identify objects are good candidates. Where an unmanned aerial vehicle operates at low velocity, this further eases the need for onboard processing (as the unmanned aerial vehicle can tolerate more latency). This is in contrast to a high speed unmanned aerial vehicle that must do all or most processing locally. The processing architecture may use RF communications between the vehicle and the ground station, while the tether enables continued operation when RF is not possible.

Embodiments can include both tethered and untethered unmanned aerial vehicles. Tethered embodiments can include a tether management system that is on the ground, a building, or another vehicle, or alternatively, is on the aerial vehicle. For embodiments with the tether management system on the vehicle, a rotating spool can be used wherein the tether comprises a magnet wire filament, for example. Tethered aerial vehicles can be used for industrial inspection applications in which pipes, tanks and fluid management systems require periodic inspections for safety and repair. Frequently such systems store or transport corrosive chemicals that can degrade the components. The preferred devices and methods described herein facilitate automated measurement of these systems to identify needed repairs or replacement of components. Smaller vehicles can be used for interior inspection of containers such as fluid tanks and pipelines with small diameter ports or access doors. Exterior inspection of industrial plants can use larger air vehicles with additional capabilities as described generally herein. Chemical sensors can also be used on the vehicle as the operating voltages conducted to the air vehicle from the base station via the tether can be in the range of 200-1000 volts. Smaller vehicles used for internal inspection can operate at 400-600 volts, whereas larger vehicles can operate at 600-1000 volts or more. These systems can be launched from ground vehicles or water vehicles as needed.

Other features and advantages of the invention are apparent from the following description, and from the claims. The specific examples of commercially available components referenced herein serve to generally indicate the functional and structural aspects of preferred embodiments, however other similar or equivalent devices can also be used in accordance with the invention.

BRIEF DESCRIPTION OF THE DRAWINGS

FIGS. 15A-15E show exemplary diagrams for an embedded control system for the unmanned aerial vehicle based on FPGA architecture. FIG. 15A also shows a legend indicating an arrangement of FIGS. 15A-15E relative to each other.

DETAILED DESCRIPTION

Figure 1:
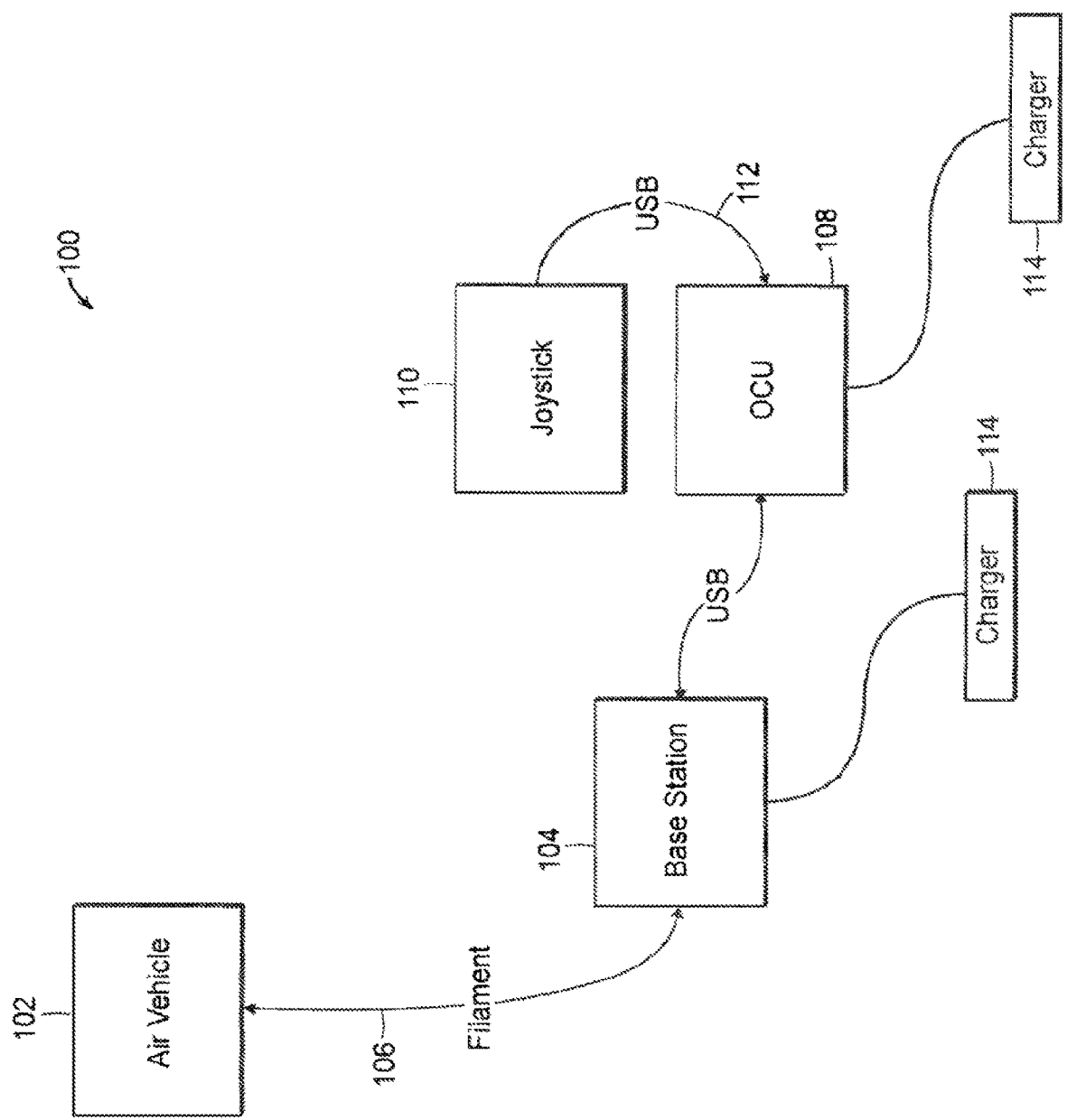
FIG. 1 illustrates an aerial vehicle system with a tethered unmanned aerial vehicle in accordance with embodiments of the invention.

FIG. 1 illustrates an aerial vehicle system 100 with a tethered unmanned aerial vehicle 102. System 100 includes the air vehicle 102 which houses all flight systems and sensors. The air vehicle 102 is connected to a base station 104 through a microfilament tether 106. The microfilament tether 106 enables power and data transfer between the air vehicle 102 and the base station 104. The base station 104 is the power and communications hub of system 100, and houses the power conversion and microfilament communication circuitry, as well as the battery and high voltage safety systems. An operator controls and interacts with the system 100 using a control/joystick 110 connected through a USB cord 112 to an Operator Control Unit (OCU) 108. An OCU application, which runs on the OCU 108, serves to display video and telemetry data as well as communicates flight commands to the air vehicle 102. The base station 104 and OCU 108 are connected to chargers 114, such as a wall socket. System 100 may also include an interchangeable spooler cartridge system and a vision-based teleoperation assistance system. The spooler and an interchangeable microfilament dispenser may be installed on the air vehicle 102. For example, exemplary embodiments of the present disclosure can utilize the tether/spooler system disclosed in U.S. patent application Ser. No. 15/041,211 entitled "Spooler for unmanned aerial vehicle system," filed on Feb. 11, 2016, the disclosure of which is incorporated by reference herein.

Figure 2:
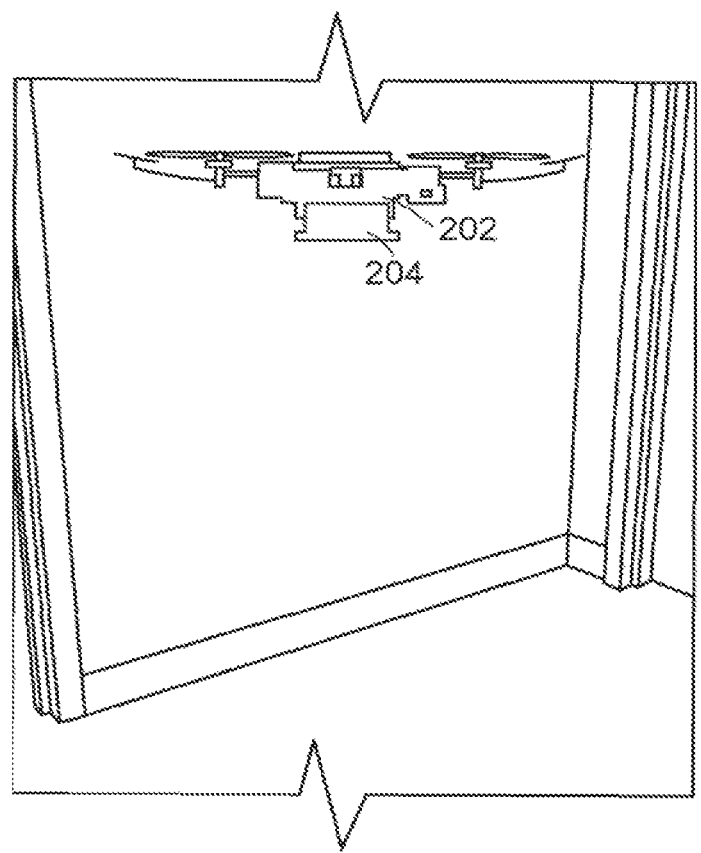
FIG. 2 illustrates an unmanned aerial vehicle.

FIG. 2 illustrates an unmanned aerial vehicle 202 with small reconnaissance platform. The unmanned aerial vehicle 202 is a semi-autonomous high-endurance nano unmanned air system (nano-UAS) meant for operation in close-quarters indoor environments. Key components include a microfilament tether system, an interchangeable spooler cartridge system, and a vision-based teleoperation assistance system.

The unmanned aerial vehicle 202 includes all flight systems and sensors. The microfilament tether system includes a spooler 204 and an interchangeable microfilament dispenser installed on the unmanned aerial vehicle 202. The microfilament tether system enables power and data transfer between the unmanned aerial vehicle 202 and a base station. Exemplary embodiments of the present disclosure may utilize the aerial robots and/or filament disclosed in U.S. Pat. No. 7,631,834 entitled "Aerial robot with dispensable conductive filament" filed on Apr. 19, 2007, the disclosure of which is incorporated by reference herein.

The unmanned aerial vehicle 202 provides a sensor platform, visual position, velocity, and attitude stabilization, multiple camera sensor modules, and closed loop flight. The nano class airframe is designed for constrained environment operation. Other embodiments can include larger airframes with additional spars and rotors depending on a size and a weight of the payload and the system applications. For example, in alternative embodiments, the unmanned aerial vehicle 202 can be configured for deliveries. For example, exemplary embodiments of the present disclosure may utilize the delivery methods and systems disclosed in U.S. patent application Ser. No. 14/581,027 entitled "Unmanned delivery" filed on Dec. 23, 2014, the disclosure of which is incorporated by reference herein.

In additional embodiments, the aerial vehicle system (e.g., aerial vehicle system 100) and/or unmanned aerial vehicle 202 may be utilized in data analytics. Data collected by the unmanned aerial vehicle 202 may be used for analytics that are processed on a ground station, such as base station 104. The system may use one or more classes of analytics to enhance performance and/or usefulness of data obtained by sensors by reacting to observed conditions during flight. These include, for example, object/feature identification, anomaly detection, and change detection. Object/feature identification involves determining that sensor input (for example, image or other sensor modality) matches a pattern stored in a library database. This may be used to identify a particular object, defect, or class of defect. Anomaly detection involves determining that sensor input within a time or space window is statistically different from what was seen during a flight or from a library of past flights. For example, this can compare a current section of pipe to other sections of pipe or pipes that have been travelled during the flight. This function does not have pre-defined signatures that are being searched. Change detection involves determining that sensor input from one physical location has changed. This can be use used to monitor conditions that may be unstable, such as an unstable collapsed building.

The persistence provided by the tether enables these analytics to evaluate conditions over a longer period of time. Any of these events can trigger an autonomous behavior macro to alter a flight plan and/or to go collect more information during the flight. These kinds of real time re-plans and diversions may not be relevant to short missions of battery-powered UAVs. Each of these algorithms ensure that the tether is not interpreted as relevant object, change, or anomaly.

Figure 3:
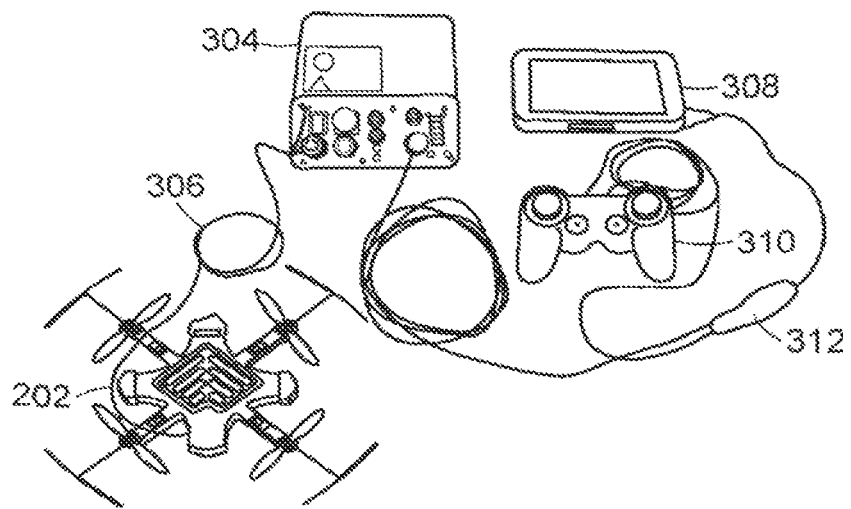
FIG. 3 illustrates a system for the unmanned aerial vehicle shown in FIG. 2.

FIG. 3 illustrates a system for the unmanned aerial vehicle 202 shown in FIG. 2. The system includes four major system components, an unmanned aerial vehicle 202, a base station 304, a microfilament spooler 306, and an operator control unit (OCU) 308. The system further includes a number of peripherals, such as a controller 310 to simplify flight operations, and a USB hub connector 312 to connect the base station 304 to the controller 310 and the OCU 308.

The OCU 308 controls and interacts with the unmanned aerial vehicle system. In an exemplary embodiment, the OCU 308 is a computer tablet displaying system software for commands, such as providing high level commands to the unmanned aerial vehicle 202. The OCU 308 further displays video returned from cameras on the unmanned aerial vehicle 202 to provide video feedback to a user.

In some embodiments, the computer tablet can be a FZ-M1 Tablet, for example. An OCU application, which runs on the OCU 308, serves to display video and telemetry data to a user, and communicate flight commands to the unmanned aerial vehicle 202.

Base station 304 is the power and communications hub of the system and houses the power conversion and microfilament communication circuitry, as well as the battery and high voltage safety systems. The microfilament spooler 306 provides microfilament deployment and a disposable cartridge. In an exemplary embodiment, the spooler 306 deploys a tether that is 250 feet in length or longer, and the tether microfilament is a 38AWG twisted pair and carries communications and power.

Those skilled in the art will realize that OCU 308 as shown as a computer tablet could instead be a desktop computer, laptop computer, or a handheld mobile computing device.

Additional embodiments for controlling a tethered aerial vehicle are disclosed in PCT patent application no. PCT/US2017/024152 entitled "Persistent Aerial Reconnaissance and Communication System," filed on 24 Mar. 2017, the entire disclosure of which is incorporated by reference herein.

Figure 4A:
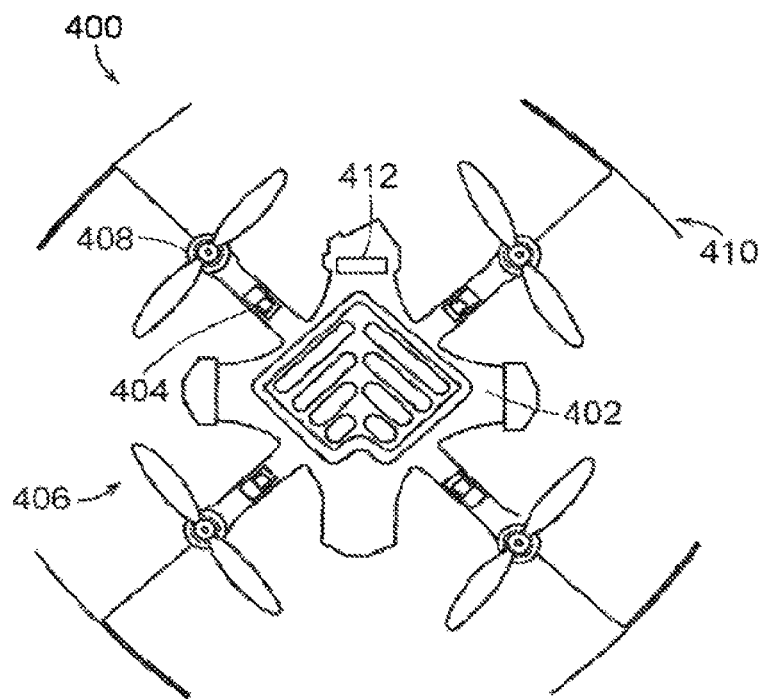
FIGS. 4A and 4B shows an exemplary unmanned aerial vehicle.

FIG. 4A shows an exemplary top view of the unmanned aerial vehicle 400. A main body 402 of the unmanned aerial vehicle 400 houses a main electronics stack, sensors, and cameras. Each strut 404 includes an electronic speed controller (ESC) and a motor/propeller mount. Each propeller 406 attaches to a motor 408 and creates thrust when spun. The motor 408 spins the propeller 406 when actuated to create thrust and stabilize the system. Each propeller 406 includes a bump guard 410 that protects the unmanned aerial vehicle from bumps against obstacles. A camera module 412 generates video data to be sent to user.

Figure 4B:
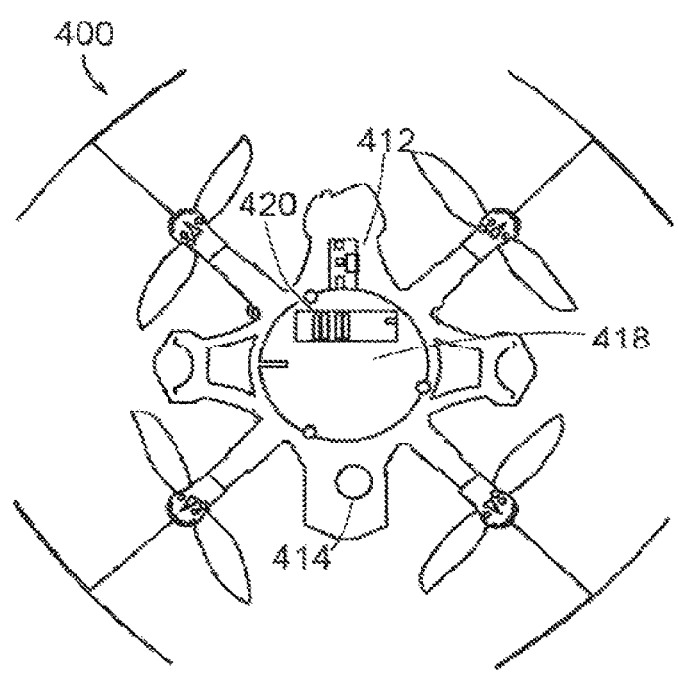

FIG. 4B shows an exemplary bottom view of the unmanned aerial vehicle 400 without a spooler. Sonar or acoustic transducer 414 provides downward and/or upward facing ranging data, for example, utilized for flight behaviors. A camera module 412 generates video data to be sent to a user. A spooler receiver 418 is a receptacle for a microfilament spooler cartridge. The microfilament (tether) is connected, via the spooler, to the unmanned aerial vehicle 400 using a tether connector 420. The tether connector 420 electronically connects the tether to the control electronics on the unmanned aerial vehicle 400.

Figure 5:
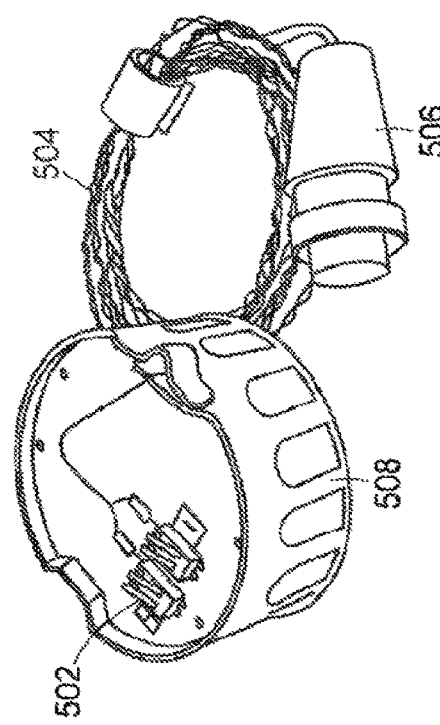
FIG. 5 shows spooler components of the unmanned aerial vehicle.

FIG. 5 shows spooler components of the unmanned aerial vehicle. A base station connector 502 is a power and communications connector to a base station. A leader 504 is a larger wire for system setup and pre-flight operation. Unmanned aerial vehicle interface 506 is a mechanical and electrical interface to the unmanned aerial vehicle. A spooler 508 holds the microfilament spool. The microfilament spooler is a disposable microfilament cartridge that both houses and deploys microfilament, while cooling and protecting the microfilament. The spooler provides snag and tension-free deployment of microfilament developed for a winding and deployment technique, an unspooling method that feeds from the outside of a bobbin and directs the filament back again through the spool's center. In an exemplary embodiment, each spool can contain 250 feet of microfilament.

Figure 6:
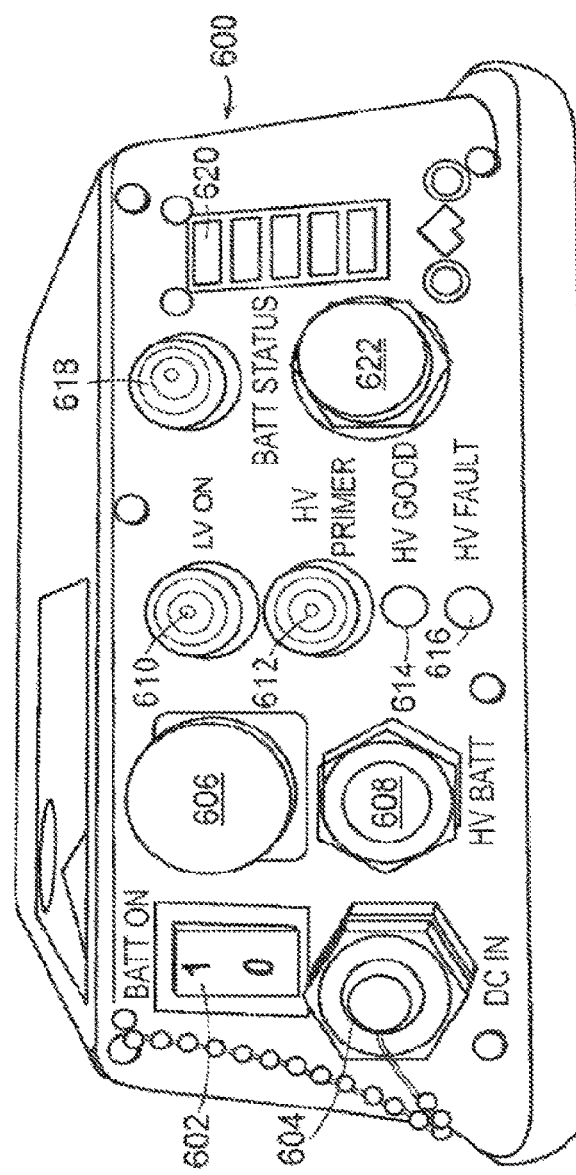
FIG. 6 shows a base station for the unmanned aerial vehicle.

FIG. 6 shows a base station 600 for the unmanned aerial vehicle. The base station 600 is the power and communications nexus for the unmanned aerial vehicle. The base station 600 provides the power conversion and communications functionality for the system, and feeds both power to and command/data signals to and from the unmanned aerial vehicle via the microfilament. In an exemplary embodiment, the base station's internal battery provides one hour of continuous operation, which can be extended by connecting a standard 120V external power source to the system using the AC adapter. The base station 600 employs a double-isolated power supply system with built-in system checks to prevent accidental high voltage application.

The base station 600 includes a BATT-ON Switch 602 to connect/disconnect the battery to the rest of system. A DC IN connector 604 is a connector for external power input (9-36 VDC). A CSTOP switch 606 is a controlled-stop switch to immediately shutdown the entire system, including a fast shutdown of high voltage (HV) circuitry. A HV OUT connector 608 is an output power and communications port, which connects to a microfilament spooler. A LV ON button 610 provides power to the base station 600. A HV PRIMER Button 612 interacts with the high voltage (HV) turn on/off sequence. A HV good indicator light 614 indicates when high voltage (HV) is active. A HV fault indicator light 616 indicates a high voltage (HV) fault. A BATT status button 618 when pushed displays the battery charge status. BATT charge status indicator 620 indicates a charge state when BATT status button is pushed, and indicates active charging when an external power is applied. An OCU USB connector 622 is a USB connection to an OCU tablet.

During the startup procedure, the HV PRIMER button 612 is depressed for 3 seconds. During this interval, the base station 600 engages a "spool connection check", which performs a test to confirm the connection validity of the high voltage chain from the base station 600 to the spooler, and on to the unmanned aerial vehicle. The user may proceed to the next stage only if the test is successful, indicating full and proper connectivity.

The base station 600 constantly monitors system performance during operation. If it detects that the microfilament connection is lost, high voltage is immediately shut down as a safety precaution, to decrease exposure to other objects. It is able to sense this condition by assessing the current in the microfilament power system. If the current drops below a normal threshold, an open circuit is indicated, identifying that a break in the microfilament power chain has occurred.

The base station 600 uses a "smart battery" system. This system includes built-in battery protection for overvoltage, undervoltage, overcurrent, and over-temperature conditions. The battery is charged using a built in smart charger, which adjusts charging characteristics according to temperature or other environmental factors, and according to battery-specific conditions.

Figure 7:
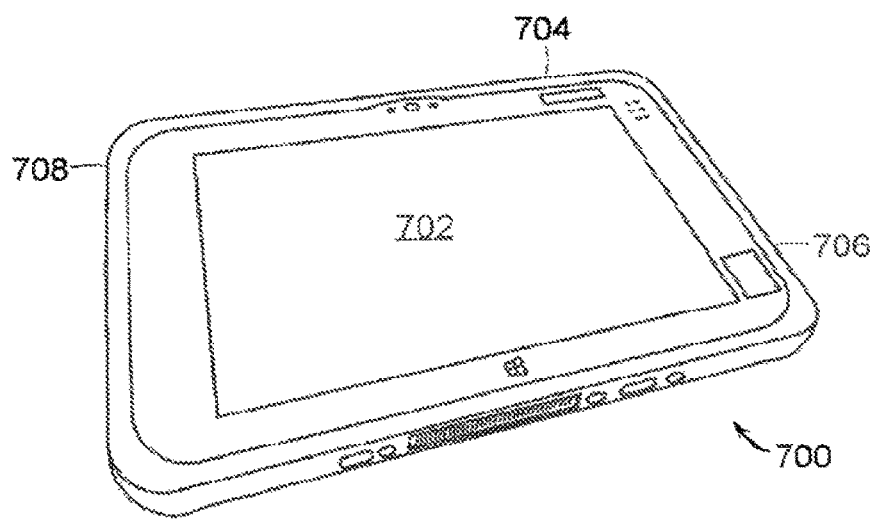
FIG. 7 is an operator control unit (OCU).

FIG. 7 is an operator control unit (OCU) 700. The OCU 700 is the user's interface with the system. In an exemplary embodiment, the OCU 700 resides on a touchpad, but is portable to any Windows or Linux-based platform. The OCU 700 displays the video streams from the unmanned aerial vehicle, and accepts high level operator commands for unmanned aerial vehicle control.

The OCU 700 includes a main screen 702 to display an OCU application and returned video. A power button 704 turns on and off the OCU. An USB port 706 is a data connector to the system, typically the base station. An OCU power port 708 is a connector for a power supply.

Figure 8:
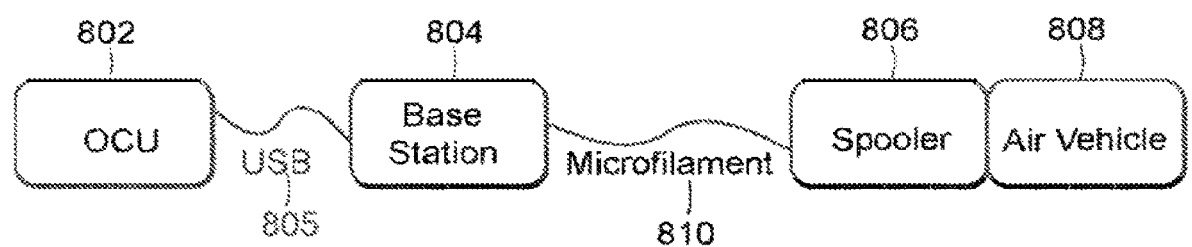
FIG. 8 is a diagram of the unmanned aerial vehicle component connections.

FIG. 8 is a diagram of the unmanned aerial vehicle component connections. An OCU 802 is connected to a base station 804 via a USB connector 805. The base station 804 is connected to an air vehicle 808 via a microfilament 810. The microfilament 810 is housed and deployed through a microfilament spooler 806 coupled to the air vehicle 808.

Figure 9A:
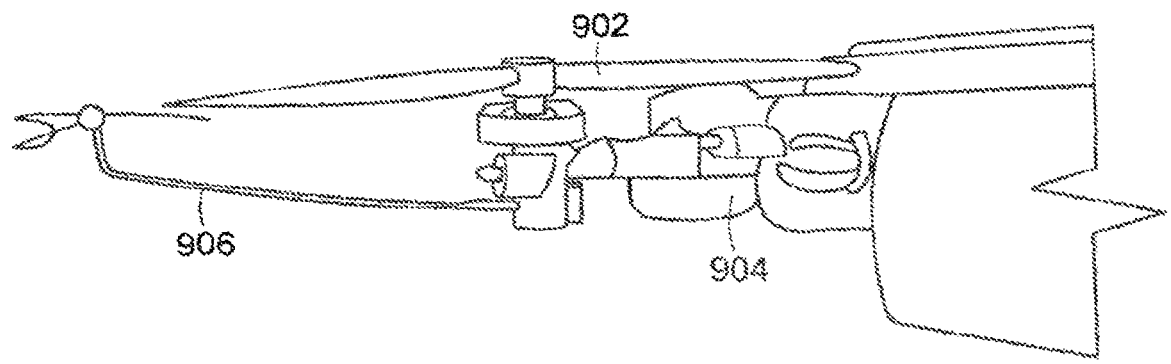
FIGS. 9A, 9B, and 9C illustrate a propeller, motor, and bump guard of an unmanned aerial vehicle.
Figure 9B:
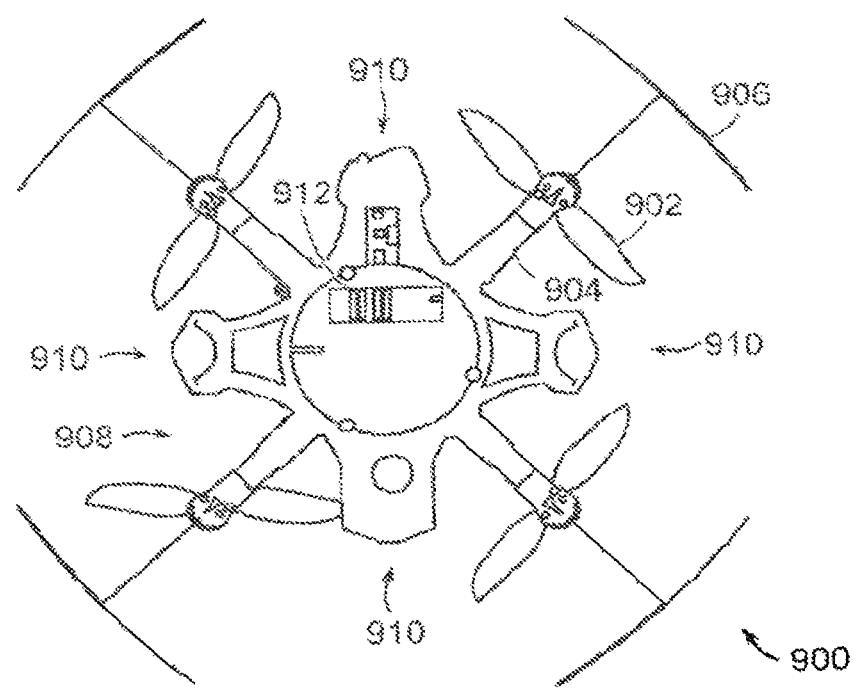
Figure 9C:
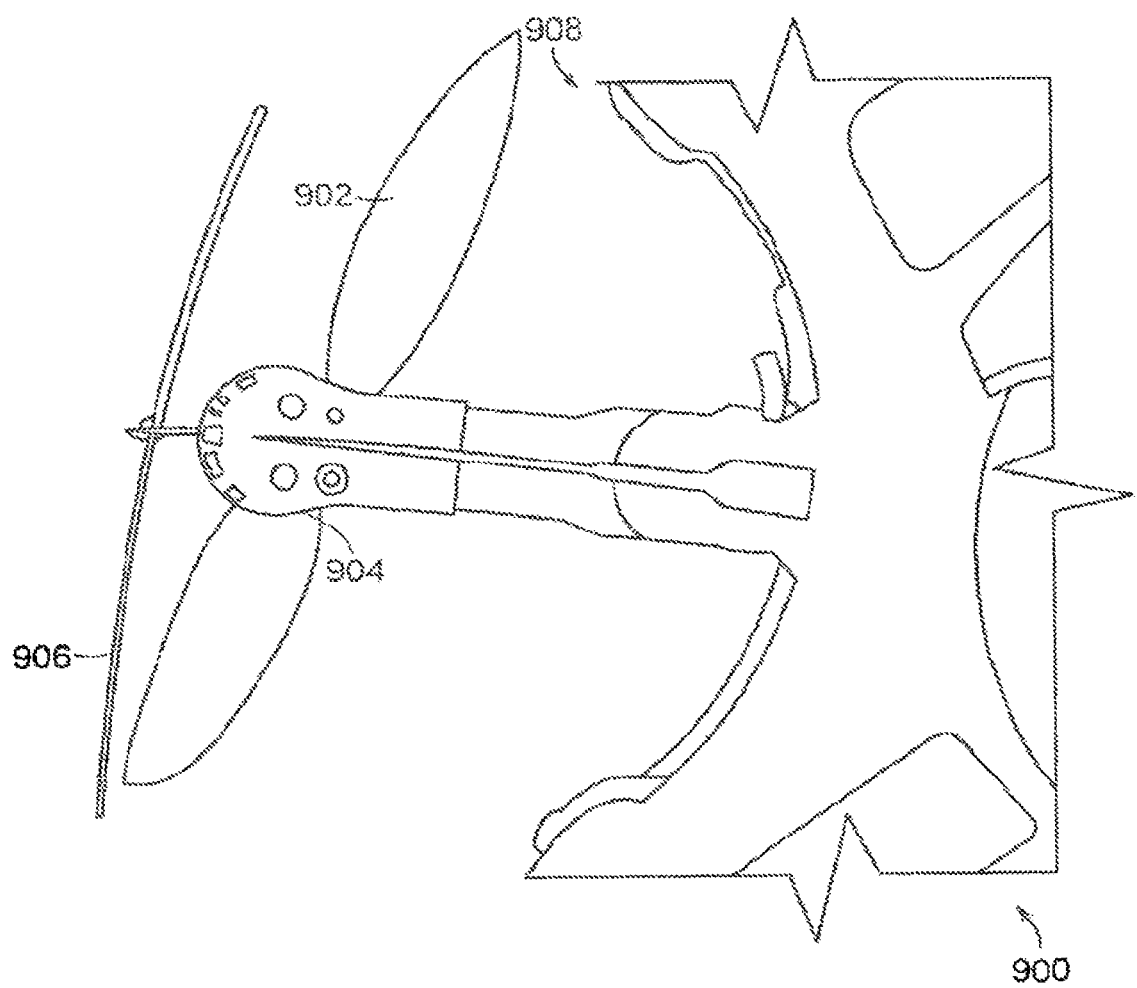

FIGS. 9A, 9B, and 9C illustrate a propeller 902, motor 904, and bump guard 906 of the unmanned aerial vehicle 900. FIGS. 9A and 9B display the bumps guards 906 extended. FIG. 9C displays the bump guard as retracted. In the depicted embodiment, the unmanned aerial vehicle 900 is a multicopter in a quadrotor configuration. A larger number of rotors can also be used. The depicted embodiment uses two pairs of counter-rotating propellers to provide lift and stability.

The unmanned aerial vehicle 900 is the flying component, in effect, a mobile sensor platform. The unmanned aerial vehicle 900 houses microfilament interface circuitry for power and communications, and a multi-core processor and microcontroller for flight computation and video processing.

In an exemplary embodiment, the unmanned aerial vehicle 900 hosts three camera sensor modules, providing three VGA video streams displayed to the user on the system's operator control unit (OCU). Position and attitude stability are maintained using SONAR, a magnetometer, a gyroscope, a barometer, and an accelerometer.

The unmanned aerial vehicle 900 can maintain position stabilization for a period of time in certain conditions. The unmanned aerial vehicle 900 uses camera(s) to compute vehicle motion, and uses this data to make navigational corrections. The camera(s) may be downward-facing, forward-facing, or in any other configuration. The flight area should include visible features for the algorithm to track (i.e., a plain white surface will not provide accurate positional data, but patterned and textured surface like a carpet or wooden floor yields more robust position determinations).

In an exemplary embodiment, the UAV body 908 includes nacelles 910 that extends beyond the normal boundary of the body 908. Each nacelle 910 includes sensor arrays that may include, but are not limited to, one or more of cameras, distance sensors, sonar, Lidar, and LEDs. Each sensor array has a field of view of the environment. The nacelle 910 increases the field of view for the sensor array(s) attached to the end of the nacelle 910, and decreases interference caused by the propeller 902. In alternative embodiments, the sensor arrays may be mounted on bumpers.

The tether is connected to the unmanned aerial vehicle 900 via a tether connector 912. The tether connector 912 electronically connects the tether to the control electronics on the unmanned aerial vehicle 900.

Figure 10:
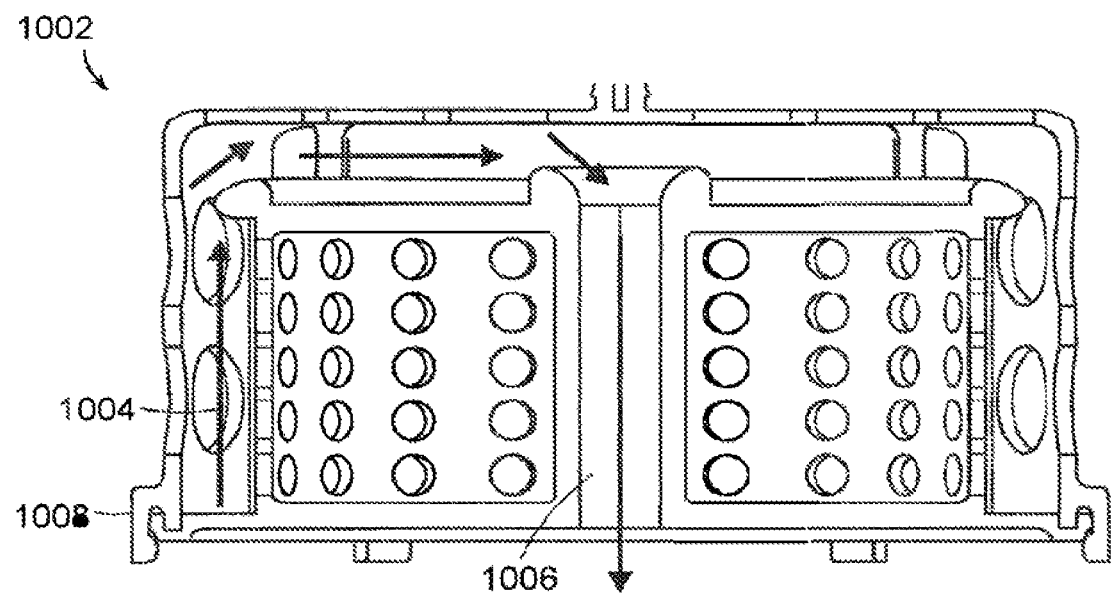
FIG. 10 shows a depiction of a specialized spool.

FIG. 10 shows a depiction of a specialized spool 1002. The specialized spool 1002 is a coil of wire/tether/microfilament. The spool transfers power and data, and maintain connectivity through the wire/tether/microfilament. The specialized spool 1002 can be careless or can be wound around a bobbin or other central core. A microfilament/tether deployment mechanism is used to unspool the microfilament/tether as the unmanned aerial vehicle traverses terrain.

In an exemplary embodiment, the tethered unmanned aerial vehicle is meant for lateral, indoor travel. Being tethered, the unmanned aerial vehicle needs a way to deploy the tether as it moves along. Reliable tether filament management is the keystone to allowing lateral movement of a tethered flying vehicle. Conventional methods include spooling unreel thread or filament from the center of a careless spool of wire, or wind off from the outside of a traditional spool. However, both methods include problems such as requiring a slip ring, unreliability due to catching and snagging, and maintaining the line under too much tension, which could break the tether.

The specialized spool 1002 includes a modified exit path 1004 of the filament such that the microfilament/tether first travels upward, over the top, and then down through the center of the spooler. This provides a tunable, snag-free, and robust solution for deploying the microfilament/tether. The specialized spool 1002 includes of two mechanical pieces: a center bobbin 1006, and an outer shroud 1008. The microfilament/tether is wound around the bobbin, and routed over rounded low-friction routing surfaces, then downwards, emerging through the center of the bobbin 1006.

The shroud 1008 has three functions. First, it provides mechanical protection for the wound microfilament/tether on the bobbin. Second, it functions to mechanically attach the bobbin to the unmanned aerial vehicle. The bobbin cannot be directly attached to the unmanned aerial vehicle because there needs to be full clearance above the bobbin to allow for microfilament/tether unspooling. Third, it prevents the filament from springing outwards, becoming too loose, looping around the top and bottom of the spooler and pulling tight.

Figure 11:
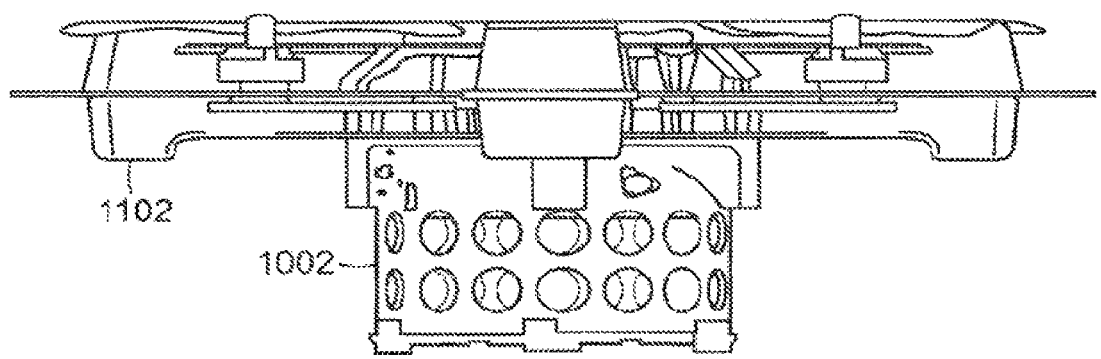
FIG. 11 shows a horizontal view of the spool shown in FIG. 10 attached to an unmanned aerial vehicle.

FIG. 11 shows a horizontal view of the spool 1002 shown in FIG. 10 attached to an unmanned aerial vehicle 1102.

Figure 12A:
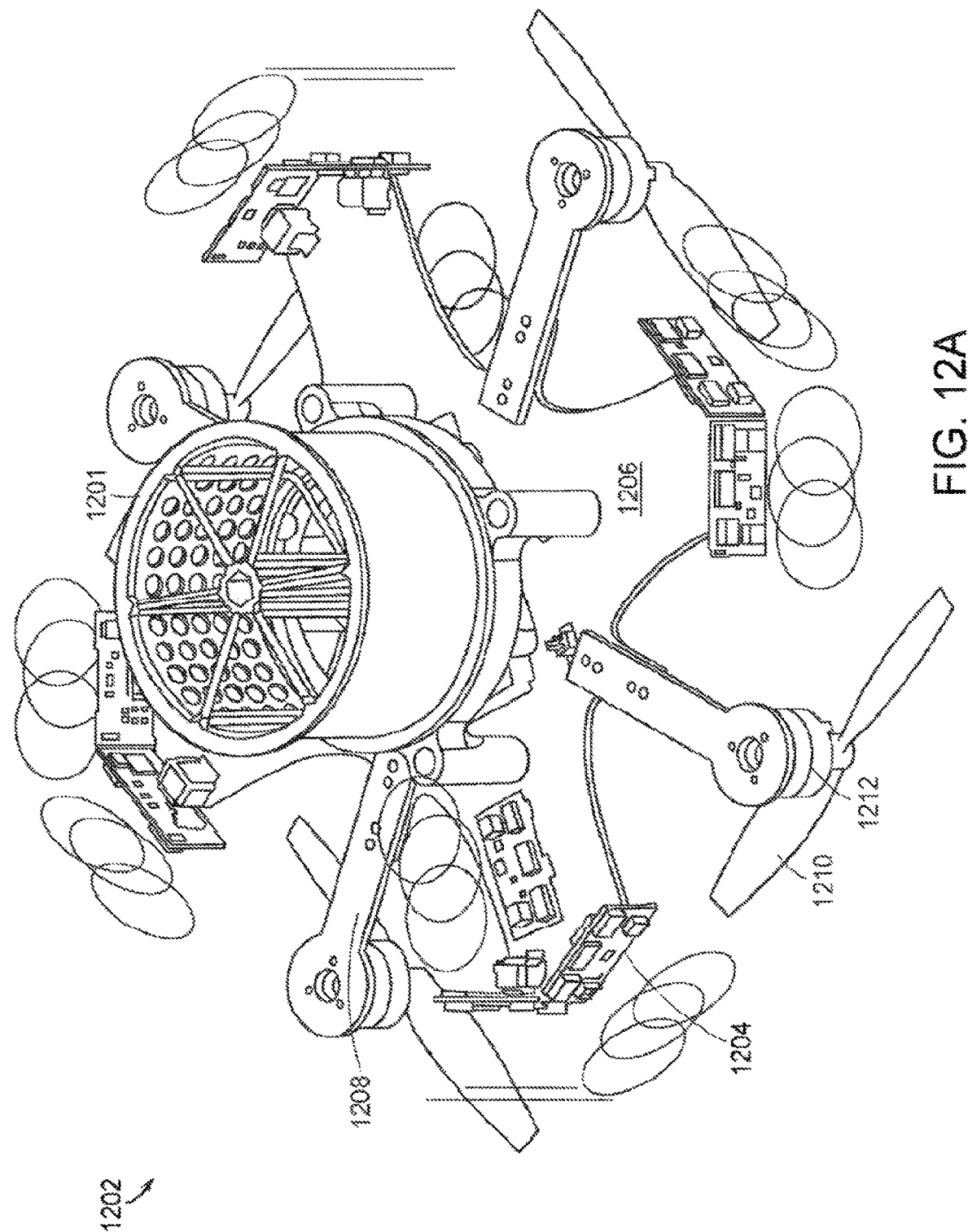
FIGS. 12A and 12B shows an unmanned aerial vehicle with four rotors.

FIG. 12A shows a bottom view of an unmanned aerial vehicle 1202 with four rotors. A spool 1201, such as spool 1002 shown in FIG. 10, is attached to the bottom of unmanned aerial vehicle 1202. The unmanned aerial vehicle 1202 also includes sensors arrays 1204 mounted next to each spar. In an alternative embodiment, the sensor arrays 1204 are mounted on each spar as well as locations on the main body.

In the depicted embodiment, the unmanned aerial vehicle 1202 is a multi-rotor helicopter that includes a central body 1206 from which a number (i.e., n) of rigid spars 1208 radially extend. The end of each rigid spar 1208 includes a rotor 1210. In the depicted embodiment, the rotors 1210 are in a horizontal configuration. In some examples, each of the rotors 1210 includes an electric motor 1212 which drives rotor 1210 to generate thrust. In some examples, the motor 1212 may be used to tilt the associated rotor 1210. The motors 1212 may include mount servos used for fine tuning and control of the tilting of rotor 1210. The motor mount servos controls the tilting and/or pitch of the rotor by linkage, which tilts the rotor 1210 in varies degrees of freedom.

Unmanned aerial vehicle 1202 includes a plurality of sensors arrays 1204 to detect surroundings. Sensors arrays 1204 are located on each spar 1208 and may include, but not limited to, cameras and/or range finders, such as sonar, Lidar, or proximity sensors. In one embodiment, multiple sensors are placed on the unmanned aerial vehicle 1202 in order to get a full 360° image. In another embodiment, the sensor arrays are positioned on the unmanned aerial vehicle to provide a field of view in at least 3 directions that are at least 90 degrees apart, each sensor array including an imaging device and a distance measurement device. In some embodiments, the unmanned aerial vehicle 1202 may not include sensor arrays on all sides to provide overlapping coverage; rather, a panoramic image is stitched together using ground processing.

In one embodiment, at least one sensor array 1204 is a Lidar sensor integrated on a chip (for example, a silicon photonic chip with steerable transmitting and receiving phased arrays and on-chip germanium photodetectors). The detection method in Lidar is based on a coherent method instead of direct time-of-flight measurement, where the system only reacts to light that was originally transmitted by the device. This reduces the effect of sunlight that can be a large noise factor in Lidar systems, and allows for modest photodetectors instead of expensive avalanche photodetectors or photo-multiplier tubes that are challenging and expensive to integrate in a silicon photonics platform. In addition, the on-chip Lidar is smaller, lighter, and cheaper than traditional Lidar. The on-chip Lidar may also be much more robust because of the lack of moving parts. For example, the non-mechanical beam steering in the on-chip Lidar is 1,000 times faster than what is currently achieved in mechanical Lidar systems, and may allow for an even faster image scan rate. This can be useful for accurately tracking small high-speed objects that are only in the Lidar's field of view for a short amount of time, which could be important for obstacle avoidance for high-speed UAVs.

Figure 12B:
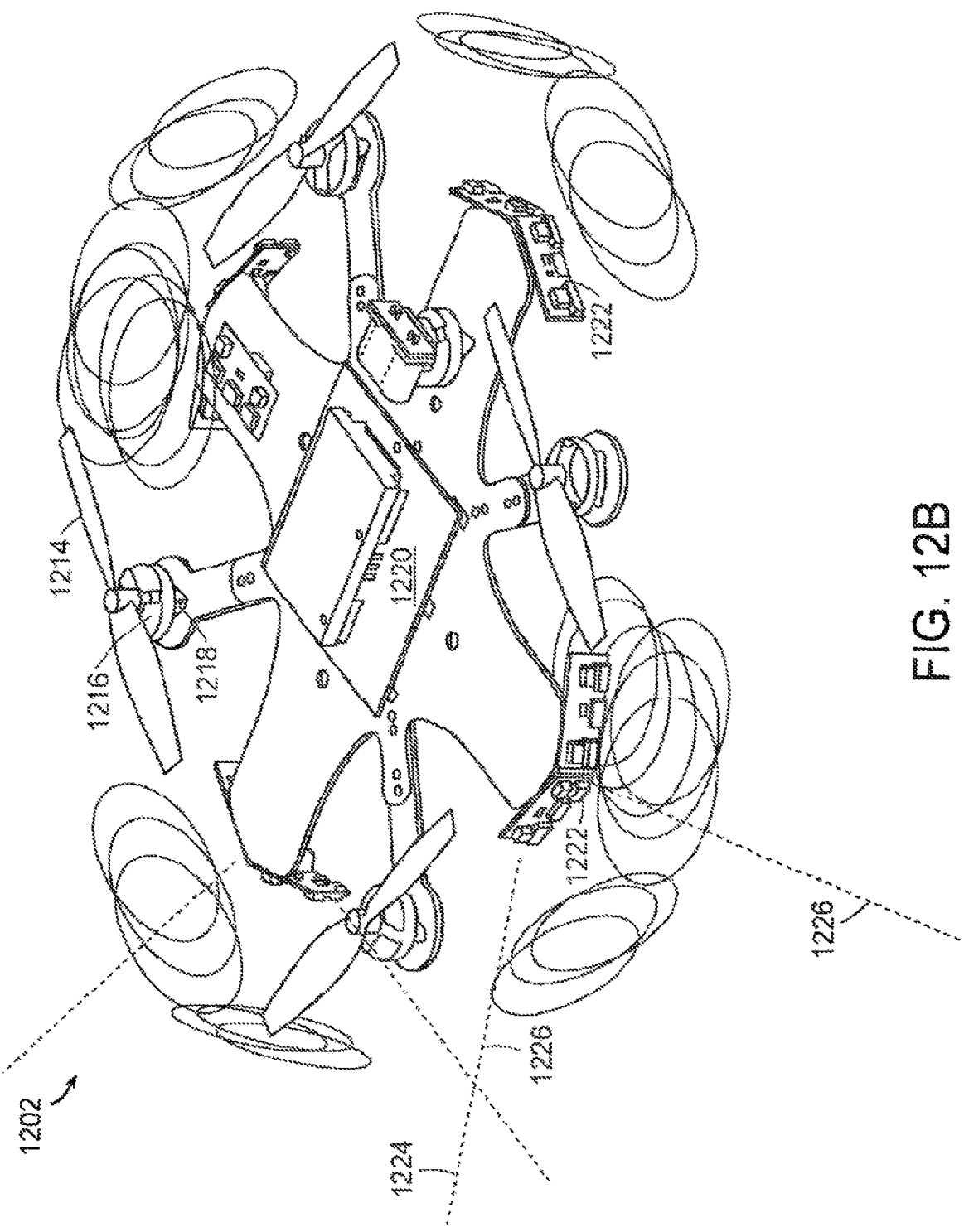

FIG. 12B shows a top view of the unmanned aerial vehicle 1202 with four rotors. The unmanned aerial vehicle 1202 includes a propeller (or rotor) 1214 located on each spar. Each propeller is attached to an electric motor 1216 which drives the propeller 1214, and an electronic speed controller 1218. The unmanned aerial vehicle 1202 further includes a DC/DC 1220 converter and sensor arrays 1222. The sensor arrays 1222 may include, but not limited to, cameras, distance sensors, sonar, Lidar, and LEDs.

Each sensor array 1222 has a field of view 1226 of the environment. The field of views 1226 of at least two adjacent sensor arrays 1222 overlap (for example, one meter from the sensor arrays 1222) to create a full panoramic view of the environment. As shown, multiple sensor arrays 1222 are placed around the unmanned aerial vehicle 1202 in order to get a full 360° image. However, in alternative embodiments, sensor arrays 1222 may not be placed around the unmanned aerial vehicle 1202 in order to get a full 360° image; rather, the sensor arrays 1222 may be placed around the unmanned aerial vehicle 1202 in order to obtain less than a full 360° image and a panoramic image may be composed using ground processing based on the images received.

Figure 13:
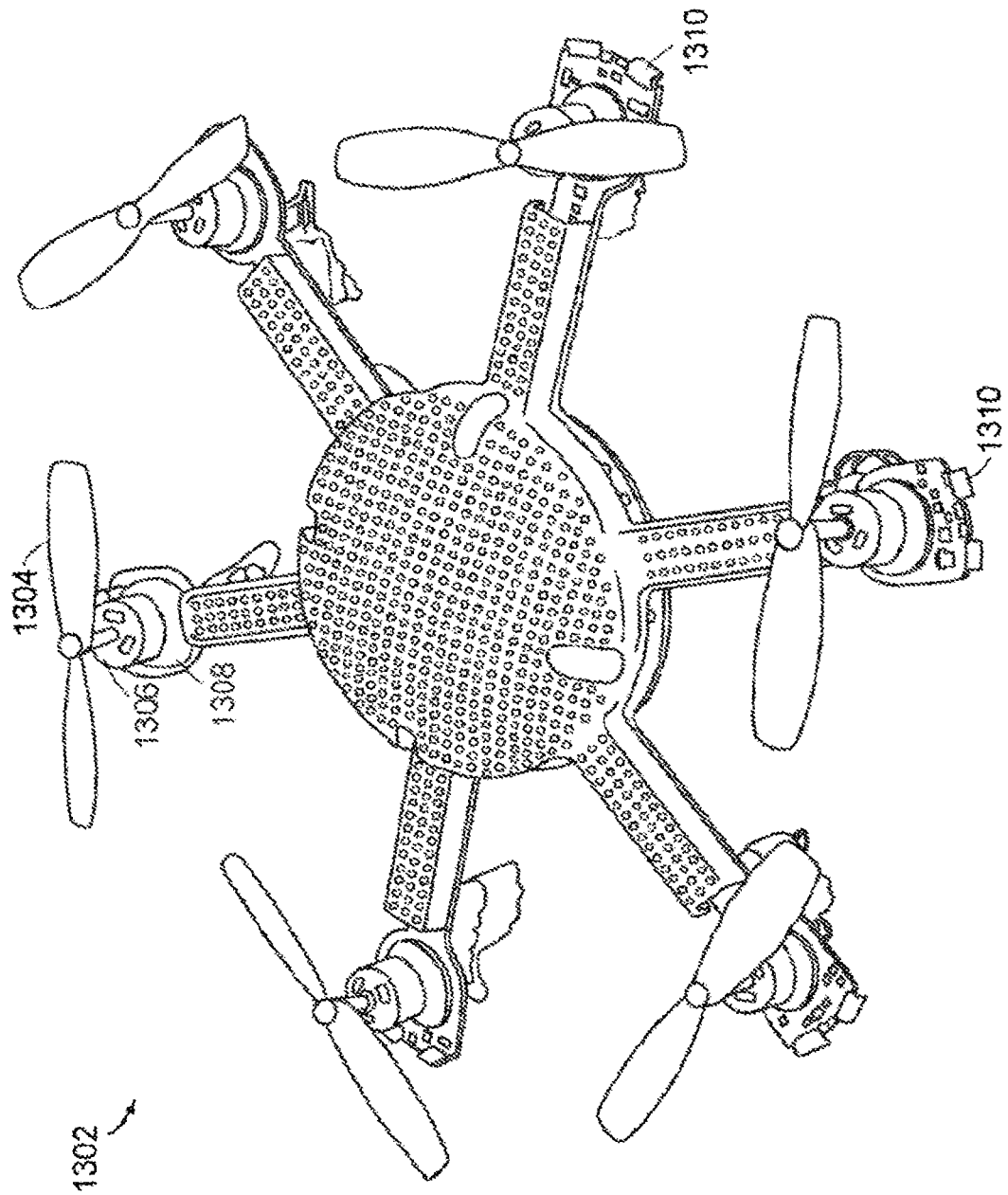
FIG. 13 shows a top view of the unmanned aerial vehicle with six rotors.

FIG. 13 shows a top view of an unmanned aerial vehicle 1302 with six rotors. The unmanned aerial vehicle 1302 includes a propeller (or rotor) 1304 located on each spar. Each propeller is attached to an electric motor 1306 which drives the propeller 1304, and an electronic speed controller 1308. The unmanned aerial vehicle 1302 further includes sensor arrays 1310. The sensor arrays 1310 may include, but not limited to, cameras, distance sensors, sonar, Lidar (including on-chip Lidar), and LEDs.

Figure 14:
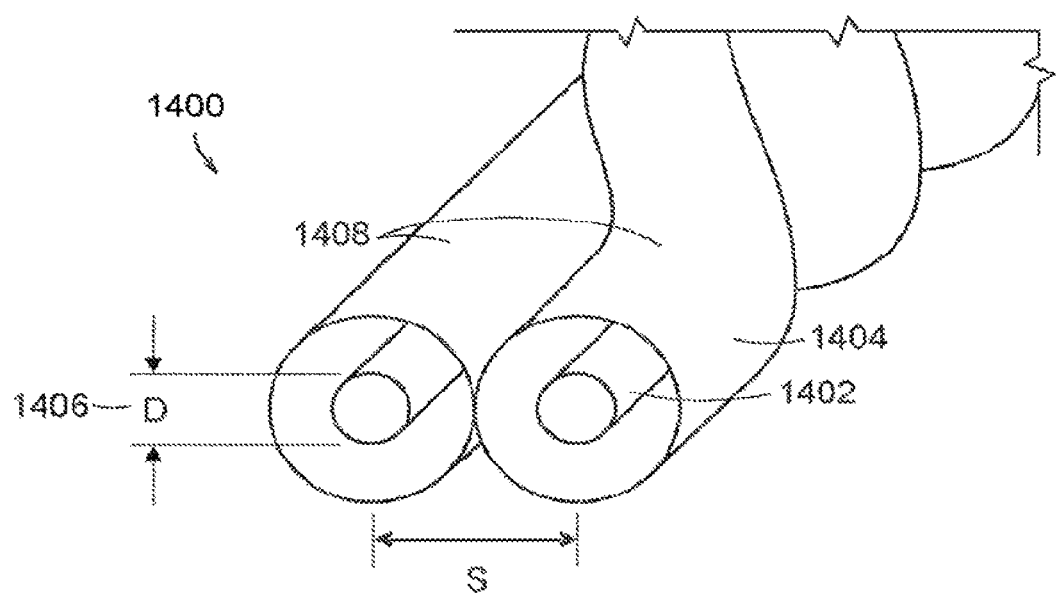
FIG. 14 illustrates a UAV tether comprising magnet wire.

FIG. 14 illustrates a UAV tether 1400 comprising magnet wire. Magnet wire is a copper or aluminum wire 1402 coated with a very thin layer of insulation 1404. The insulation 1404 may, for example, include the application and evaporation of extremely thin single or multiple layers of lacquer, polymer, or epoxy materials. Prior tethers for electrical transmission of power and/or data to and from drones have used traditional thick polymeric insulation systems to electrically separate the conductors. Use of magnet wire is advantageous in that it allows for light weight, good flexibility, and low cost for single use missions.

In an exemplary embodiment, the UAV uses only 25-40 watts of power, weighs approximately 120-160 grams, and employs 400 VDC at 0.1 amps. Therefore, the wire diameter 1406 may be small. The UAV as described herein can operate with low currents, and has a feature to carry a single disposable microfilament spool that deploys and unspools as the vehicle traverses indoor and outdoor obstacles. Thereafter, the deployed copper 1402 can be rounded up and recycled, with a new filled spool attached to vehicle for another single use mission.

The tether 1400 is a single pair of impedance controlled wires that can deliver power and data from a fixed base station to the UAV. In an exemplary embodiment, the tether 1400 is an unshielded twisted pair (UTP) 1408 of magnet wires, comprised of small diameter, flexible copper conductors 1402 having each a durable, relatively thick polymer elastomeric dielectric coating 1404 to prevent DC and AC shorting, and to provide impedance control for the high frequencies used for analog/data transmissions. The UTP magnet wires 1408 (also known as a microfilament) utilize a single or a small number of individual strands. Each strand has the application and evaporation of extremely thin single or multiple layers of lacquer, polymer, or epoxy materials. This is advantageous for single use missions, in that it allows for very light weight, good flexibility, and low cost. The UTP magnet wires 1408 are lighter and smaller in diameter than traditional approaches for providing power to drones/UAVs, such that using operational high voltages subsequently requires low currents. The UTP magnet wires 1408 can be stowed in reels of comparatively small volume.

In an exemplary embodiment, the UTP wire diameter 1406 is 38 gage. The wire diameter 1406 is 0.0034 inches/1.1 mm diameter, and has a resistance of 659 mOhm/ft. This equates to a DC resistance for a 400 foot spooler microfilament length of 460 ohms. The UTP magnet wires 1408 can easily be impedance controlled by knowing the conductor diameter, the insulation thickness and dielectric, the number of twists per inch, according to the following:

$$Z_{O_{twistedpair}} = \frac{120}{\sqrt{\varepsilon_r}} \cdot \ln\left[\frac{2s}{d}\right]$$

The variable Zo for the UTP magnet wires 1408 is approximately 200 ohms, to interface efficiently with the data transmission and delivery circuits. The use of high resistance/small diameter magnet wire does not require the tight impedance control required by larger diameter/lower resistance wires, since an impedance mismatch (and thus interfering reflections) are largely attenuated by the high UTP resistance.

The UTP magnet wires 1408 are extremely flexible since the small diameter 1406 of annealed copper has a coating thickness of <0.001 inches. In an exemplary embodiment, a particularly effective coating system was found to be quad (4 applications) of polyimide insulation (per NEMA standard MW1000-1997 STANDARD). The dielectric breakdown was found to be in excess of 3000 volts, and tolerated a large degree of rough handling/kinking without a single shorting or breakdown event.

As a means of comparison, a standard insulated 38g wire has a jacket insulation thickness of 0.0035 in. This translates to a wire diameter of 0.012 inches, versus the diameter of the magnet wire approach of 0.0051 inches. This is over a 4× increase in volume and about a 50% weight increase per unit length. The implications for a flying vehicle design would be six times less filament carried per equivalent volume/weight of spooled microfilament.

FIGS. 15A-15E show exemplary diagrams for an embedded control system for the unmanned aerial vehicle based on FPGA architecture. It should be appreciated that the embedded control system utilizing an FPGA illustrated in FIGS. 15A-15E is presented for explanatory purposes and the present invention is not limited to the use of one or more FPGAs. For example, the operations performed by the FPGA in FIGS. 15A-15E could also be handled on a microprocessor, single board computer or system on a chip. The embedded control system provides an autopilot function to automatically control an aircraft trajectory of the unmanned aerial vehicle. The control system generally deals with data input by a microprocessor as the CPU, while the processing result is output to the respective peripheral interface, driving the peripherals for unmanned automatic driving.

In certain configurations, the UVA control system (for example, FPGA 1502) is fabricated as one or more integrated circuits that reside on a printed circuit board assembly. The system can operate based on wireless communications under battery power or can operate using power transmitted through a tether. The system can include flight stabilization, camera stabilization systems, and an inertial measurement unit (IMU).

The unmanned aerial vehicle navigates enclosed spaces using image processing and communication integrated circuit board. The image processing and communication integrated circuit board may comprise FPGA as an exemplar processor, although these operations could also be handled on a microprocessor or separate single board computer. The control system includes the FPGA onboard the unmanned aerial vehicle, a base station, sensor arrays, and a number of visual processing equipment. The ground station is coupled to a OCU.

The onboard processor 1504 and SOM 1506 can generate a set of fiducial points describing the flight path, and can maneuver the flight path by altering rotor speed, or altering rotor tilt angle, or a combination of both. For example, processor 1504 transmits signals to one or more motors of the one or more rotors to adjust a configuration of the one or more rotors. For example, exemplary embodiments of the present disclosure can utilize the thrust vectoring system and method disclosed in International Pub. No. WO 2015/187836 A1, entitled "Fixed rotor thrust vectoring," filed on Jun. 3, 2015, the disclosure of which is incorporated by reference herein.

In an exemplary embodiment, processor 1504 transmits instructions over a communications bus to instruct the one or more motors to adjust the one or more of the rotors into a tilted, vertical or horizontal configuration. Such command signals can be sent in response to on-board sensor data indicating that a flight path change is needed to avoid a collision. Alternatively, the system can receive wireless commands from an external flight controller that determines a collision avoidance path must be implemented to avoid a collision with other objects such as buildings or other vehicles. Alternatively a remote pilot can assume control of the vehicle to avoid a collision. For example, the FPGA 1502 may receive instructions from an operator using an operator control unit (OCU) 1514.

The sensor modules 1510 transmit sensor data to the FPGA 1502, which filters the sensor data to create the set of fiducial points that define viable flight paths. The set of fiducial points are based on a distance of one or more objects detected by the sensor modules 1510, wherein the fiducial points are designed to avoid the one or more objects in the operating space.

The embedded control system includes, but not limited to, processor modules 1504, FLASH modules 1505 used to store a control program, RAM modules 1524, FPGA 1502, 1508, sensor modules 1510, camera modules 1512, digital radio module 1513, GPS receiver module. The processor module is based on ARM and FPGA architectures, including ARM processors and coprocessor FPGA.

In an exemplary embodiment, an UAV includes ten (10) sensor modules 1520. Each module 1520 weighs approximately 1 gram and includes two OVM 4622 low light global shutter cameras and a OVM 7695 VGA color imager. The module 1520 further includes an OVM 7695 VGA image analysis engine and a one watt white LED. The module 1520 also includes two laser distance proximity sensors.

The FPGAs 1502, 1508 are responsible for the control of computation and data communications on the UAV. The UAV and base station each includes a silicon on module (SOM) i-MX6 processor. The processor includes a i-MX6 quad-core 2 Ghz mobile applications processor, 4 GB LPDDR2 mobile memory, Wi-Fi capable, and H.264 parallel encoding/decoding engine. The SOM i-MX6 processor transmits packets from various processes by writing into a buffers. The packets have a destination global address and a local address to identify the specific hardware to write or read from. The SOM i-MX6 processor can, for example, turn on and off a motor over the global bus using the address (e.g., address E: 0-5).

In some embodiments, GPS receiver modules are connected via serial communication protocol with the processor 1504 and/or i-MX6 SOM 1506, which receives GPS information in real time and transferred to the autopilot.

The FPGA 1502 receives the output from the plurality of sensors and delivers the organized sensor data directly onto the filament transceiver 1518 or a wireless RF connection. The FPGA 1502 has a global bus connecting the chip components, and communicates with the IMU system and controls the motor speed controllers. Thus, the FPGA 1502 determines the navigational path based on the IMU data and the plurality of sensors viewing in multiple directions.

The user can interact with the UAV through a visual display device, such as a OCU 1514. The visual display device may also display other aspects, elements and/or information or data associated with exemplary embodiments. The UAV may include other I/O devices for receiving input from a user, for example, a keyboard and a pointing device coupled to the visual display device. The UAV may include other suitable conventional I/O peripherals. The OCU 1514 can run an operating system, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, any operating systems for mobile computing devices, or any other operating system capable of running on the computing device and performing the operations described herein.

The sensor module 1520 includes OVM 7695 Mobile Industry Processor Interface (MIPI) Cameras 1512. Video data from cameras 1512 is transmitted to MIPI camera receivers. MIPI camera receivers/decimators transmit video data via video bus (VBUS) to FPGA 1502, which is a PCB on the UAV. The video data is routed through the dedicated VBUS. Video data is received by image processing modules in FPGA 1502. Each image processing module processes data for 1 camera, scaling and locating each camera's video stream. Image processing modules output are combined into one output (scaled and lower bandwidth) and transmitted to a dram controller 1522. The dram controller 1522 stores video data into memory 1524. Dram controller 1522 transmits video data to MIPI video driver 1526. MIPI video driver 1526 transmits video data to the SOM 1506. The SOM 1506 transmits video data over microfilament 1518 to the FPGA 1508 on the base station. The base station houses the power conversion and microfilament communication circuitry, as well as the battery and High Voltage safety systems. Video data is received by the SOM 1528 in the base station. The SOM 1528 transmits video data over USB to operator control unit (OCU) tablet 1514. The OCU 1514 displays the video streams from the unmanned aerial vehicle, and accepts high level operator commands for unmanned aerial vehicle control.

At least one sensor of 1510 includes a VL6180 proximity sensor (other embodiments may include a different proximity sensor) that provides time-of-flight sensor data, ambient light sensor data, and illumination with IR emitters. Sensor data is packetized for transmission on the global bus (GBUS), for example. All data besides video data is routed through the GBUS. Users of continuous sensor information do not need to request the information, they just retrieve data from the global bus. Sensor data is transmitted via the global bus to UAV PCB. Sensor data is received by the processor 1504, which in some embodiments is a STM32 subsystem processor PX4. The processor 1504 is for autopiloting and for high voltage monitoring, and controls the motor controllers based on the sensor data, which can include the IMU data. The processor 1504 receives data from the IMUs. The processor 1504 transmits instructions to an FPGA 1530 (e.g., lattice X03) for the spindles. FPGA 1530 controls motor circuits for spindles. Sensor data is transmitted through the global bus on vehicle PCB and into the base station.

In the exemplary embodiment, at least one sensor module 1520 is a proximity and ambient light sensing module and includes a VL6180X proximity sensor. The VL6180X provides fast, accurate distance ranging, and measures absolute range from 0 to above 10 cm (ranging beyond 10 cm is dependent on conditions). This provides near field absolute distance to be measured independent of target reflectance. Instead of estimating the distance by measuring the amount of light reflected back from the object (which is significantly influenced by color and surface), the VL6180X measures the time the light takes to travel to the nearest object and reflect back to the sensor (Time-of-Flight). The VL6180X combines an IR emitter, a range sensor and an ambient light sensor in a three-in-one optical module. The module is designed for low power operation. Ranging and ALS measurements can be automatically performed at user defined intervals. Multiple threshold and interrupt schemes are supported to minimize host operations. Host control and result reading is performed using an I2C interface. Optional additional functions, such as measurement ready and threshold interrupts, are provided by two programmable GPIO pins.

In alternative embodiments, the sensors 1510 may include one or more of a radar sensor, an inertial measurement unit (IMU) sensor 1516 which includes a gyroscope and an accelerometer, a GPS sensor, a Lidar sensor, and a pressure sensor. The sensors have 5 lanes and all 5 lanes have to go fail to lose communications (video bandwidth will degrade but not stop as lanes fail).

The control system can include a tether 1518 capable of secure transmission and receipt of data placed on the tether or transmitted and received wirelessly. The tether 1518 may be configured to transmit and receive data via one or more network devices with one or more networks, for example, using a tethered connection or a wireless connection, or some combination of the above. The tether 1518 may include a built-in network adapter, network interface card, wireless network adapter, USB network adapter, modem or any other device suitable for interfacing the UAV to any type of network capable of communication and performing the operations described herein. In one embodiment, the tether 1518 is a serial link, which may include a commercially available twisted pair transceiver integrated circuit.

The UAV can utilize an IMU 1516 to provide respective absolute estimate of the UAV position, orientation, and speed at each clock interval. The scheme utilizes an IMU 1516 and a GPS sensor. In additional embodiments, the UAV can utilize a GPS sensor, an IMU, and/or optional additional relative motion sensors. The IMU 1516 can provide an estimation of the UAV acceleration and/or angular velocity. The GPS sensor can provide an estimation of the absolute position and/or velocity of the UAV. The relative position and/or velocity sensor (e.g., vision sensor, lidar, ultrasonic sensor, time-of-flight or depth camera, or any other sensor that provides relative position and/or velocity information) can be used to obtain an estimation of the UAV velocity and relative UAV position. Further, the GPS can facilitate continuous monitoring of the position of the UAV. The processor may act on the positional data provided by the GPS to allow the UAV to traverse and record particular flight paths. The GPS module may also report back an actual GPS position of the UAV to a base station. The clocked IMU data and other relative sensors can be used to estimate vehicle position between GPS points or if the GPS signal is temporarily unavailable.

The processor 1504 and other control components may communicate via wireless signals when the tether 1518 is disconnected. Accordingly, in one embodiment, the processor and/or other control components or sensors described herein may comprise wireless controls or sensors, or a wireless data receiver or transceiver interface.

The Lidar sensor 4508, which measures distance to a target by illuminating that target with a laser light, provide detection of objects, reliable distance measurement, collision avoidance and driver assistance. Data provided by the Lidar sensor 4502 is used by the control system 4400 to compute updated rotor speed to avoid collisions.

In one embodiment, in autonomous flight modes, the UAV uses onboard sensing information to calculate absolute and relative state information, compare the current state with the planned mission path, and generate commands to move the vehicle close to the planned mission path. In addition to a pure waypoint plan, autonomous behavior macros enable specification of a plan in terms of higher level actions e.g., "travel 40 ft down the pipe" (waypoint driven); "when waypoint n is reached, conduct a detailed scan of all structures within a 5 ft sphere at a sensor standoff distance of 1 ft." (behavior macro). Mission planning software calculates a nominal trajectory, and onboard autonomy monitors the execution of the trajectory and updates the execution plan at pre-planned or sensed events. An event can be a combination of a location, distance travelled, time, sensed environmental condition, sensed vehicle state, or received user command. Autonomous behaviors are preferably calculated using the tether direction as a constraint to prevent tether impingement or tangling on environmental structures. In an embodiment, an autonomous behavior may be calculated using visual observations of the tether to identify a "go home" direction.

Figure 15B:
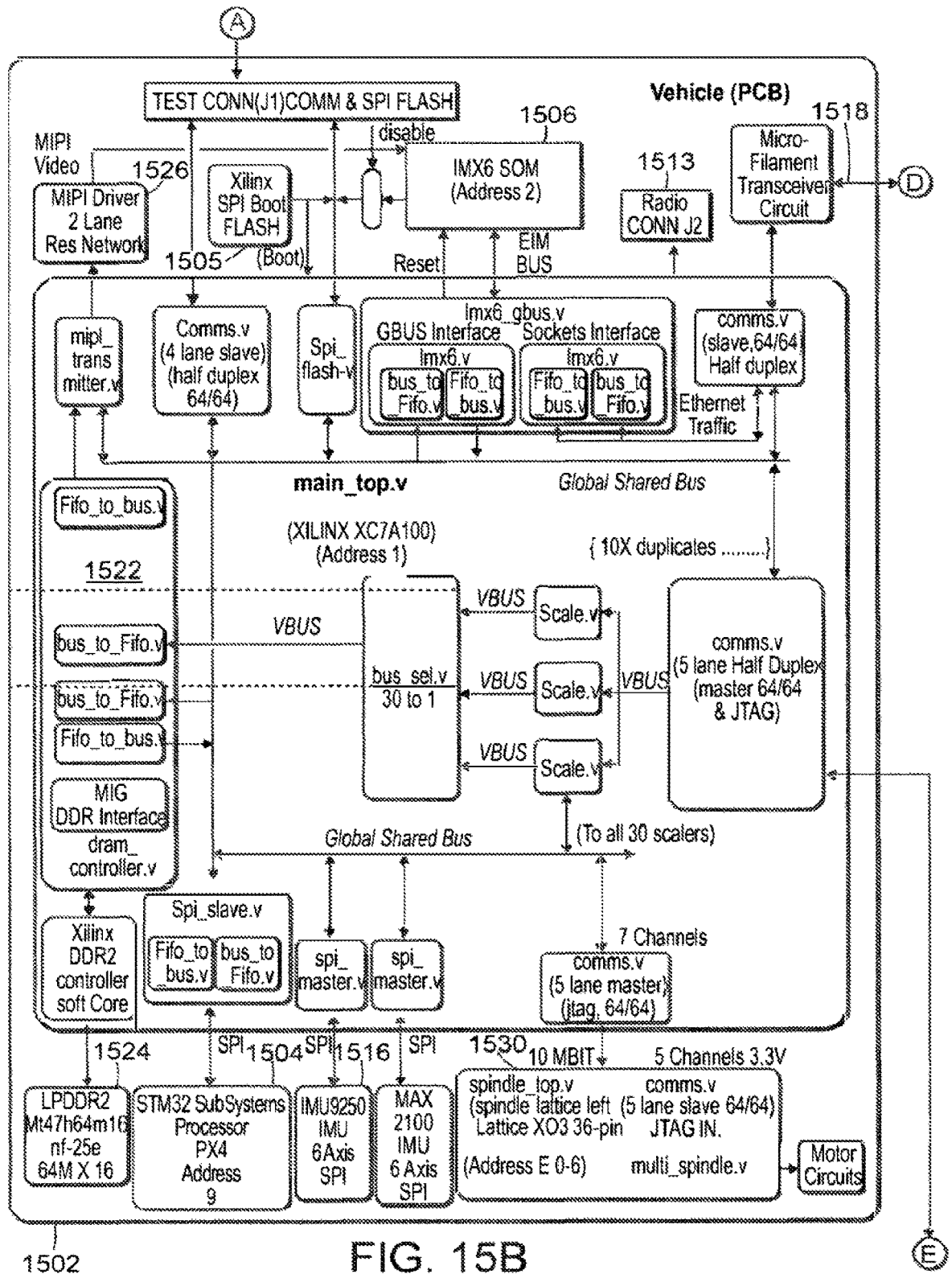
Figure 15C:
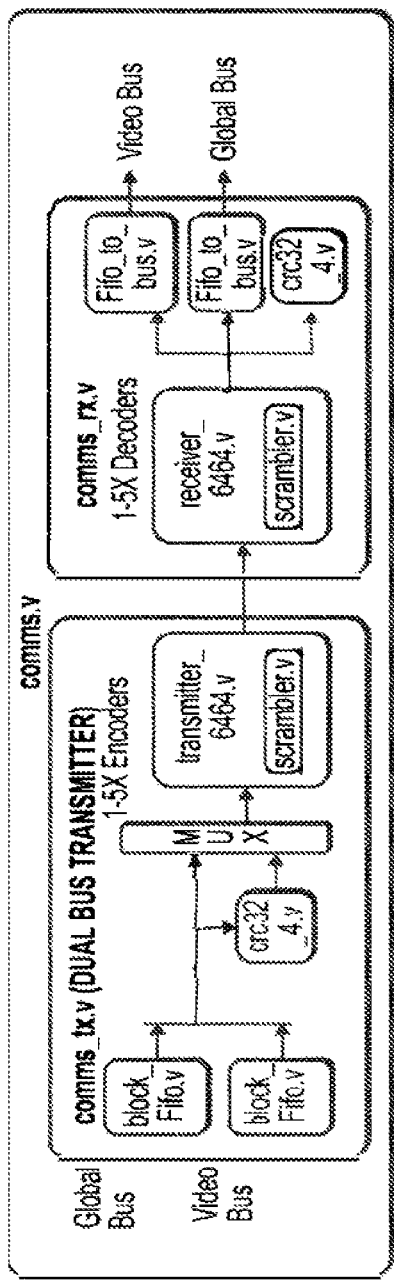
Figure 15D:
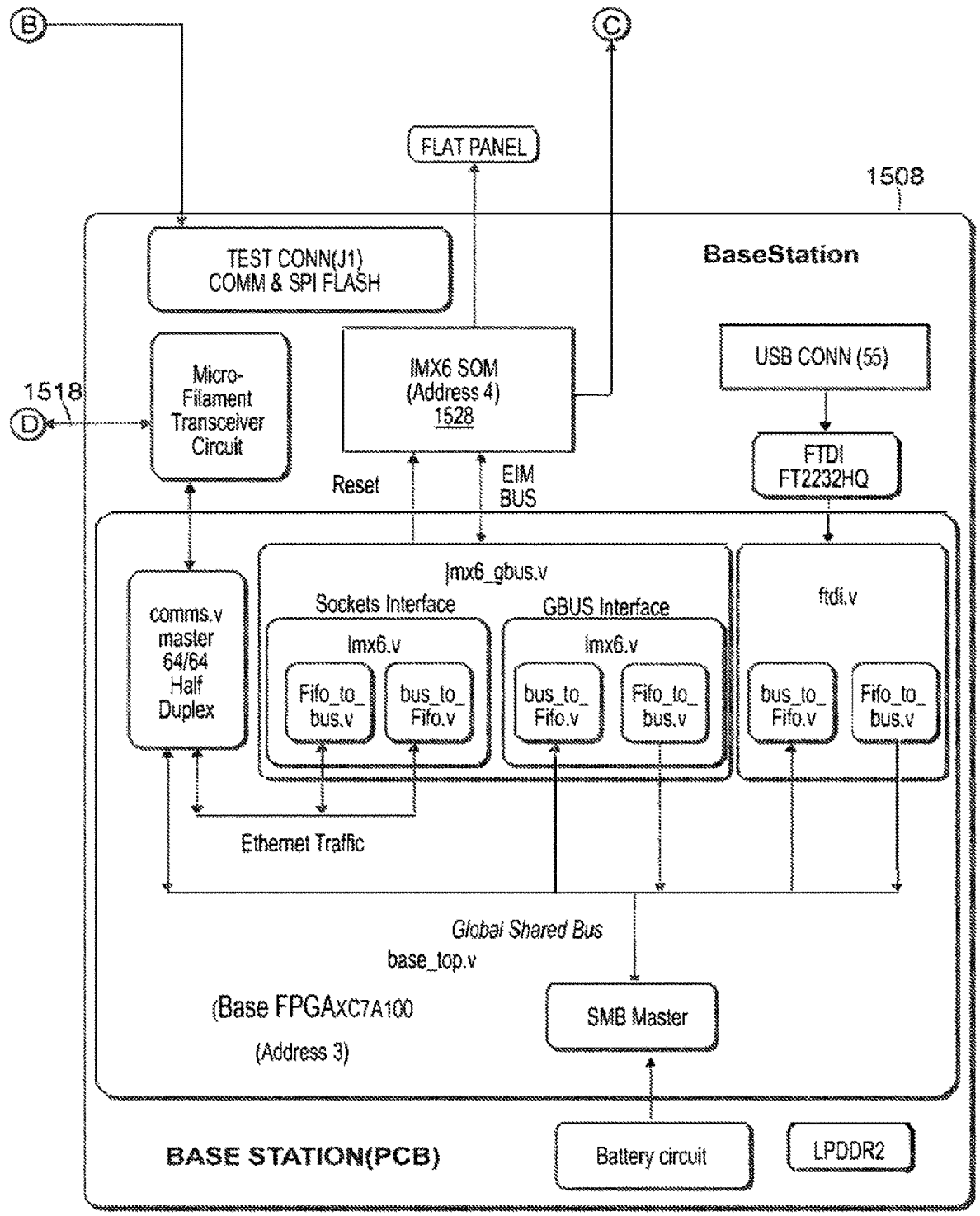
Figure 15E:
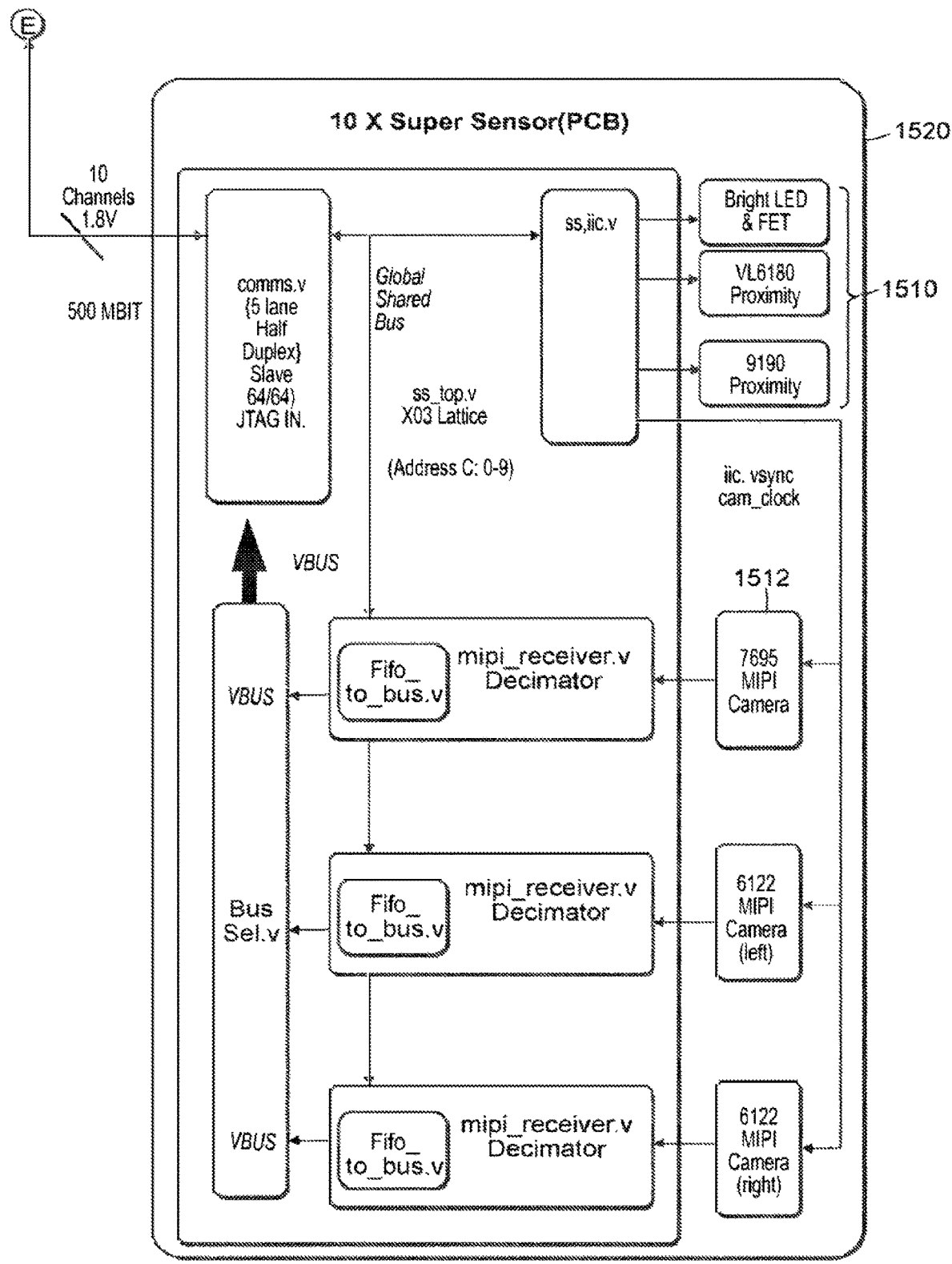
Figure 15F:
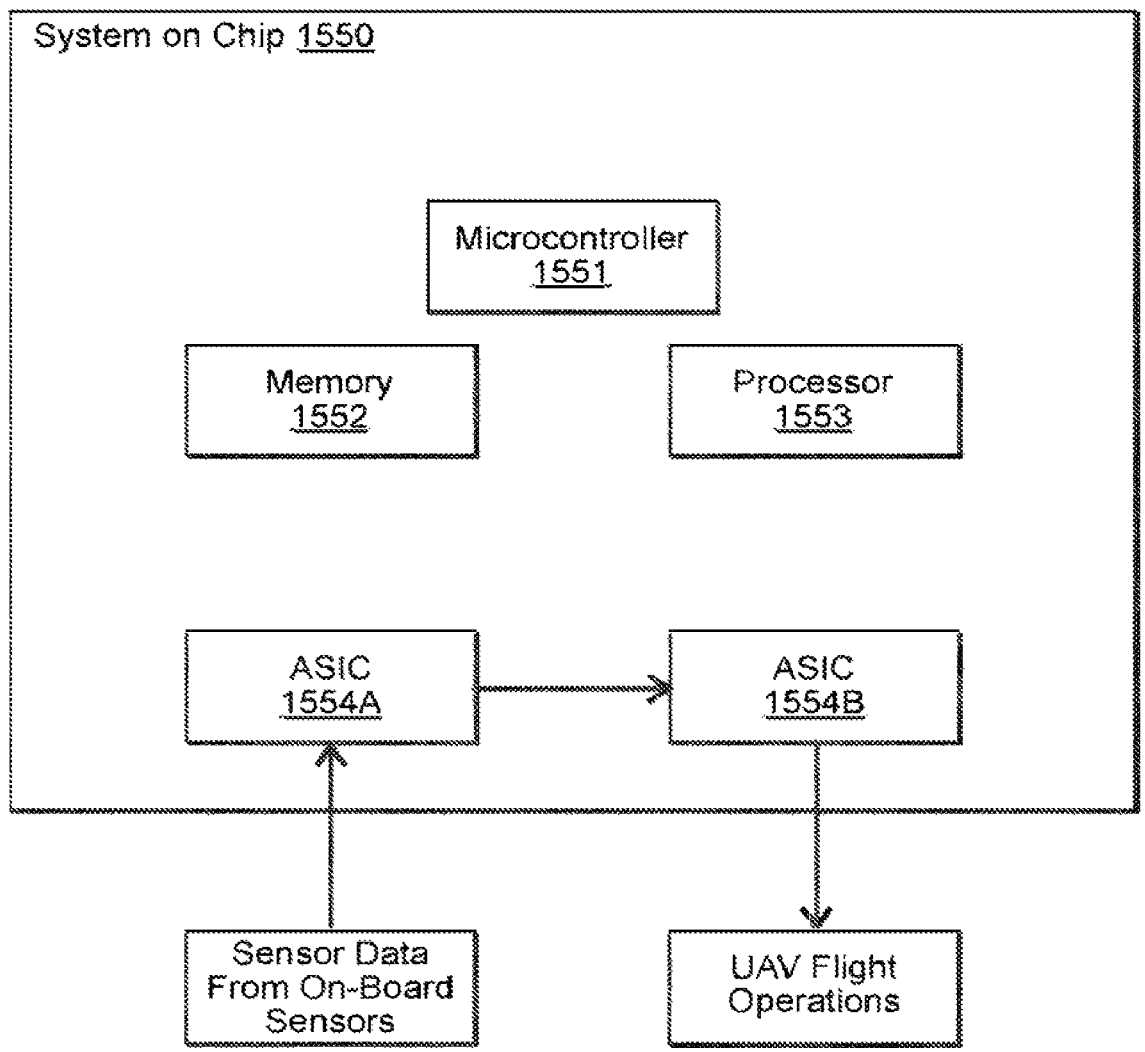
FIG. 15F depicts an SoC used to perform autonomous flight in an exemplary embodiment.

In order to provide autonomous flight modes, some embodiments utilize one or more SoCs with dedicated ICs to perform real-time navigation of the UAV instead of FPGAs. FIG. 15F depicts an SoC used to perform autonomous flight in an exemplary embodiment. An SoC 1550 on a printed circuit board includes a microcontroller 1551 and memory 1552, Memory 1552 may include one or more of ROM, RAM, EEPROM and Flash memory. Memory 1552 may hold the planned mission path. SoC 1550 may also include one or more processors 1553. Processor 1553 may have one or more cores. SoC 1550 may include one or more timers, peripherals, voltage regulators, power management circuits, external interfaces, analog interfaces including DACs and ADCs and co-processors (not shown). SoC 1550 may also include one or more communication interfaces including a wireless interface. SoC 1550 also includes one or more ICs including one or more ASICs 1554. For example in one embodiment, ASIC 1554A may be used to perform centralized processing of sensor data in real-time that is received over the global bus from the onboard sensors. ASIC 1554A may process the on-board sensor data to detect navigation hazards in the upcoming mission path. The processed data results may be provided to ASIC 1554B. ASIC 1554B may be used to perform real-time control of the UAV based on navigation-related objects detected in the processed data to alter the stored mission plan as necessary. For example, ASIC 1554B may alter the amount of thrust to change the UAV's heading to avoid an object detected in the sensor data.

Figure 15G:
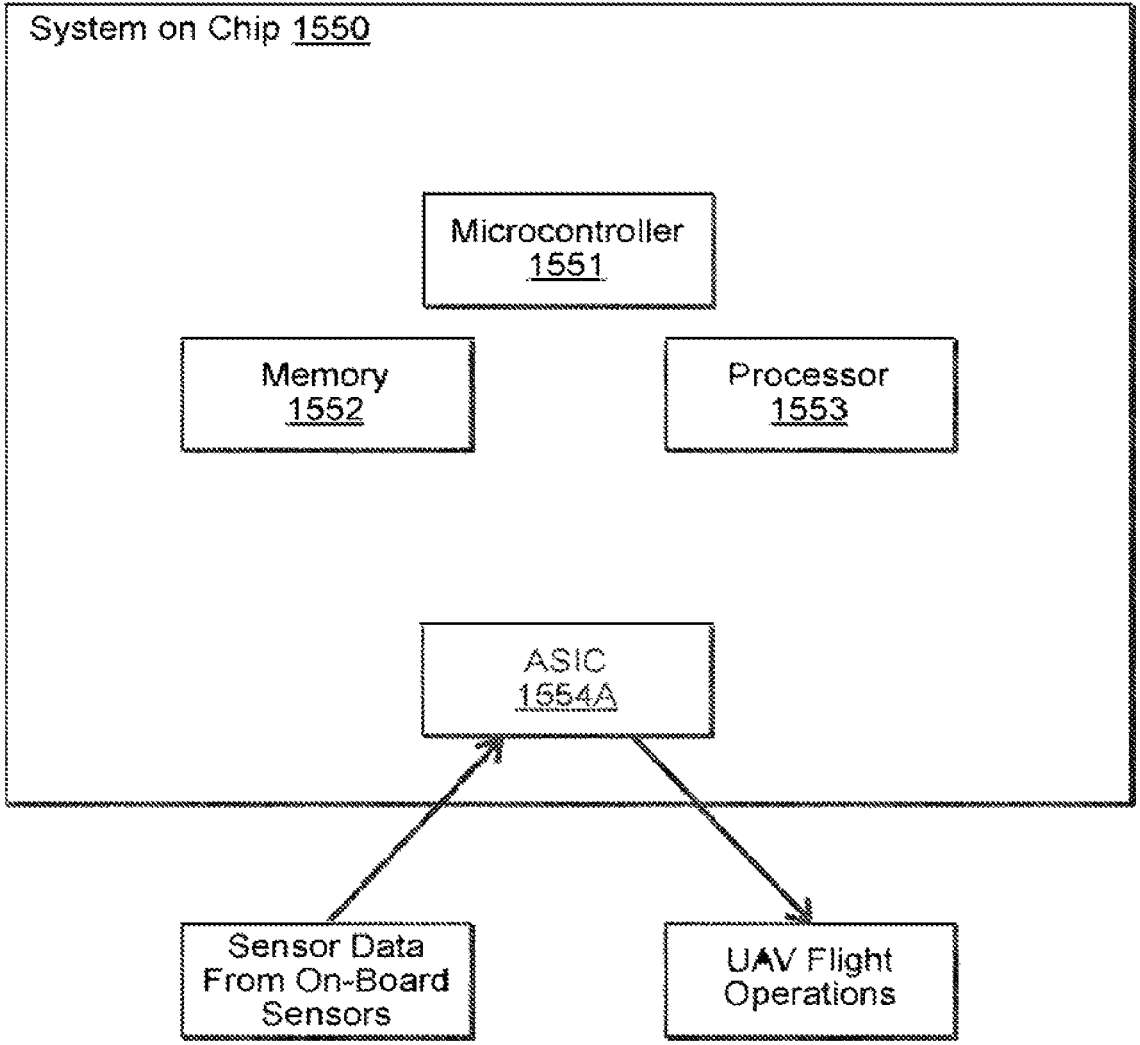
FIG. 15G depicts an alternative SoC used to perform autonomous flight in an exemplary embodiment.

In another embodiment, as depicted in FIG. 15G, the SoC may use a single ASIC for performing both processing of sensor data and real-time control of the UAV.

To process the sensor data and detect navigation hazards or other environmental conditions of interest, a number of different algorithms may be utilized including but not limited to the following algorithms for performing: visual odometry as described at http://www.ros.org/news/2014/06/new-package-svo-semi-direct-monocular-visual-odometry.html (the contents of which are incorporated herein by reference in their entirety); SLAM as discussed at https://dspace.mitedu/bitstream/handle/1721.1/98678/920682960-MIT.pdf?sequence=1 (the contents of which are incorporated herein by reference in their entirety); path planning as discussed in http://acl.mit.edu/papers/LuderslO_GNC.pdf (the contents of which are incorporated herein by reference in their entirety); object recognition, Fisher Vector as described at http://lear.inrialpes.fr/src/inria_fisher/ (the contents of which are incorporated herein by reference in their entirety). Further algorithms for anomaly detection and change detection may also be utilized.

The real-time control of the UAV based on the processed sensor data may also consider additional constraints to dynamically account for the current position of the tether extending from the UAV. For example, in one embodiment, the current location and orientation of the tether with respect to the body of the UAV is constantly monitored. Real-time navigation operations necessitated by identified objects or conditions detected in the mission path are limited based on the tether location.

In one embodiment, the monitoring of the tether location and orientation extends to identifying a location at which the tether is disconnected from the UAV so that a retrieval operation can be later performed.

Figure 16:
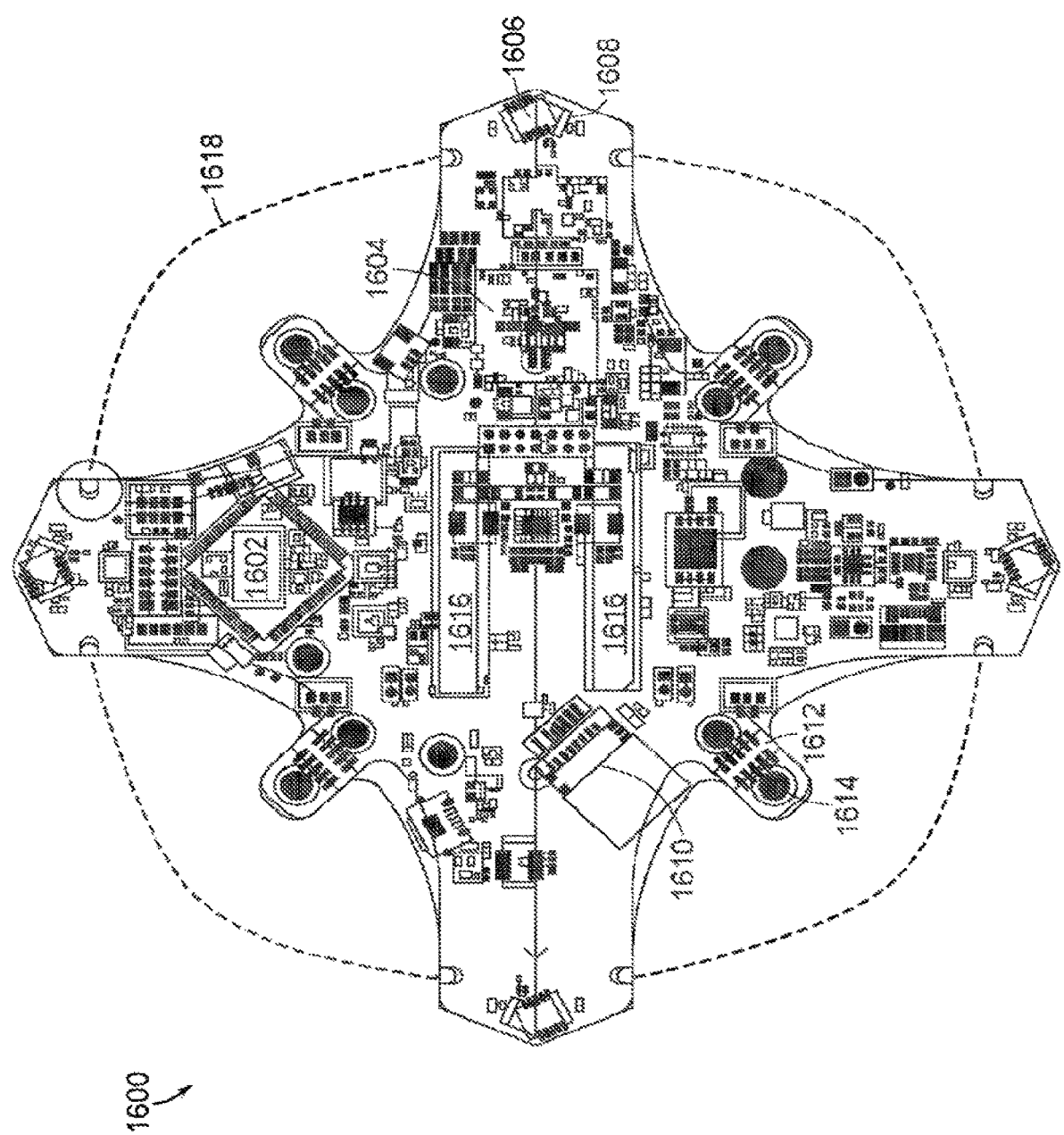
FIG. 16 is a second embodiment of a printed circuit board onboard an unmanned aerial vehicle.

FIG. 16 is an exemplary embodiment of a printed circuit board 1600 onboard an unmanned aerial vehicle. The printed circuit board 1600 includes a 32 bit microprocessor 1702. The printed circuit board includes a FPGA 1704. The printed circuit board 1600 includes a TCP SSM circuit 1706 and a SSM 1708. The printed circuit board 1600 includes a micro SD card 1710, a motor ESC connector 1712, and motor mounting holes 1714. The print circuit board includes nano SOM HDI interconnect 1716. In some embodiments, the printed circuit board 1600 is connected to a battery for untethered flight.

Figure 17:
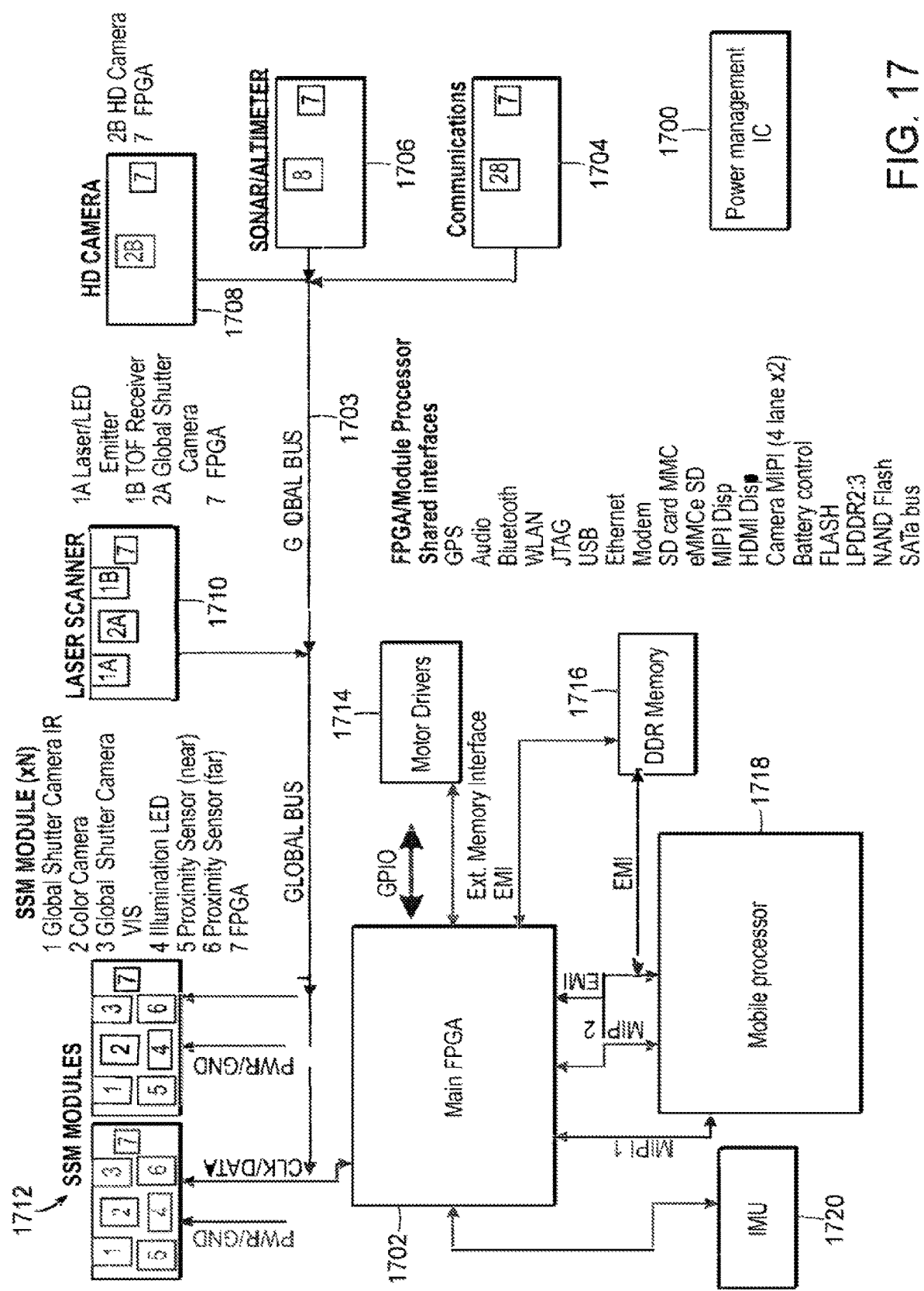
FIG. 17 illustrates a diagram of a global bus in an embedded control system for the unmanned aerial vehicle.

FIG. 17 illustrates a diagram of a global bus in an embedded control system for the unmanned aerial vehicle. A main FPGA 1702 receives data transmitted over a global bus 1703 from a communications module 1704, a sonar altimeter and/or barometric altimeter module 1706, a HD camera module 1708, a laser scanner module 1710, and at least one system software manager (SSM) module 1712. The SSM module 1712 include a global shutter camera IR, a color camera, a global shutter camera VIS, an illumination LED, a far proximity sensor, a near proximity sensor, and a FPGA. The laser scanner module 1710 includes a laser/LED emitter, a time of flight (TOF) receiver, a global shutter camera, and a FPGA. The communications module 1704, the sonar altimeter module 1706, and the HD camera module 1708 each include a HD camera and a FPGA.

The main FPGA 1702 is further in communication with motor drivers 1714, a DDR memory 1716, a mobile processor 1718, and an inertial measurement unit (IMU) 1720.

Figure 18:
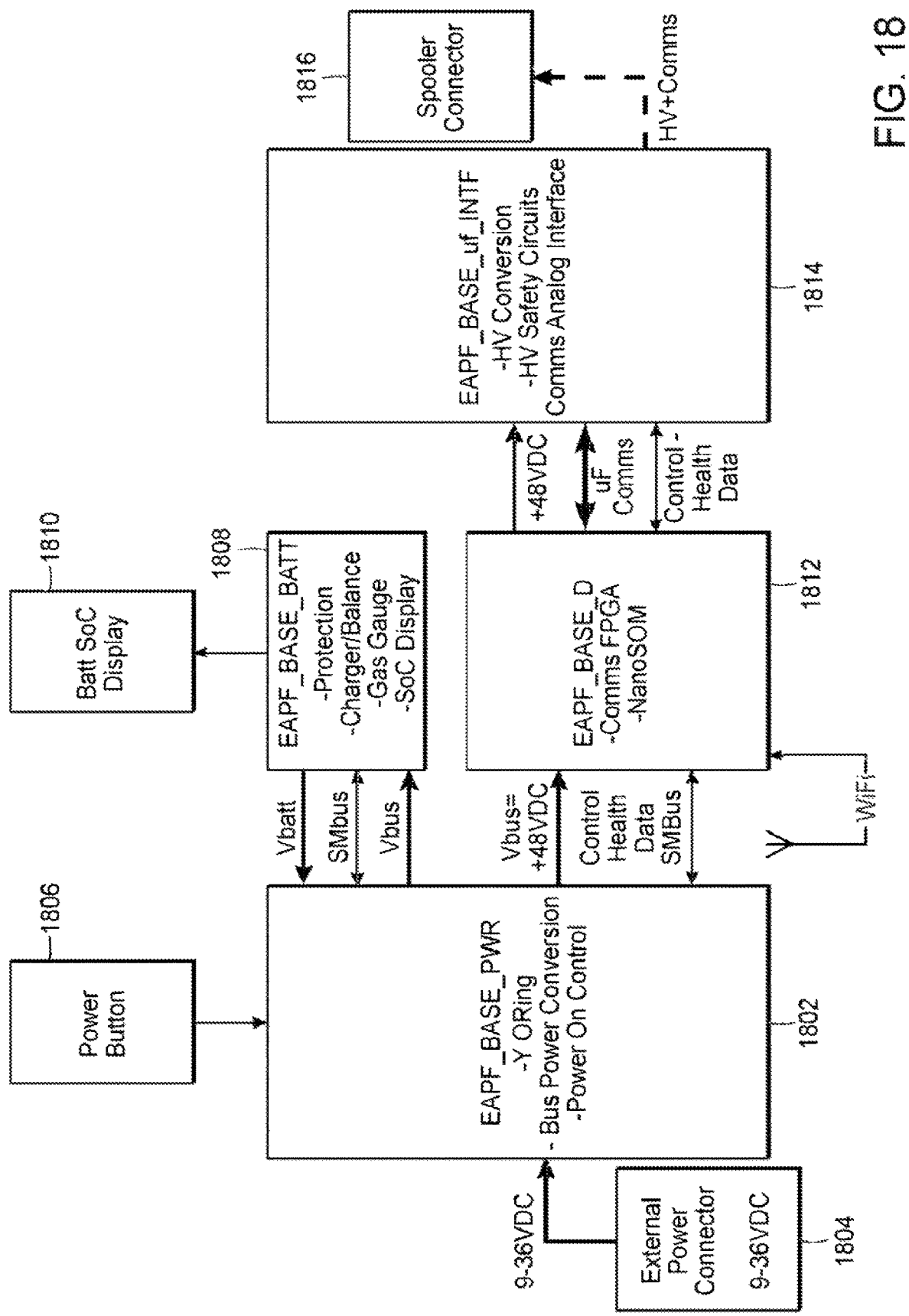
FIG. 18 illustrates an example diagram of a base station electrical architecture.

FIG. 18 illustrates an example diagram of a base station electrical architecture. The electrical architecture of a base station includes a power module 1802, a battery module 1808, a main module 1812, and an interface module 1814. The power module 1802 includes a bus power conversion and a power-on control. The power module 1802 receives power (VDC) from an external power connector 1804. The power module 1802 is also coupled to a power button 1806 used to power on/off the base station. The power module 1802 communicates through a bus with the battery module 1808, including transmitting video data. The battery module 1808 includes charge protection, a charger/balance, and a gas gauge. The battery module 1808 provides video data to a system-on-chip (SoC) display 1810.

The power module 1802 provides power to the main module 1812. The main module 1812 includes a communications FPGA and a nano-SOM. The main module 1812 provides power and communication data to the interface module 1814. The interface module 1814 includes a high-voltage (HV) conversion, HV safety circuits, and communication analog interface. The interface module 1814 transmits voltage and communication data to a spooler connector 1816.

Figure 19:
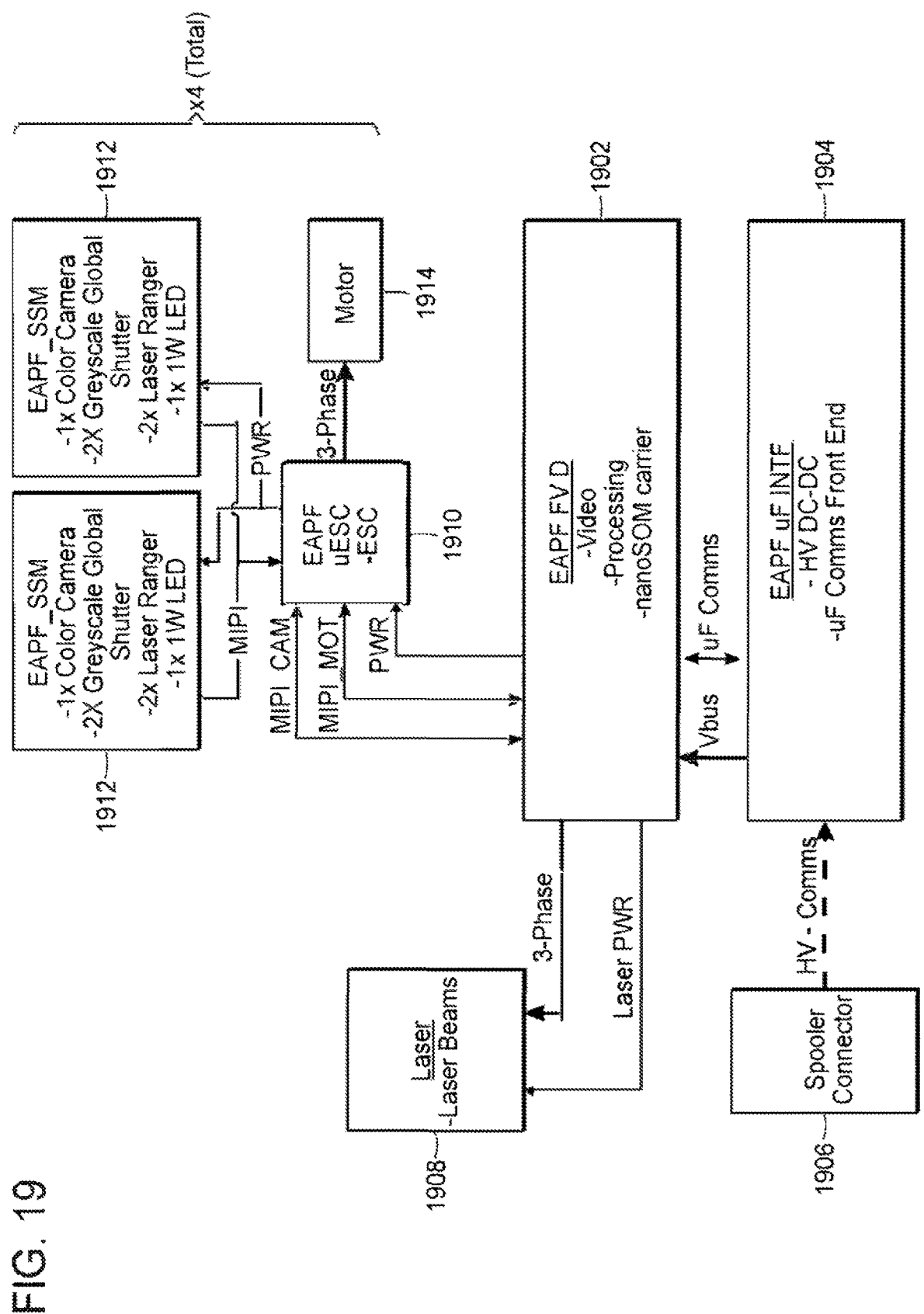
FIG. 19 illustrates an example diagram of an unmanned aerial vehicle electrical architecture.

FIG. 19 illustrates an example diagram of an unmanned aerial vehicle electrical architecture. The electrical architecture of an unmanned aerial vehicle includes a main module 1902, an interface module 1904, a laser module 1908, and at least one SSM 1912. The main module 1902 receives video data (via a video bus) and communications data from the interface module 1904. The main module 1902 includes video processing, data processing, and nano-SOM carrier. The interface module 1904 receives voltage and communications from a pooler connection 1906.

The main module 1902 transmits laser power and 3-phase electric power to a laser module 1908. The main module 1902 further communicates with, and transmits power to, an electronic speed controller (ESC) 1910. The ESC 1910 transmits 3-phase electric power to at least one motor 1914. The ESC 1910 communicates with, and transmits power to, the at least one SSM 1912. Each SSM 1912 includes a color camera, two grayscale global shutter, two laser rangers, and a 1 Watt LED.

Figure 20:
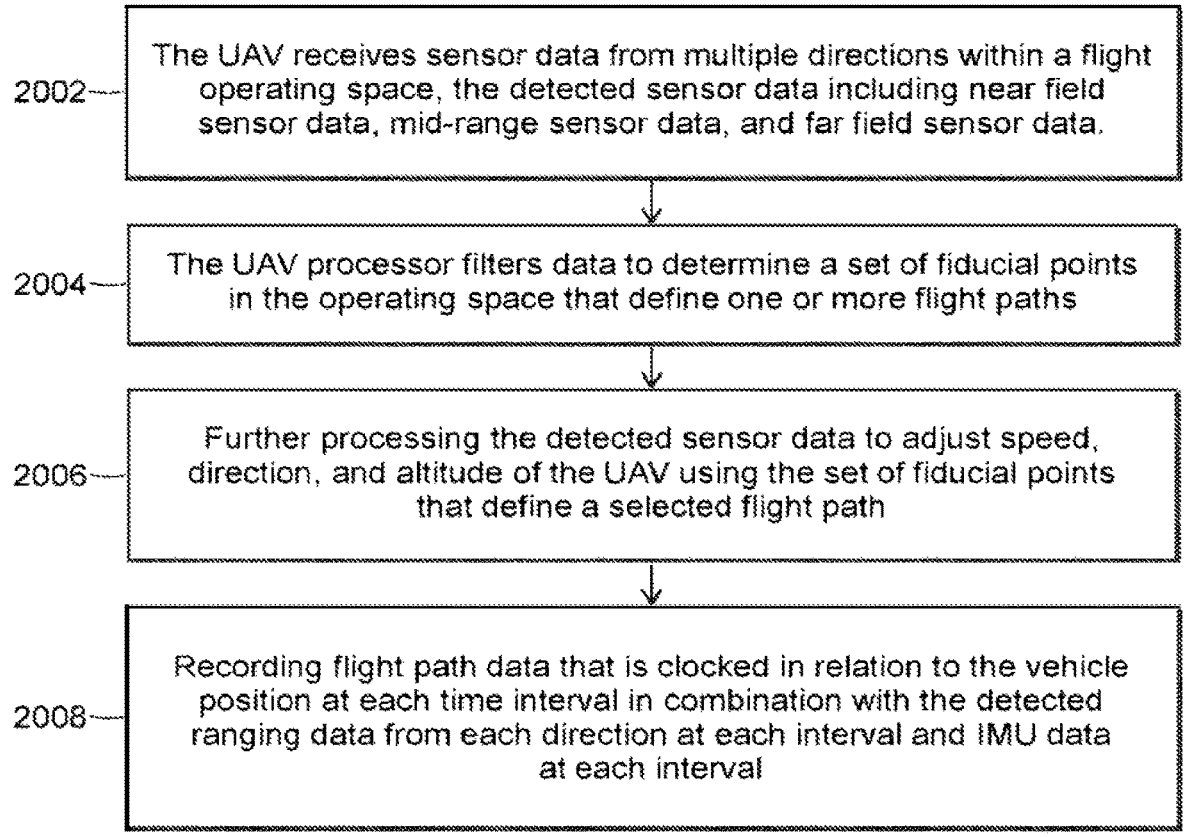
FIG. 20 illustrates an example method for creating a flight path for an unmanned aerial vehicle.

FIG. 20 illustrates an example method for creating a flight path for an unmanned aerial vehicle. At step 2002, the UAV receives sensor data from multiple directions within a flight operating space, the detected sensor data including near field sensor data, mid-range sensor data, and far field sensor data. Each sensor array detects objects, events, and/or changes in the sensor array's field of view. For example, sensors arrays may be attached to each spar of the UAV and may include, but not limited to, cameras and/or range finders, such as sonar, Lidar, or proximity sensors. Adjacent sensor arrays have overlapping field of views, providing a panoramic view enabling the UAV to get a full 360° image of an environment.

At step 2004, the UAV (e.g., an onboard processor and/or SOM) filters noise from the sensor data to generate a set of fiducial points in the operating space describing a flight path for the UAV. In one embodiment, the set of fiducial points are based on a distance of one or more objects detected by the sensor arrays, wherein the set of fiducial points are designed to avoid the one or more objects in the operating space.

At step 2006, the UAV to follow the set of fiducial points that define the flight path. Further processing the detected sensor data to adjust speed, direction, and altitude of the UAV using the set of fiducial points that define a selected flight path. More particularly, instructions are transmitted over a communications bus on the UAV to configure the UAV to follow the set of fiducial points. For example, in one embodiment, a processor embedded on the UAV transmits signals over a communications bus to one or more motors of the one or more rotors to adjust a configuration of the one or more rotors. Such command signals can be sent to follow the set of fiducial points or in response to on-board sensor data indicating that a flight path change is needed to avoid a collision. The UAV can maneuver through the flight path by altering rotor speed, or altering rotor tilt angle, or a combination of both.

At step 2008, the UAV records flight path data that is clocked in relation to the vehicle position at each time interval in combination with the detected ranging data from each direction at each interval and IMU data at each interval.

Figure 21:
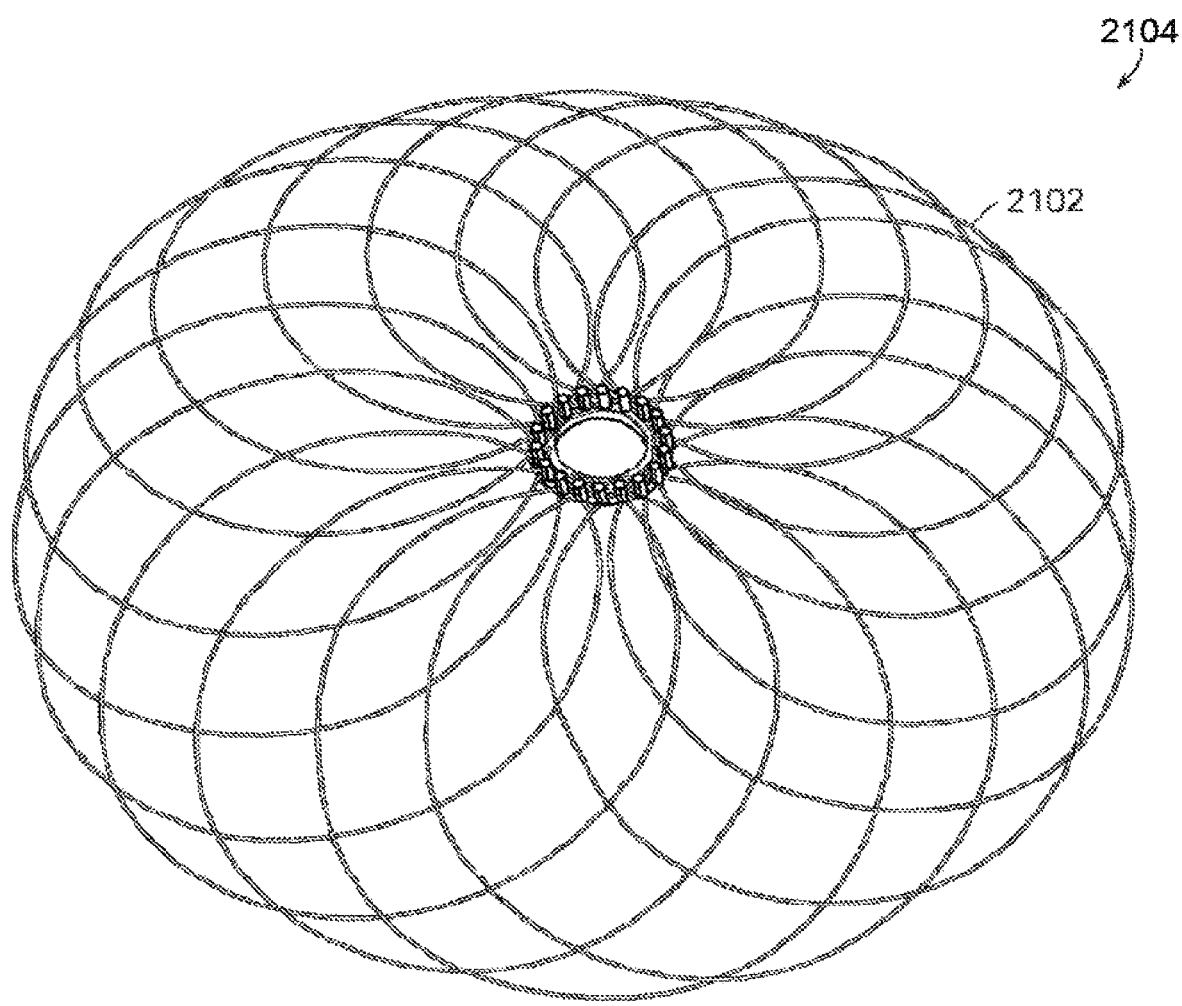
FIG. 21 illustrates wires of a collapsed advanced bump guard.

FIG. 21 illustrates hoops 2102 of a bumper 2104 in a collapsed position. The hoops 2102 of the bumper 2104 can be made into a spherical shape, as shown in FIG. 3. The bumper 2104 can be configured to be bi-stable, so the bumper 2104 can keep its shape in a fully deployed spherical shape or a collapsed position. The hoops 2102 create a physical mesh to prevent injection of microfilament, fingers, and other foreign objects, and becoming ensnared in obstacles when flying.

In one embodiment, each hoop 2102 is comprised of shape memory alloy (SMA), tempered and annealed to a super elastic condition. For example, each hoop 2102 may comprise Nitinol, which can undergo 8% strain energy (vs. 0.1-0.3% for highly tempered SS music wire or carbon fiber). The SMA-comprised hoops 2102 can be tempered to thermally deploy to a spherical shape from a collapsed state upon activation of a heating current. Thus, the bumper 2104 can act as a super zero maintenance "parachute" should the unmanned aerial vehicle suffer malfunction and need to crash. In other embodiments, the hoops 2102 may be composed of a different alloy or a different metal.

Figure 22A:
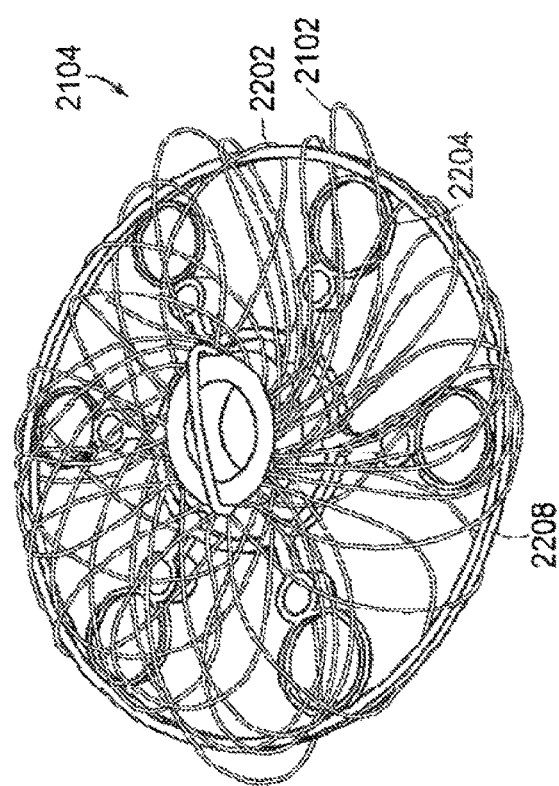
FIGS. 22A-22B illustrates a collapsed advanced bump guard system that includes a frame component for the unmanned aerial vehicle.
Figure 22B:
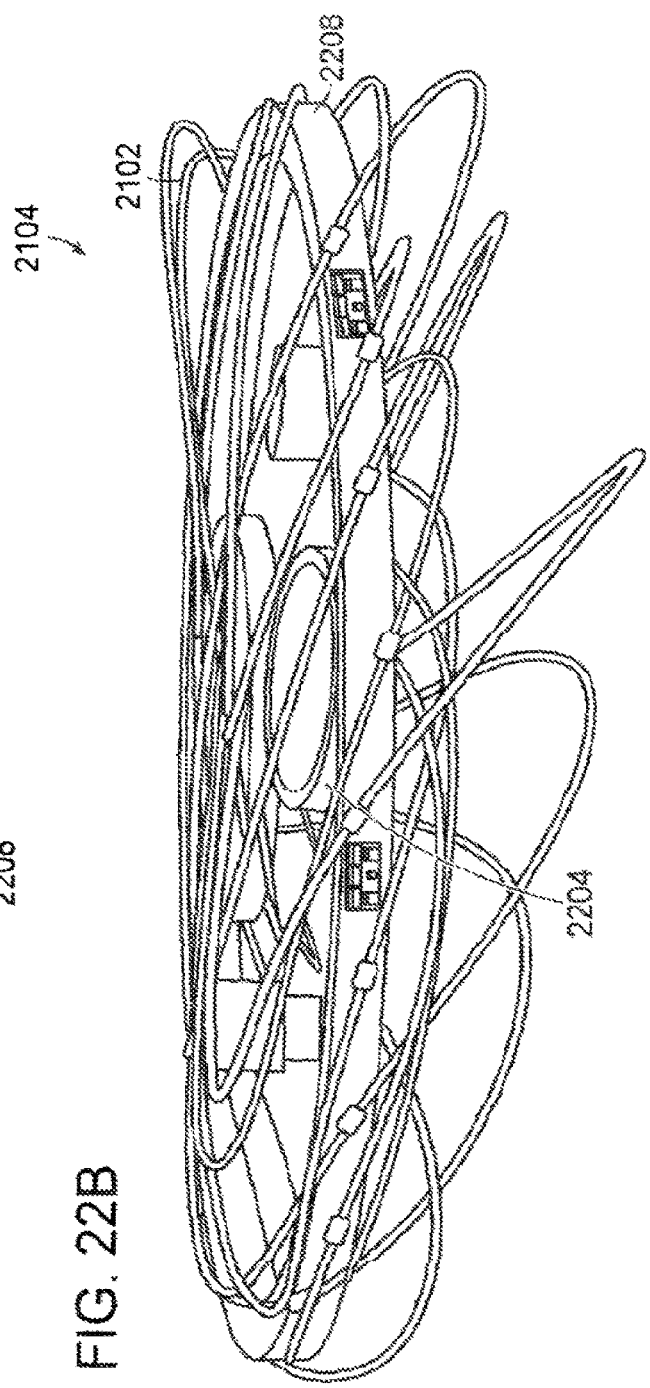

FIGS. 22A-22B illustrates a collapsed bumper 2104 that includes a frame component 2202 for an unmanned aerial vehicle. The frame component 2202 includes a circular bumper 2204 connected to an end of each rotor spar. The frame component 2202 further includes a circular bumper ring 2208 that encircles the unmanned aerial vehicle. Each circular bumper 2204 is connected to an inside of the circular bumper ring 2208. Each hoop 2102 is connected to an outside of the bumper ring 2208, as shown in FIG. 2B.

Figure 23:
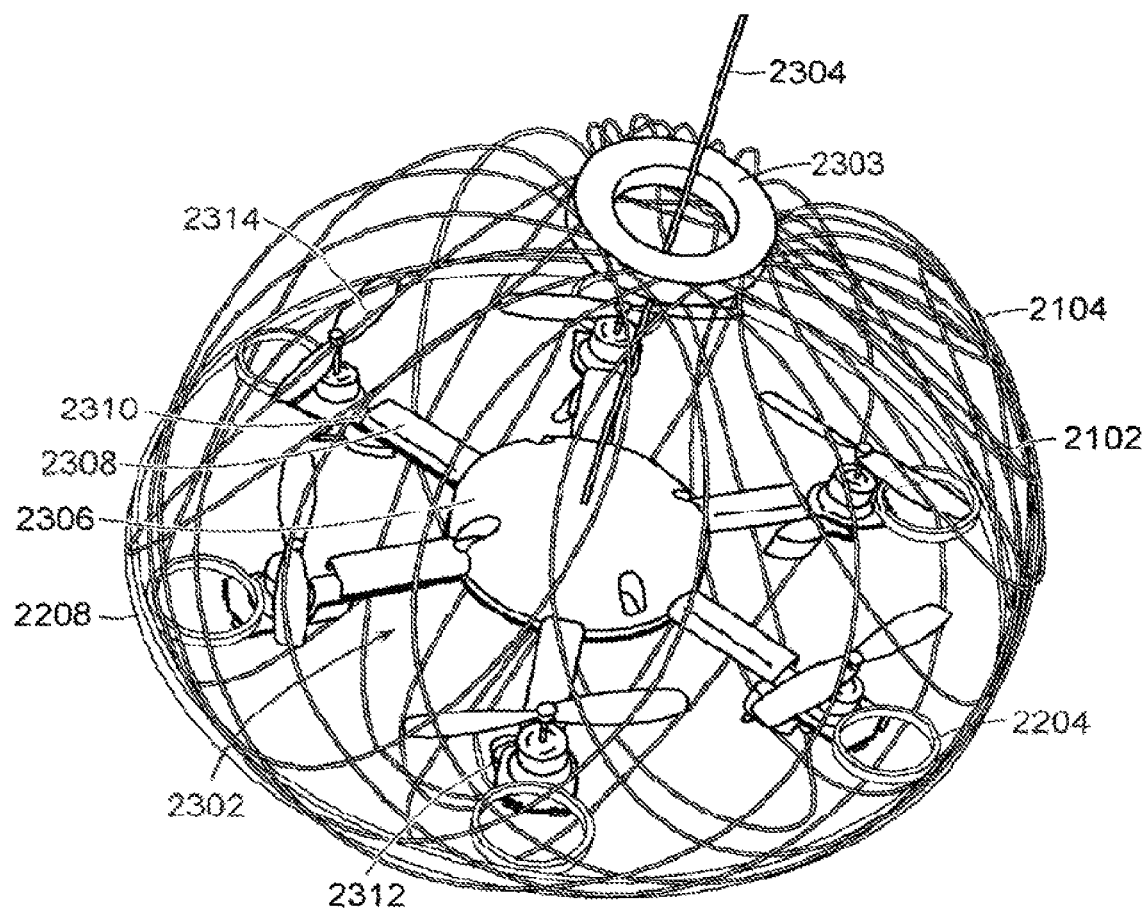
FIG. 23 illustrates a tethered unmanned aerial vehicle that includes the advanced bump guard, in accordance with embodiments of the invention.

The collapsed bumper 2104 can be returned to a spherical shape, as shown in FIG. 23, without damage. The collapse state of the bumper 2104 enables the unmanned aerial vehicle to be kept in a stowed minimal shaped position.

FIG. 23 shows an unmanned aerial vehicle 2302 with six rotors and a bumper 2104 that protects the unmanned aerial vehicle 2302 from bumps against obstacles. A microfilament tether 2304 is attached to the bottom of unmanned aerial vehicle 2302 and extend through an opening tether port 2303 in the bumper 2104. The unmanned aerial vehicle 2302 is connected to a base station through the tether 2304. The tether 2304 enables power and data transfer between the unmanned aerial vehicle 2302 and the base station. The base station is the power and communications hub, and houses the power conversion and microfilament communication circuitry, as well as the battery and high voltage safety systems. The spooler and an interchangeable microfilament dispenser may be installed on the unmanned aerial vehicle 2302. For example, exemplary embodiments of the present disclosure can utilize the tether/spooler system disclosed in U.S. patent application Ser. No. 15/041,211 entitled "Spooler for unmanned aerial vehicle system," filed on Feb. 11, 2016, the entire disclosure of which is incorporated by reference herein.

In the depicted embodiment, the unmanned aerial vehicle 2302 is a multi-rotor helicopter that includes a central body 2306 from which a number (i.e., n) of rigid spars 2308 radially extend. The end of each rigid spar 2308 includes a rotor 2310. In the depicted embodiment, the rotors 2310 are in a horizontal configuration.

The bumper 2104 acts as a rigid cage about the unmanned aerial vehicle 2302. The bumper 2104 absorbs crash energies by acting as springs and energy absorbers. The bumper 2104 includes multiple hoops 2102 generally arranged in a spherical enclosure around the unmanned aerial vehicle 2302. In alternative embodiments, the hoop diameter and/or helix wrap angles may be changed to create a variety of useful shapes. A toroidal shape can be used to enclose the rotors yet provide system that can mount a camera above or underneath the system with a clear field of view and minimize interference with tether operation.

Figure 24:
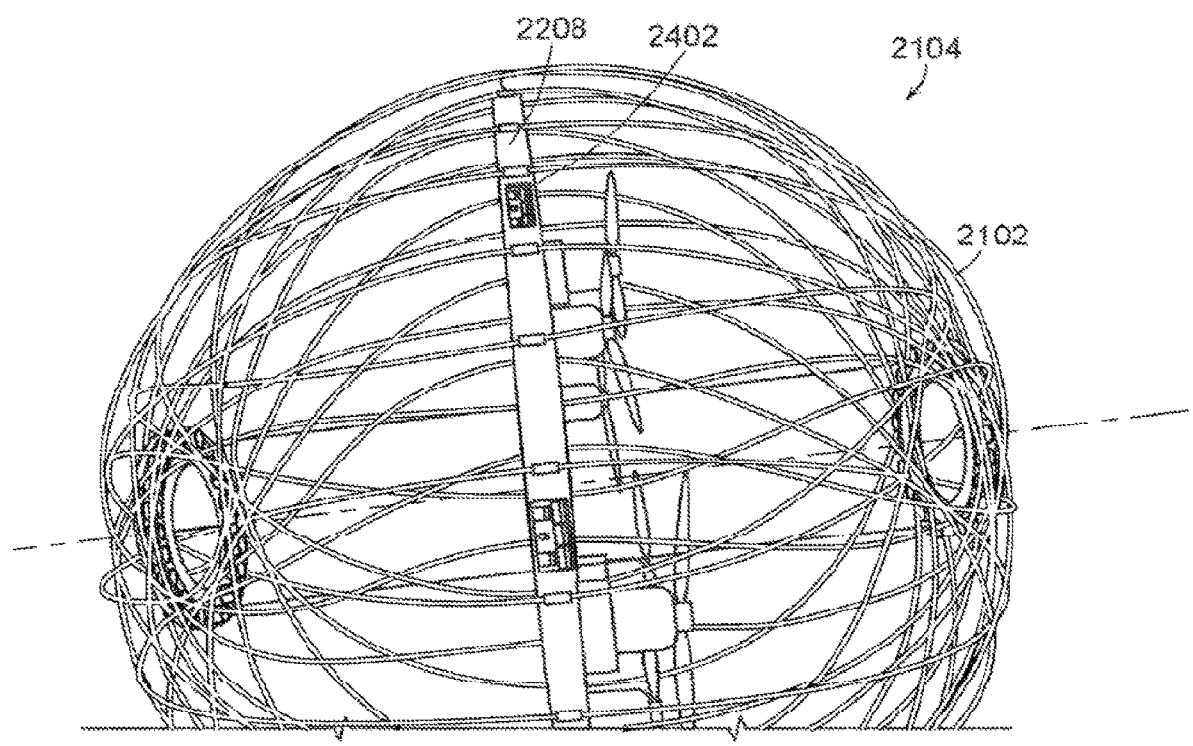
FIG. 24 illustrates a view of the tethered unmanned aerial vehicle that includes the advanced bump guard shown in FIG. 3.
Figure 25A:
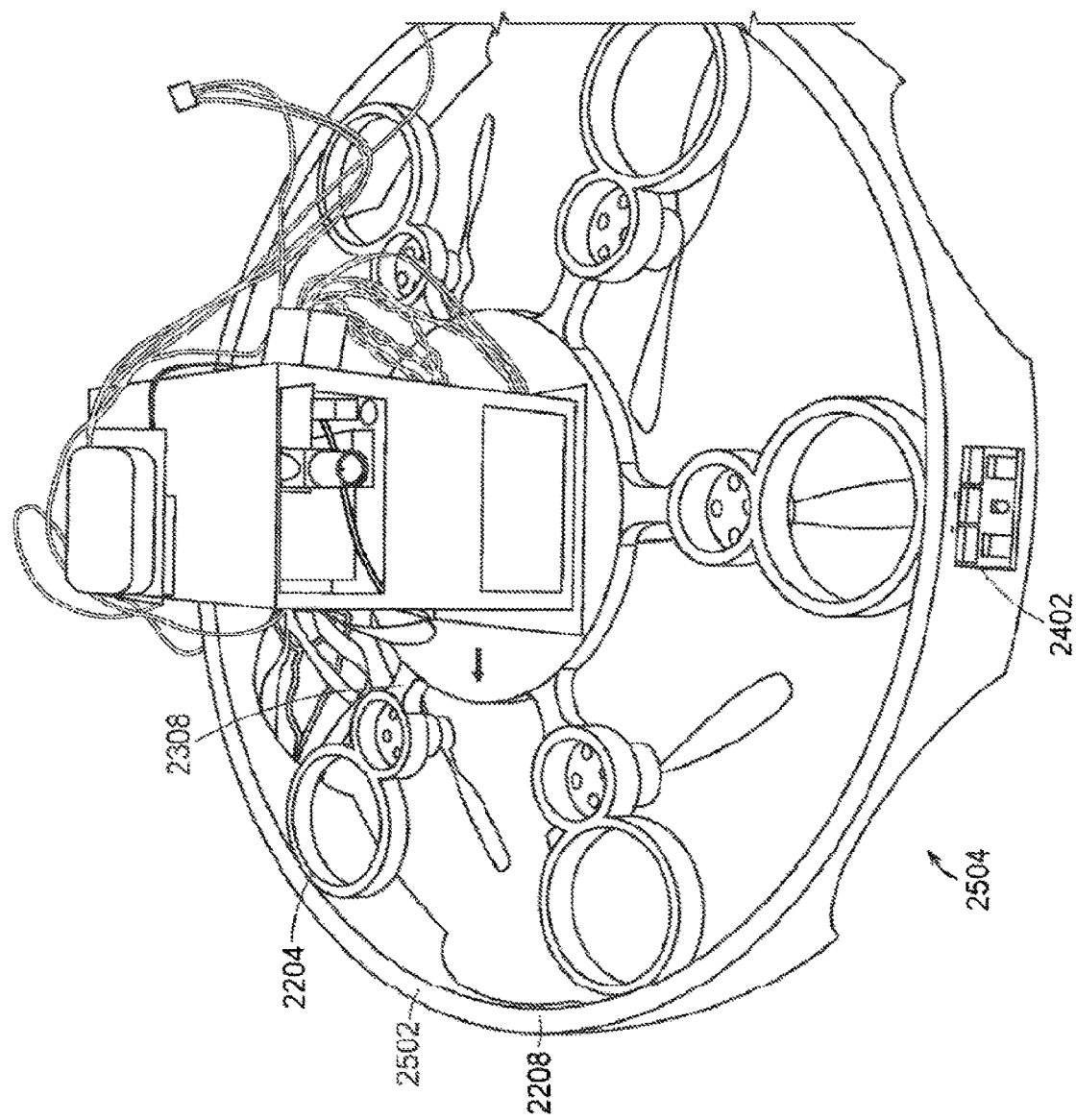
FIGS. 25A-25D shows various views of the frame component of the advanced bump guard.
Figure 25B:
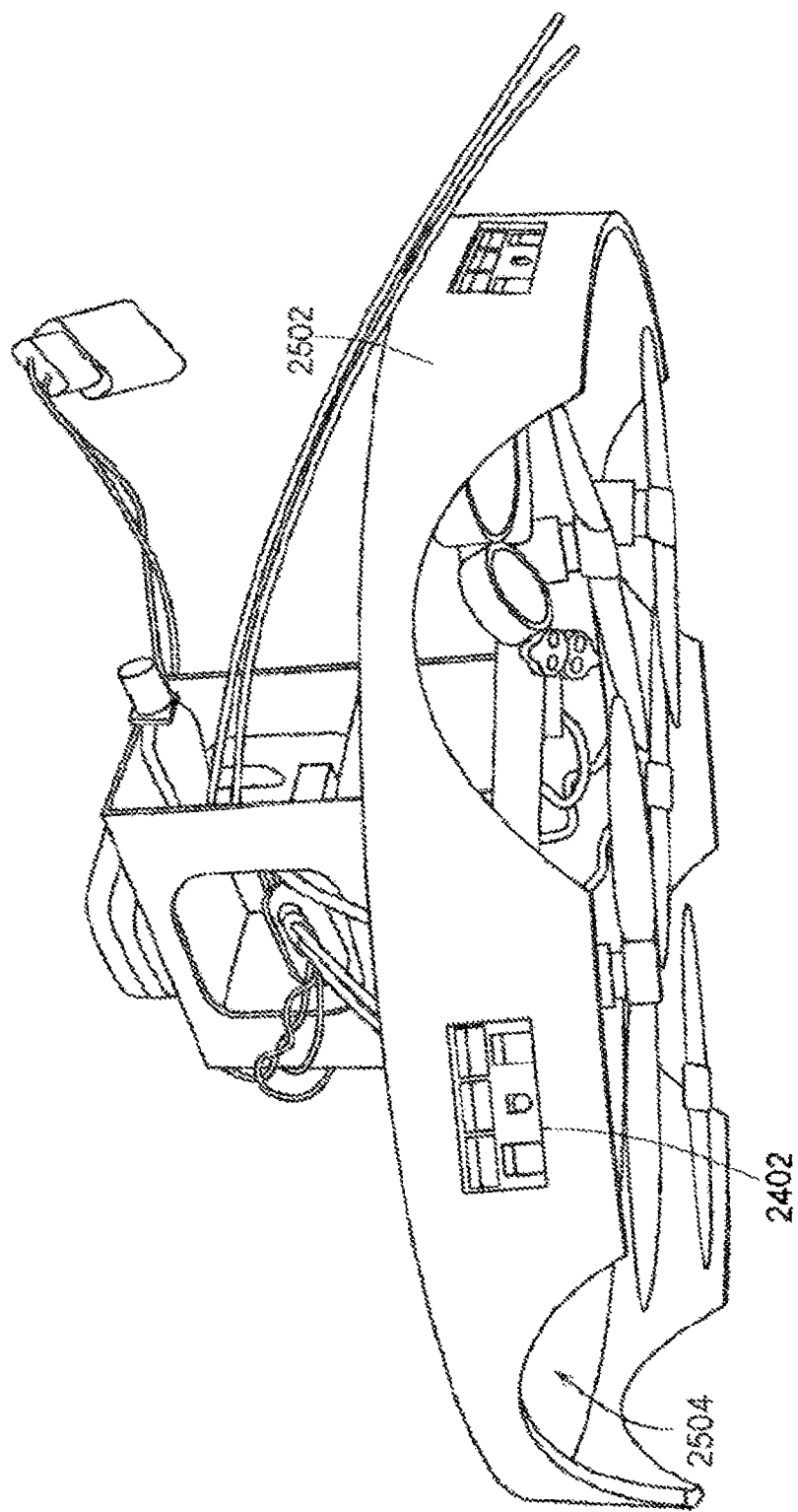
Figure 25C:
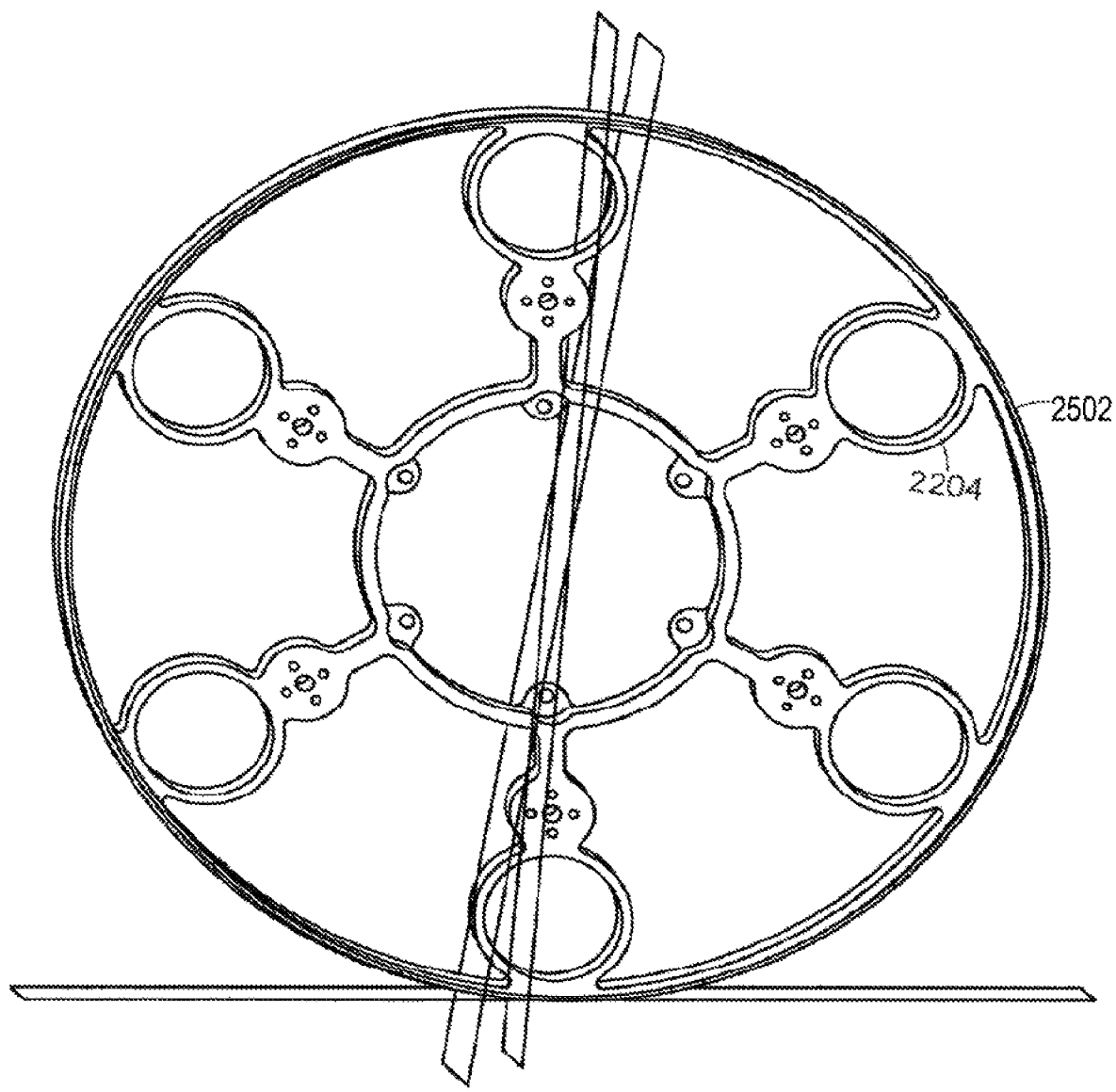
Figure 25D:
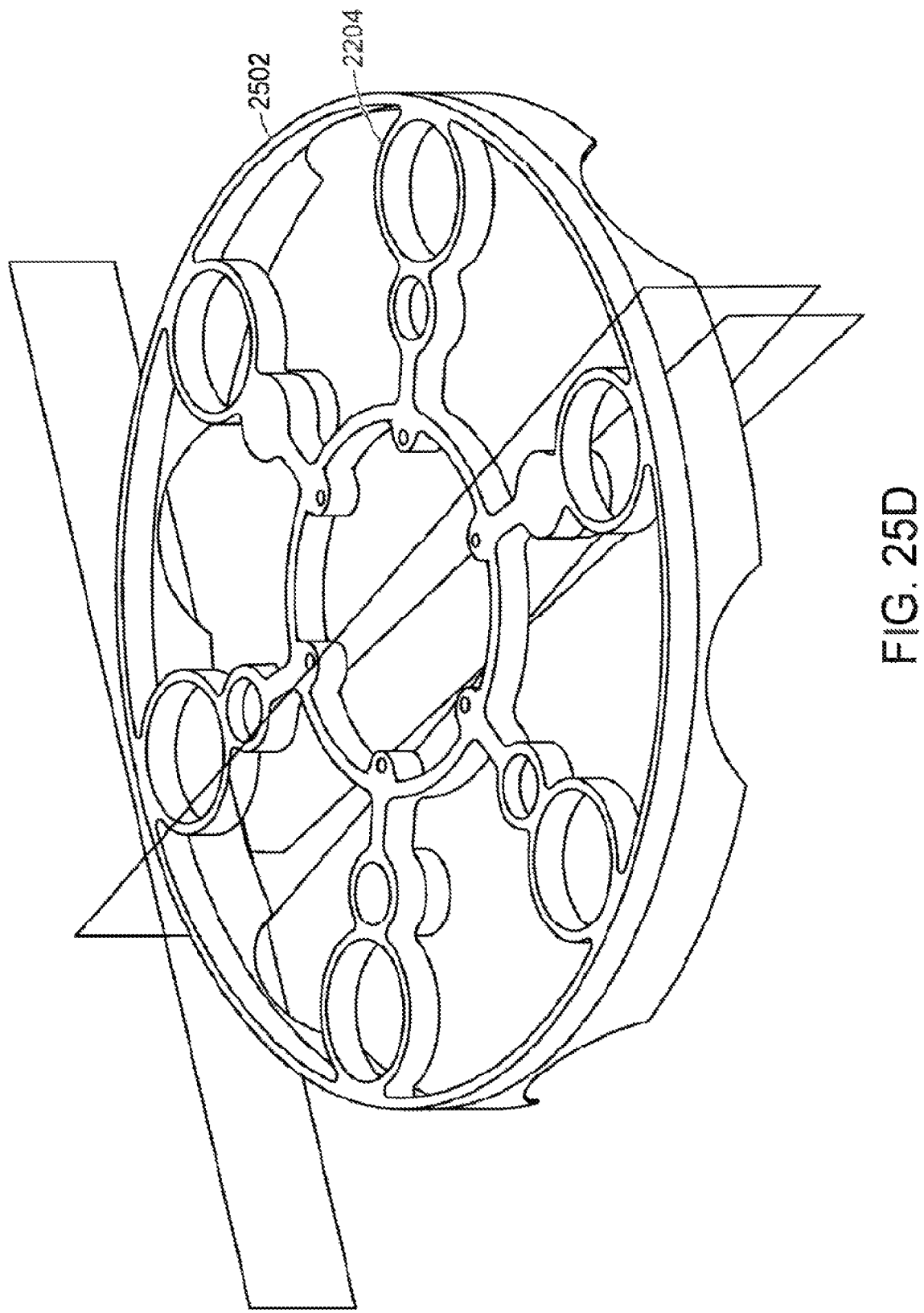

In an exemplary embodiment, the bumper 2104 includes a plurality of sensor arrays mounted to the circular bumper ring 2208 of the frame component 2202, as shown in FIGS. 24-25C. Sensors arrays may include, but not limited to, cameras and/or range finders, such as sonar, Lidar, or proximity sensors. In one embodiment, multiple sensors are placed on the unmanned aerial vehicle 2302 in order to get a full 360° image. The plurality of sensors arrays may be used to detect surroundings. In another embodiment, the sensor arrays are positioned on the unmanned aerial vehicle 2302 to provide a field of view in at least 3 directions that are at least 90 degrees apart to have a clear and unobstructed field of view, each sensor array including an imaging device and a distance measurement device. In alternative embodiments, the sensor arrays may be mounted on each spar 2308 and/or locations on the main body 2306.

In one embodiment, at least one sensor array is a Lidar sensor integrated on a chip (for example, a silicon photonic chip with steerable transmitting and receiving phased arrays and on-chip germanium photodetectors). The detection method in Lidar is based on a coherent method instead of direct time-of-flight measurement, where the system only reacts to the light that was originally transmitted by the device. This reduces the effect of sunlight that can be a large noise factor in Lidar systems, and allows for modest photodetectors instead of expensive avalanche photodetectors or photo-multiplier tubes that are challenging and expensive to integrate in a silicon photonics platform. In addition, the on-chip Lidar is smaller, lighter, and cheaper than traditional Lidar. The on-chip Lidar may also be much more robust because of the lack of moving parts. For example, the non-mechanical beam steering in the on-chip Lidar is 1,000 times faster than what is currently achieved in mechanical Lidar systems, and may allow for an even faster image scan rate. This can be useful for accurately tracking small high-speed objects that are only in the Lidar's field of view for a short amount of time, which could be important for obstacle avoidance for high-speed UAVs.

In an exemplary embodiment, each of the rotors 2310 includes an electric motor 2312 which drives rotor 2310 to generate thrust. In some examples, the motor 2312 may be used to tilt the associated rotor 2310. The motors 2312 may include mount servos used for fine tuning and control of the tilting of rotor 2310. The motor mount servos control the tilting and/or pitch of the rotor by linkage, which tilts the rotor 2310 in various directions or degrees of freedom. When the bumper 2104 bumps against obstacles, the rotors 2310 create thrust and stabilize the unmanned aerial vehicle 2302. Position and attitude stability may be maintained using, for example, LIDAR, SONAR, a magnetometer, a gyroscope, a barometer, and/or an accelerometer. A collision sensor or sensor array can be used to detect point or region on the case or bumper device.

In one embodiment, the unmanned aerial vehicle 2302 is a semi-autonomous high-endurance nano unmanned air system (nano-UAS) meant for operation in close-quarters indoor environments. Key components include a microfilament tether system, an interchangeable spooler cartridge system, and a vision-based teleoperation assistance or autonomous system. The unmanned aerial vehicle 2302 includes all flight systems and sensors. The microfilament tether system includes a spooler, as shown in FIG. 26-27, and an interchangeable microfilament dispenser installed on the unmanned aerial vehicle 2302. The microfilament tether system enables power and data transfer between the unmanned aerial vehicle 2302 and a base station. Exemplary embodiments of the present disclosure may utilize the aerial robots and/or filament disclosed in U.S. Pat. No. 7,631,834 entitled "Aerial robot with dispensable conductive filament" filed on Apr. 19, 2007, the disclosure of which is incorporated by reference herein.

The unmanned aerial vehicle 2302 provides a sensor platform, visual position stabilization, multiple camera sensor modules, and closed loop flight. The nano class airframe is designed for constrained environment operation. Other embodiments can include larger airframes with additional spars and rotors depending on a size and a weight of the payload and the system applications. For example, in alternative embodiments, the unmanned aerial vehicle 2302 can be configured for deliveries. For example, exemplary embodiments of the present disclosure may utilize the delivery methods and systems disclosed in U.S. patent application Ser. No. 14/581,027 entitled "Unmanned delivery" filed on Dec. 23, 2014, the disclosure of which is incorporated by reference herein.

A main body 2306 of the unmanned aerial vehicle 2302 houses a main electronics stack, sensors, and cameras. Each rotor spar 2308 includes an electronic speed controller (ESC) and a motor/propeller mount. Each propeller attaches to a motor 2312 and creates thrust when spun. The motor 2312 spins the propeller 2314 when actuated to create thrust and stabilize the unmanned aerial vehicle 2302.

In some embodiments, the spherical shape of the bumper 2104 enables the unmanned aerial vehicle 2302 to roll when on the ground. By use of reversible motor speed controllers, thrust vectoring can be used to upright the unmanned aerial vehicle 2302 and drive it with precision.

FIG. 24 illustrates a side view of the unmanned aerial vehicle 2302 and advanced bump guard shown in FIG. 23. Sensor arrays 2404 are illustrated along the frame component.

FIGS. 25A-25D shows various views of an embodiment of the frame component 2502 for an unmanned aerial vehicle. The frame component 2502 includes a circular bumper 2204 connected to an end of each rotor spar 2308 and a circular bumper ring 2208 that encircles the unmanned aerial vehicle. Each circular bumper 2204 is connected to an inside of the circular bumper ring 2208.

Figure 26A:
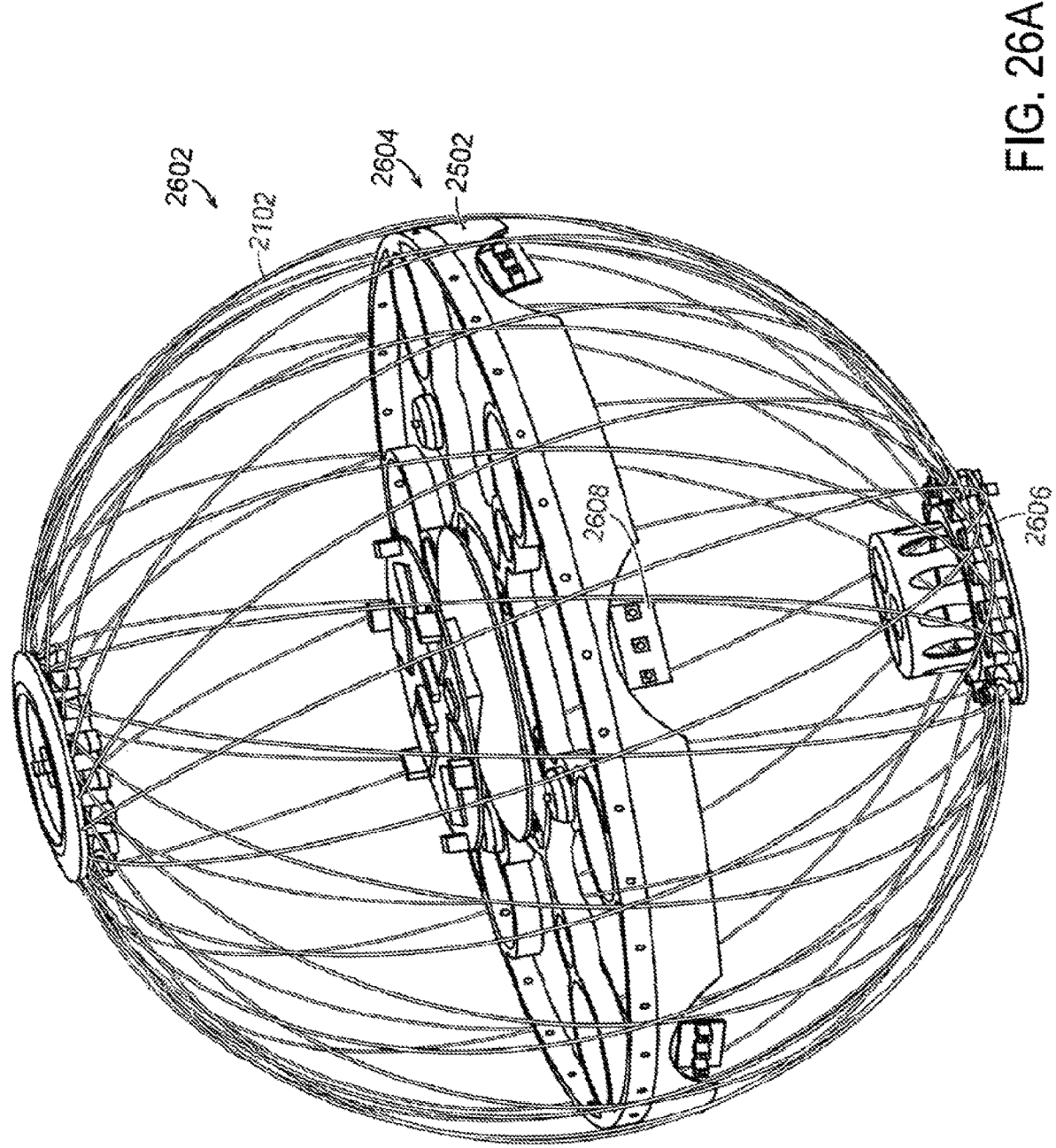
FIG. 26A-26C shows embodiments of the tethered unmanned aerial vehicle that includes the advanced bump guard.
Figure 26B:
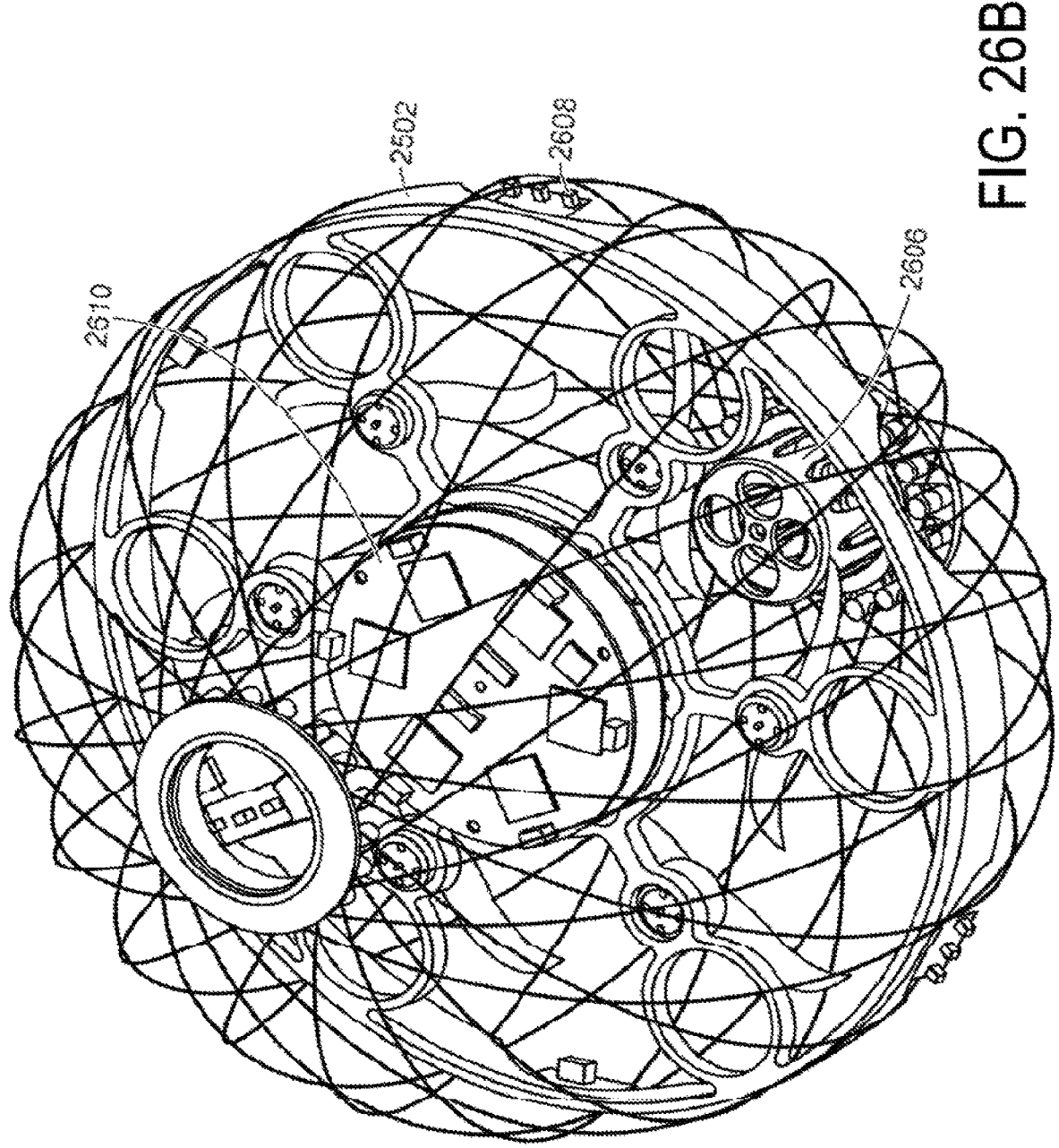
Figure 26C:
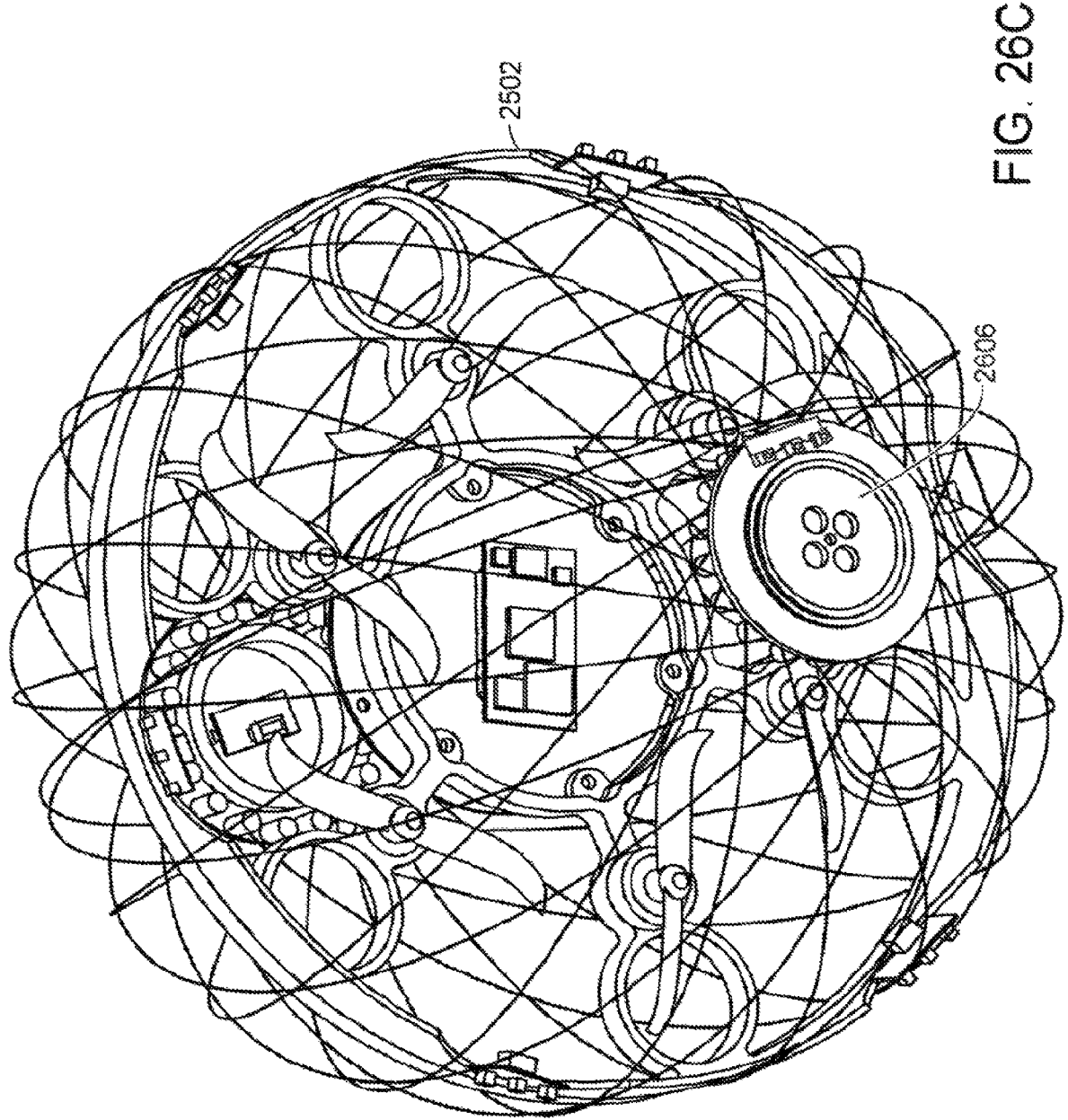
Figure 27:
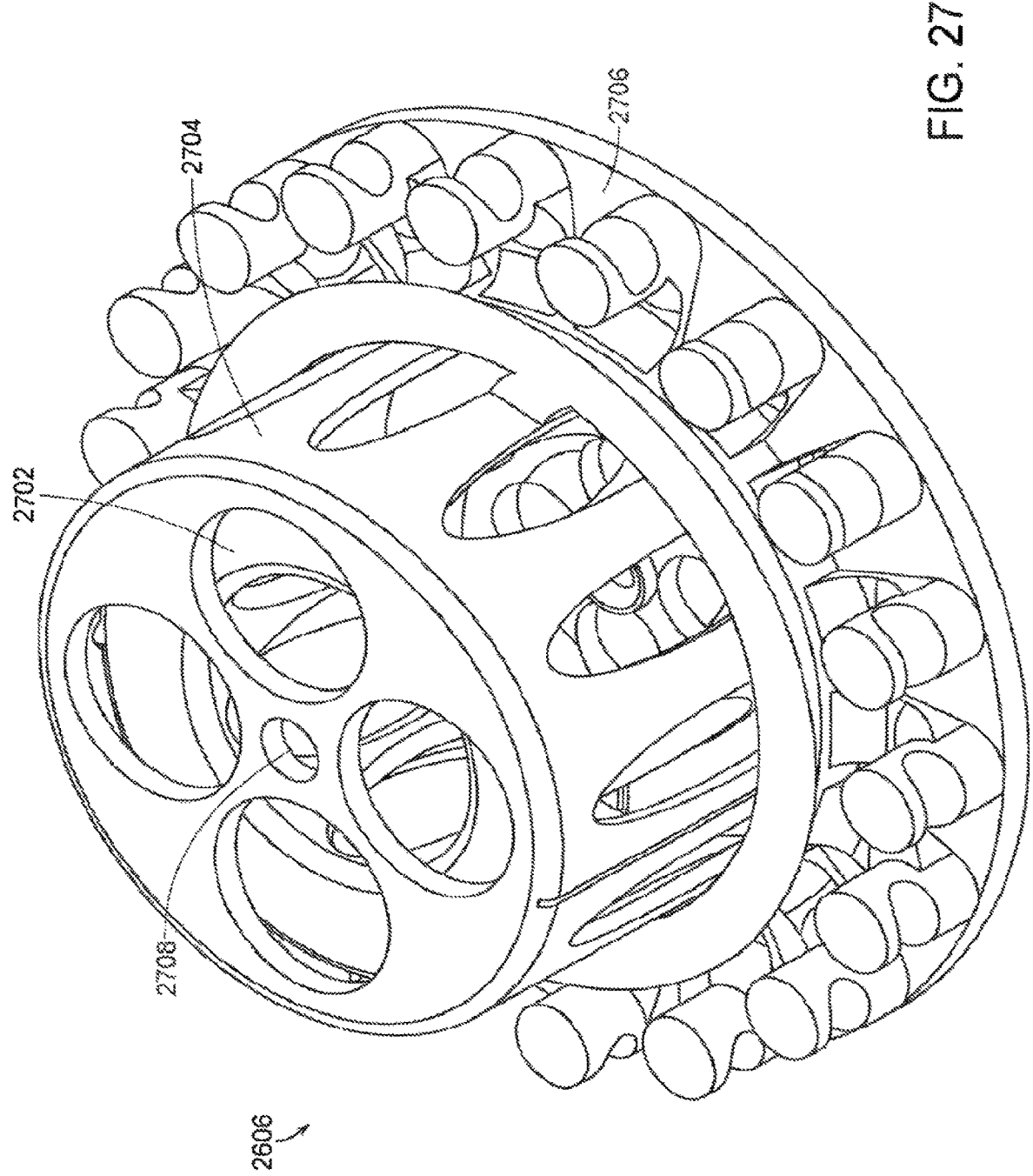
FIG. 27 shows a depiction of a spooler component of the advanced bump guard.

The frame component 2502 includes curved indentations 2504 where sensor arrays can be attached, as shown in FIG. 26A-26C. The sensor arrays are positioned around the frame component 2502 to provide a field of view in at least 3 directions that are at least 90 degrees apart to have a clear and unobstructed field of view. In some embodiments, the sensor arrays are flushed with the frame component 2502 or depressed within the curved indentations 2504 such that the sensor arrays are not impacted if the advanced bump guard bumps against obstacles.

FIGS. 26A-26C shows various views of an embodiment of the unmanned aerial vehicle 2602 with a bump guard 2604 and the frame component 2502. The advanced bump guard 2604 includes a spooler 2606 located below the unmanned aerial vehicle 2602 and within an opening of the bump guard 2604. Sensor arrays 2608 are located with within the curved indentations 2504 of the frame component 2502. Each sensor array 2608 has a field of view of the environment. The field of views of at least two adjacent sensor arrays 2608 overlap (for example, one meter from the sensor arrays 2608) to create a full panoramic view of the environment. Multiple sensor arrays 2608 are placed around the frame component 2502 in order to get a full 360° image. In alternative embodiments, the propellers can be located on either sides of the spar.

The unmanned aerial vehicle 2602 includes a printed circuit board 2610 onboard, as shown in FIGS. 32A-32C.

FIG. 27 illustrates the spooler 2606 shown in FIGS. 26A-26C. The spooler 2606 includes a spool or coil of wire/tether/microfilament. The spool transfers power and data, and maintain connectivity through the wire/tether/microfilament. The spool can be careless or can be wound around a bobbin or other central core, such as an inner component shown in FIG. 29. A microfilament/tether deployment mechanism is used to unspool the microfilament/tether as the unmanned aerial vehicle traverses terrain.

The spooler 2606 holds the microfilament spool. The spooler 2606 can be a disposable microfilament cartridge that both houses and deploys microfilament, while cooling and protecting the microfilament. The spooler 2606 provides snag and tension-free deployment of microfilament developed for a winding and deployment technique, an unspooling method that feeds from the outside of the bobbin and directs the filament back again through the spool's center.

In an exemplary embodiment, the tethered unmanned aerial vehicle is meant for lateral indoor travel. Being tethered, the unmanned aerial vehicle needs a way to deploy the tether as it moves along. Reliable tether filament management is the keystone to allowing lateral movement of a tethered flying vehicle. Conventional methods include spooling unreel thread or filament from the center of a careless spool of wire, or wind off from the outside of a traditional spool. However, both methods include problems such as requiring a slip ring, unreliability due to catching and snagging, and maintaining the line under too much tension, which could break the tether.

In some embodiments, the spooler 2606 includes a specialized spool that includes a modified exit path of the filament such that the microfilament/tether first travels upward, over the top, and then down through the center 2708 of the spooler 2606. This provides a tunable, snag-free, and robust solution for deploying the microfilament/tether. The specialized spooler 2606 includes at least three mechanical pieces: an inner component 2702, an outer component 2704, and a hub 2706. The microfilament/tether is wound around the inner component 2702, and routed over rounded low-friction routing surfaces, then downwards, emerging through the center of the inner component 2702.

Figure 28:
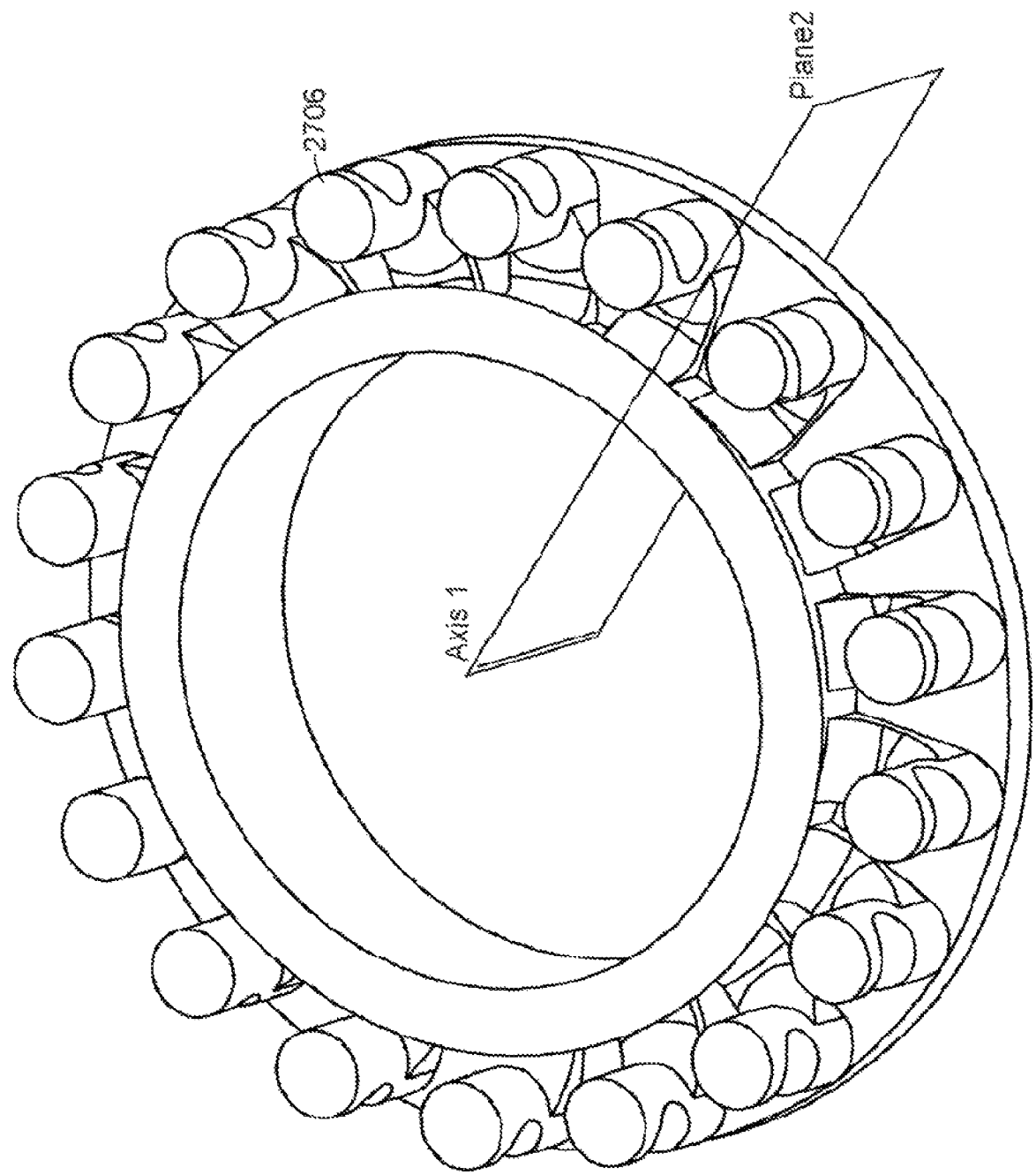
FIG. 28 shows the hub of the spooler component shown in FIG. 7.

FIG. 28 shows the hub 2706 of the spooler component shown in FIG. 27. The hub 2706 attaches the spooler 2606 to the bump guard 2604.

Figure 29:
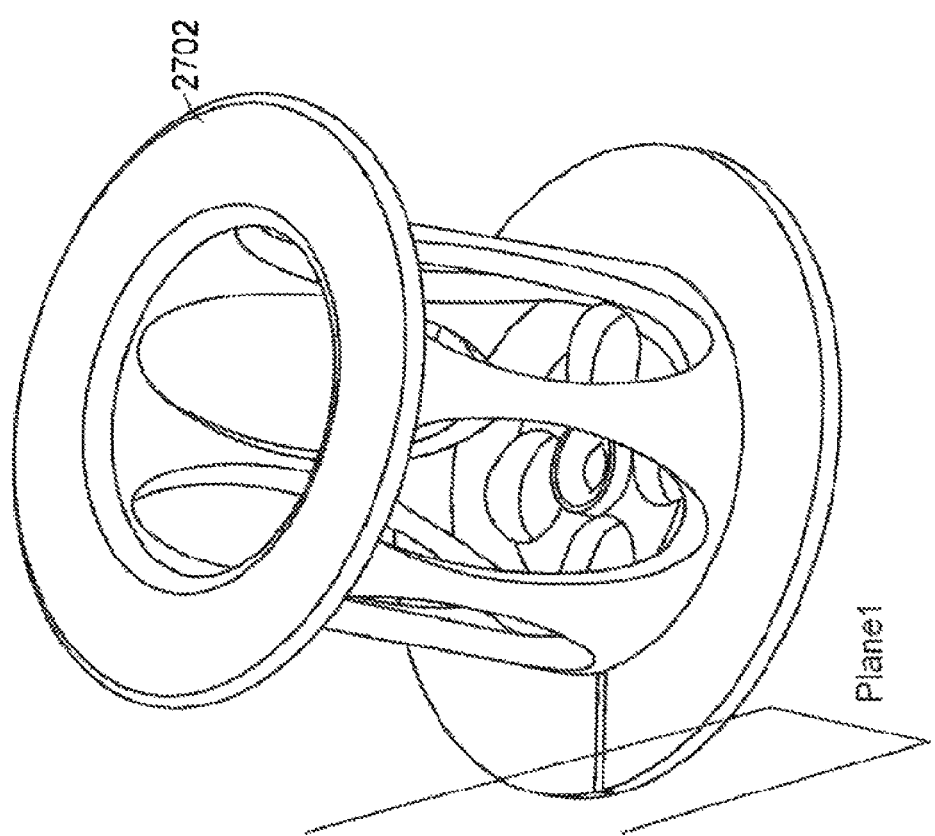
FIG. 29 shows an inner component of the spooler component shown in FIG. 7.

FIG. 29 shows an inner component 2702 of the spooler component shown in FIG. 27. The microfilament/tether is wound around the inner component 2702, and routed over rounded low-friction routing surfaces, then downwards, emerging through the center of the inner component 2702.

Figure 30:
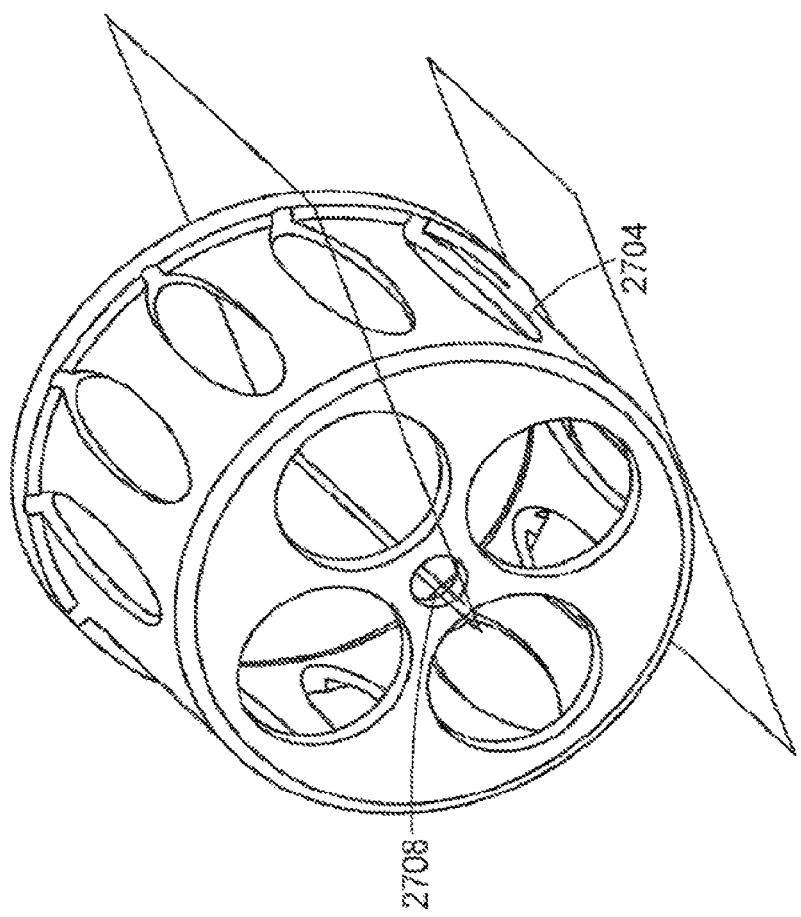
FIG. 30 shows an inner component of the spooler component shown in FIG. 7.

FIG. 30 shows an outer component 2704 of the spooler component shown in FIG. 27. The outer component 2704 has two functions. First, it provides mechanical protection for the wound microfilament/tether on the inner component 2702. Second, it prevents the filament from springing outwards, becoming too loose, looping around the top and bottom of the spooler and pulling tight—a failure mode that was seen in several unshrouded initial prototypes.

Figure 31A:
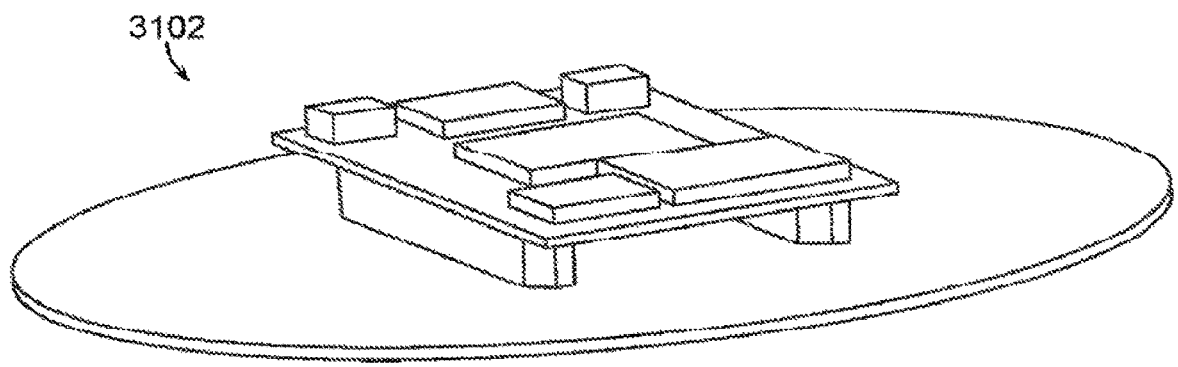
FIGS. 31A-31C are embodiments of a printed circuit board onboard an unmanned aerial vehicle.
Figure 31B:
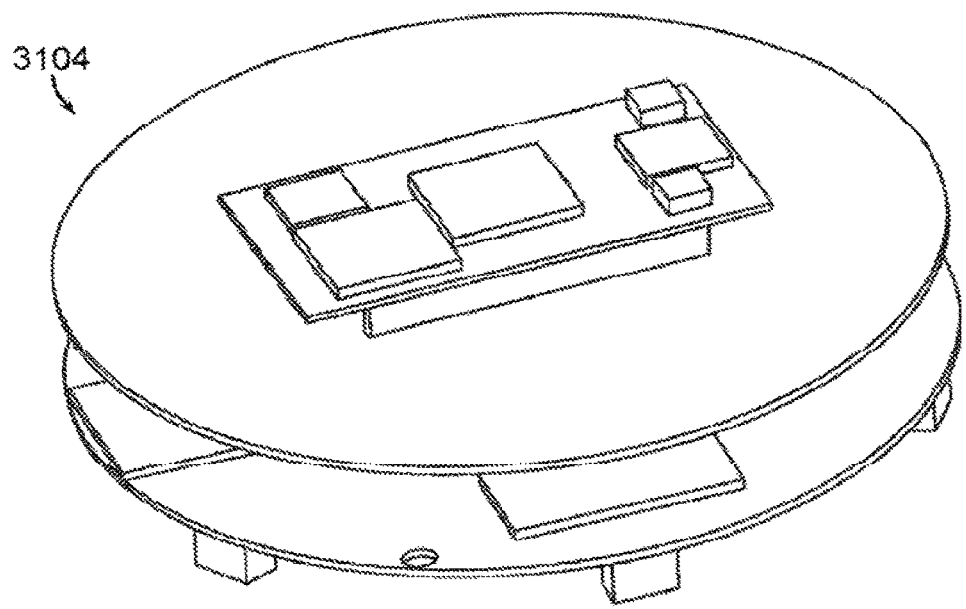
Figure 31C:
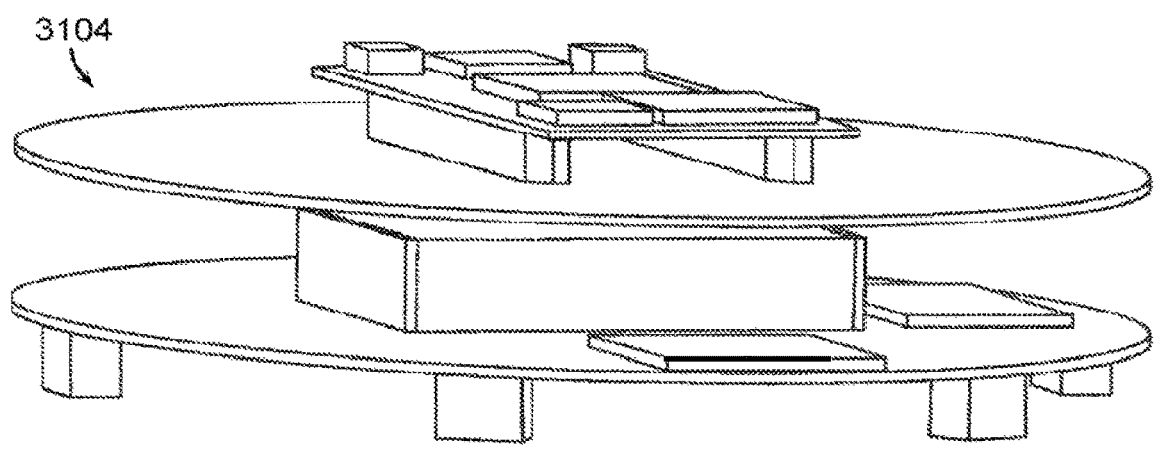

FIGS. 31A-31C are embodiment of a printed circuit board 3102 onboard the unmanned aerial vehicle 2602. FIG. 31A illustrate a single printed circuit board 3102. FIGS. 31B-31C illustrates a stacked printed circuit board 3104. The printed circuit board shown in FIGS. 31B-31C may function similar to or equivalent to the printed circuit boards described in FIGS. 15-17.

Figure 32:
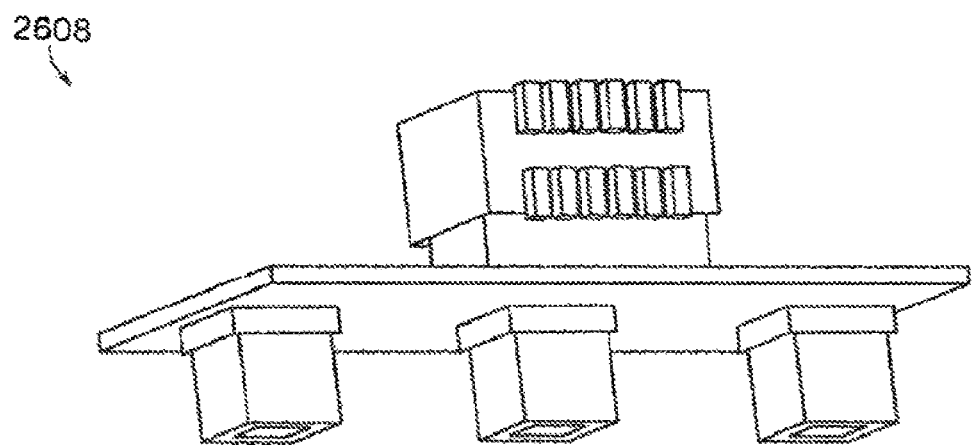
FIG. 32 shows an exemplary sensor array.

FIG. 32 shows an exemplary sensor array 2608.

Figure 33:
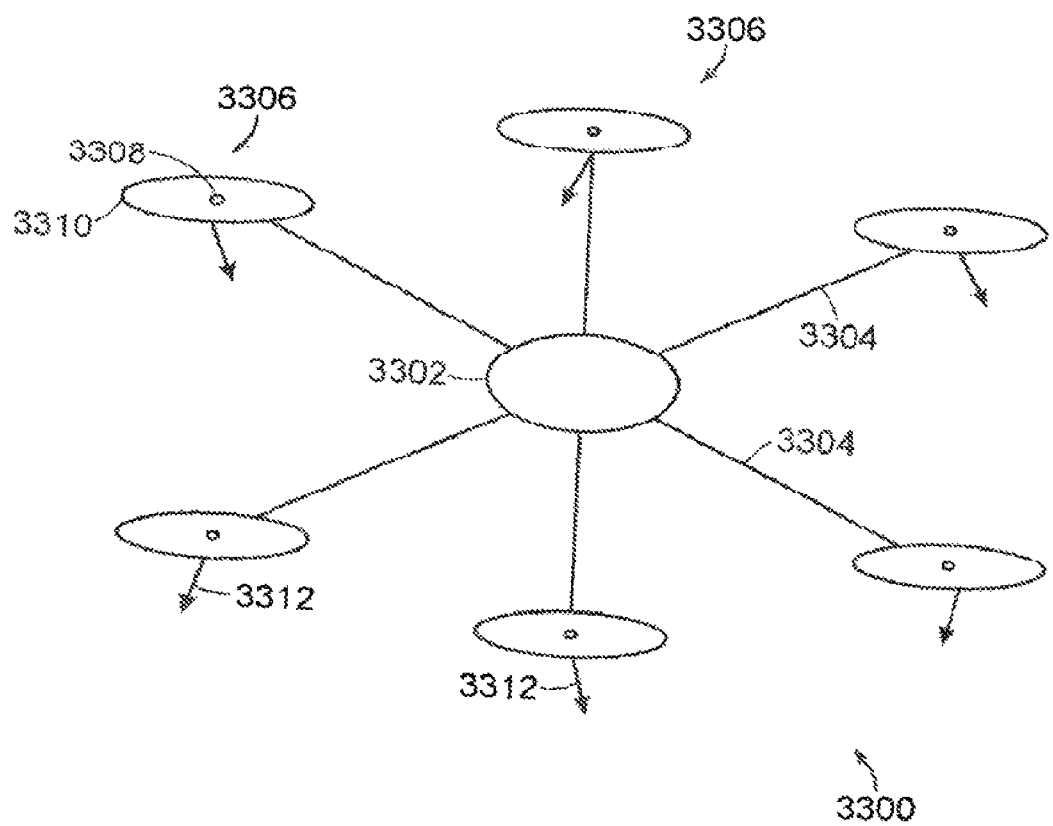
FIG. 33 illustrates an aerial vehicle employing thrust vectoring to control flight.

FIG. 33 is an exemplary multi-rotor UAV helicopter 3300 that includes a central body 3302 from which a number (i.e., n) of rigid spars 3304 radially extend. The end of each rigid spar 3304 includes a thruster 3306 rigidly mounted thereon. In some examples, each of the thrusters 3306 includes an electric motor 3308 (e.g., a brushless DC motor) which drives a rotor 3310 to generate thrust. Very generally, in operation the central body 3302 includes a power source which provides power to the motors 3308 which in turn cause the rotors 3310 to rotate. While rotating, each of the rotors 3310 forces air above the helicopter 3300 in a generally downward direction to generate a thrust having a magnitude and direction that can be represented as a thrust vector 3312.

The bumper system or cage as described can employ a thrust vectoring flight control system to provide collision compensation after the vehicle collides with an object during flight.

Figure 34:
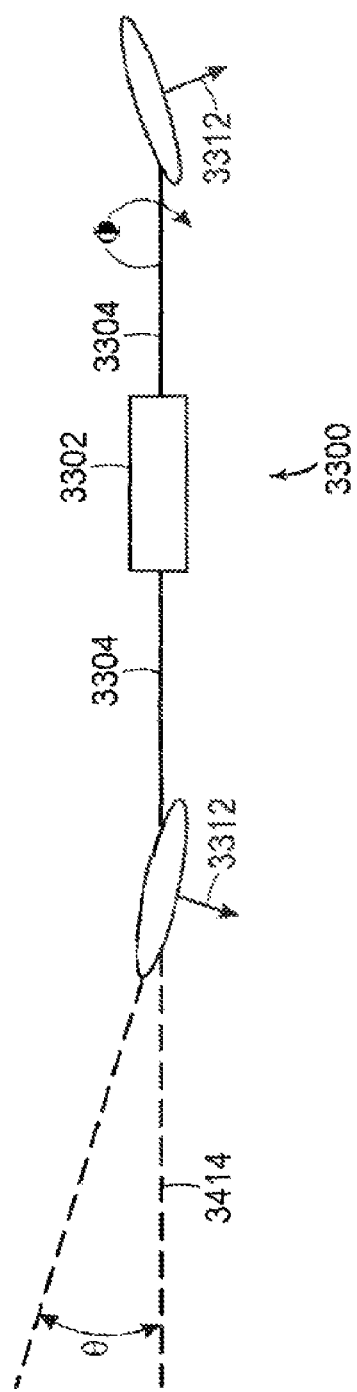
FIG. 34 illustrates the angling of rotors on the vehicle to provide thrust vectoring.

FIG. 34 illustrates the angling of rotors on the vehicle to provide thrust vectoring. As described in U.S. application Ser. No. 15/316,011 filed on Dec. 2, 2016, claiming priority to PCT/US2015/033992 filed on Jun. 3, 2015, the entire contents of the above applications being incorporated herein by reference, in contrast to conventional multi-rotor helicopter configurations, the multi-rotor helicopter 3300 has each of its thrusters 3306 rigidly mounted with both a dihedral angle, $\theta$ and a twist angle, $\phi$. In some examples, both (1) the dihedral angle is the same for each spar 3304, and (2) the magnitude of the twist angle is the same for each spar 3304 with the sign of the twist angle being different for at least some of the spars 3304. To understand the mounting angles of the thrusters 3306, it is helpful to consider the plane defined by the rigid spars 3304 of the multi-rotor helicopter 3300 as being a horizontal plane 3314. With this in mind, mounting the thrusters 3306 with a dihedral angle includes mounting the thrusters 3306 at an angle, $\theta$ with respect to a line from the center of the rotor 3310 to the center of the central body 3302. Mounting a thruster 3306 with a twist angle at the end of a rigid spar 3304 includes mounting the thrusters 3306 at an angle, $\phi$ such that they are rotated about a longitudinal axis of the rigid spar 3304.

Due to the dihedral and twist mounting angles of the thrusters 3306, the thrust vectors 3312 are not simply perpendicular to the horizontal plane 3314 defined by the rigid spars 3304 of the multi-rotor helicopter 3300. Instead, at least some of the thrust vectors have a direction with an oblique angle to the horizontal plane 3314. The thrust force vectors, $\overline{F}_i$ are independent (i.e., no force vector is a multiple of other of the force vectors) or there are at least k (e.g., k=3, 6, etc.) independent thrust force vectors.

Figure 35:
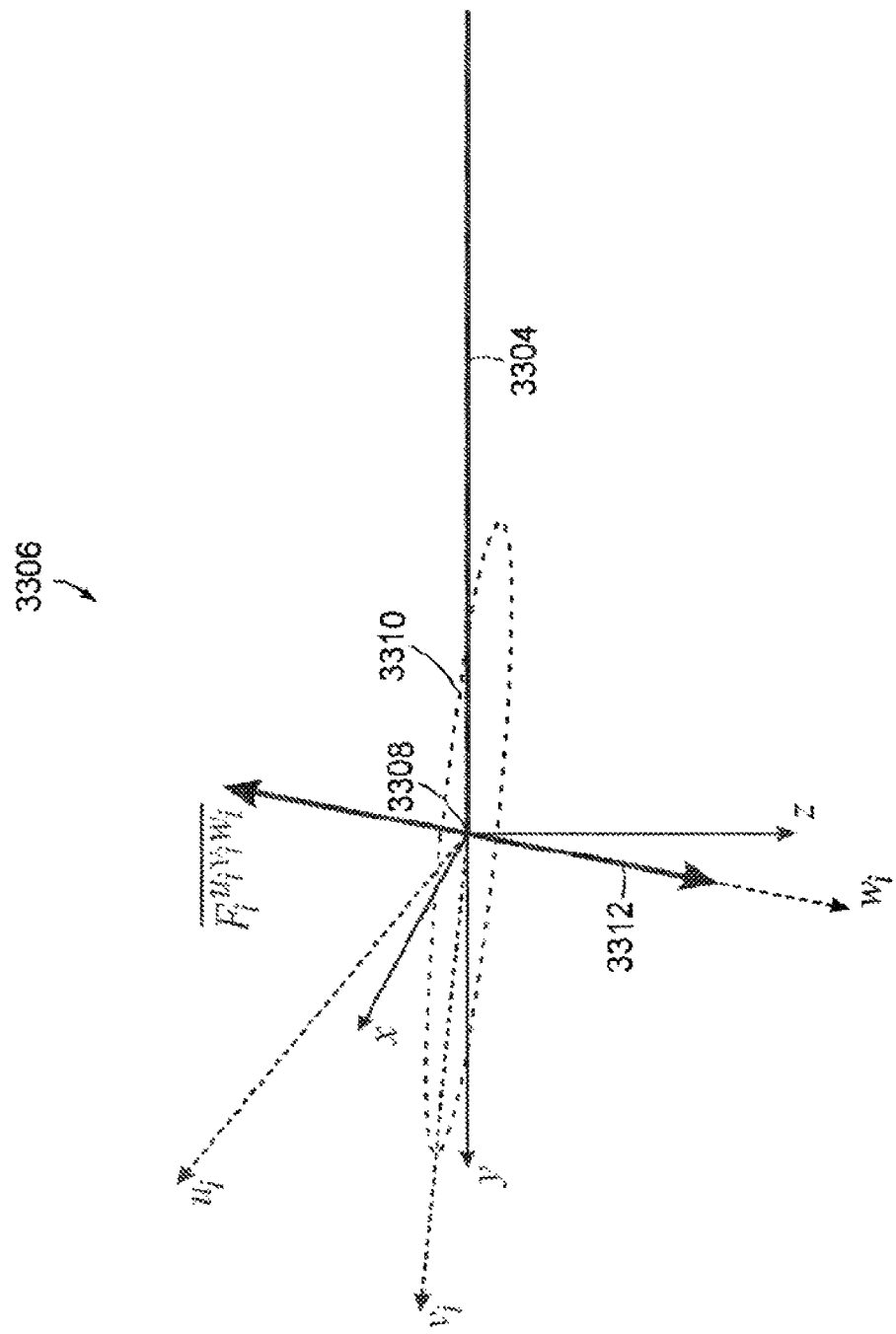
FIG. 35 illustrates a selected thruster or rotor on the vehicle.

FIG. 35 is a detailed view of an $i^{th}$ thruster 3306 shows two different coordinate systems: an x, y, z coordinate system and a $u_i$, $v_i$, $w_i$ coordinate system. The x, y, z coordinate system is fixed relative to the vehicle and has its z axis extending in a direction perpendicular to the horizontal plane defined by the rigid spars 3304 of the multi-rotor helicopter 3300. The x and y axes extend in a direction perpendicular to one another and parallel to the horizontal plane defined by the rigid spars 3304. In some examples, the x, y, z coordinate system is referred to as the "vehicle frame of reference." The $u_i$, $v_i$, $w_i$ coordinate system has its $w_i$ axis extending in a direction perpendicular to a plane defined by the rotating rotor 3310 of the $i^{th}$ thruster 3306 and its $u_i$ axis extending in a direction along the $i^{th}$ spar 3304. The $u_i$ and $v_i$ axes extend in a direction perpendicular to one another and parallel to the horizontal plane defined by the rotating rotor 3310. In some examples, the $u_i$, $v_i$, $w_i$ coordinate system is referred to as the "rotor frame of reference." Note that the x, y, z coordinate system is common for all of the thrusters 3306 while the $u_i$, $v_i$, $w_i$ is different for each (or at least some of) the thrusters 3306.

The rotational difference between the x, y, z and the $u_i$, $v_i$, $w_i$ coordinate systems for each of the n thrusters 3306 can be expressed as a rotation matrix $R_i$. In some examples, the rotation matrix $R_i$ can be expressed as the product of three separate rotation matrices as follows:

$$R_i = R_i^\varphi R_i^\theta R_i^\phi$$

where $R_i^\varphi$ is the rotation matrix that accounts for the rotation of the $i^{th}$ spar relative to the x, y, z coordinate system, $R_i^\theta$ is the rotation matrix that accounts for the dihedral angle, $\theta$ relative to the x, y, z coordinate system, and $R_i^\phi$ is the rotation matrix that accounts for the twist angle, $\phi$ relative to the x, y, z coordinate system.

Very generally, multiplying an arbitrary vector in the $u_i$, $v_i$, $w_i$ coordinate system by the rotation matrix $R_i$ results in a representation of the arbitrary vector in the x, y, z coordinate system. As is noted above, the rotation matrix $R_i$; at the $i^{th}$ spar depends on the spar number, i, the dihedral angle, $\theta$, and the twist angle, $\phi$. Since each spar has its own unique spar number, i, dihedral angle, $\theta$, and twist angle, $\phi$, each spar has a different rotation matrix, $R_i$. One example of a rotation matrix for a second spar with a dihedral angle of 15 degrees and a twist angle of −15 degrees is $$\begin{bmatrix} 0.4830 & -0.8700 & -0.0991 \\ 0.8365 & 0.4250 & 0.3459 \\ -0.2588 & -0.2500 & 0.9330 \end{bmatrix}$$

In general, the ith thrust vector 1012 can be represented as a force vector, $\overline{F_i^{u_i v_i w_i}}$ 113. The force vector, $\overline{F_i^{u_i v_i w_i}}$ 113 generated by the $i^{th}$ thruster 1006 extends only along the $w_i$ axis of the $u_i$, $v_i$, $w_i$ coordinate system for the ith thruster 1006. Thus, the ith force vector 1013 can be expressed as:

$$\overline{F_i^{u_i v_i w_i}} = \begin{bmatrix} 0 \\ 0 \\ f_i \end{bmatrix}$$

where $f_i$ represents the magnitude of the $i^{th}$ force vector 1013 along the $w_i$ axis of the $u_i$, $v_i$, $w_i$ coordinate system. In some examples, $f_i$ is expressed as:

$$f_i \approx k_1 \omega_i^2$$

where $k_1$ is an experimentally determined constant and $\omega_i^2$ is the square of the angular speed of the motor 1008.

The components of $i^{th}$ force vector 1013 in the x, y, z coordinate system can be determined by multiplying the $i^{th}$ force vector 1013 by the $i^{th}$ rotation matrix $R_i$ as follows:

$$\overline{F_i^{xyz}} = R_i \overline{F_i^{u_i v_i w_i}} = R_i \begin{bmatrix} 0 \\ 0 \\ f_i \end{bmatrix}$$

where $\overline{F_i^{xyz}}$ is a vector representation of the $i^{th}$ force vector 1013 in the x, y, z coordinate system.

The moment due to the $i^{th}$ thruster 1006 includes a motor torque component due to the torque generated by the thruster's motor 1008 and a thrust torque component due to the thrust generated by the rotor 1010 of the thruster 1006. For the $i^{th}$ thruster 1006, the motor rotates about the $w_i$ axis of the $u_i$, $v_i$, $w_i$ coordinate system, generating a rotating force in the $u_i$, $v_i$ plane. By the right hand rule, the motor torque generated by the $i^{th}$ thruster's motor 1008 is a vector having a direction along the $w_i$ axis. The motor torque vector for the $i^{th}$ thruster can be expressed as:

$$\overline{T_{1i}^{u_i v_i w_i}} = \begin{bmatrix} 0 \\ 0 \\ \tau_i \end{bmatrix}$$

where $$\tau_i \approx k_2 \omega_i^2,$$

with $k_2$ being an experimentally determined constant, and $\omega_i^2$ being the square of the angular speed of the motor 1008.

To express the motor torque vector in the x, y, z coordinate system, the motor torque vector is multiplied by the rotation matrix $R_i$ as follows:

$$\overline{T_{1i}^{xyz}} = R_i \overline{T_{1i}^{u_i v_i w_i}} = R_i \begin{bmatrix} 0 \\ 0 \\ \tau_i \end{bmatrix}$$

The torque due to the thrust generated by the rotor 1010 of the $i^{th}$ thruster 1006 is expressed as the cross product of the moment arm of the $i^{th}$ thruster 1006 in the x, y, z coordinate system, $\overline{r_i^{xyz}}$ and the representation of the $i^{th}$ force vector 1013 in the x, y, z coordinate system, $\overline{F_i^{xyz}}$:

$$\overline{T_{2i}^{xyz}} = \overline{r_i^{xyz}} \times \overline{F_i^{xyz}}$$

where the moment arm is expressed as the length of the $i^{th}$ spar 1004 along the $u_i$ axis of the $u_i$, $v_i$, $w_i$ coordinate system multiplied by the spar rotation matrix, $R_i^\varphi$.

$$\overline{r_i^{xyz}} = R_i^\varphi \begin{bmatrix} \ell \\ 0 \\ 0 \end{bmatrix}$$

The resulting moment due to the $i^{th}$ thruster 1006 can be expressed as:

$$\overline{M_i} = \overline{T_{1i}^{xyz}} + \overline{T_{2i}^{xyz}} = R_i \begin{bmatrix} 0 \\ 0 \\ \tau_i \end{bmatrix} + R_i^\varphi \begin{bmatrix} \ell \\ 0 \\ 0 \end{bmatrix} \times R_i \begin{bmatrix} 0 \\ 0 \\ f_i \end{bmatrix}$$

The force vectors in the x, y, z coordinate system, $\overline{F_i^{xyz}}$ generated at each thruster 1006 can be summed to determine a net thrust vector:

$$\overline{F^{xyz}} = \sum_{i=1}^{n} \overline{F_i^{xyz}} = \sum_{i=1}^{n} R_i \begin{bmatrix} 0 \\ 0 \\ f_i \end{bmatrix}$$

By Newton's second law of motion, a net translational acceleration vector for the multi-rotor helicopter 1000 can be expressed as the net force vector in the x, y, z coordinate system, $\overline{F^{xyz}}$ divided by the mass, m of the multi-rotor helicopter 1000. For example, for a multi-rotor helicopter 1000 with n thrusters, the net translational acceleration vector can be expressed as:

$$\overline{a} = \frac{\overline{F^{xyz}}}{m} = \frac{1}{m} \sum_{i=1}^{n} R_i \begin{bmatrix} 0 \\ 0 \\ f_i \end{bmatrix}$$

The moments in the x, y, z coordinate system, $\overline{M_i^{xyz}}$ generated at each thruster 1006 can be summed to determine a net moment:

$$\overline{M^{xyz}} = \sum_{i=1}^{n} \overline{M_i^{xyz}} = \sum_{i=1}^{n} \left( R_i \begin{bmatrix} 0 \\ 0 \\ \tau_i \end{bmatrix} + R_i^\varphi \begin{bmatrix} \ell \\ 0 \\ \tau_i \end{bmatrix} + R_i \begin{bmatrix} 0 \\ 0 \\ f_i \end{bmatrix} \right)$$

By Newton's second law of motion, a net angular acceleration vector for the multi-rotor helicopter 1000 can be expressed as the sum of the moments due to the n thrusters divided by the moment of inertia, J of the multi-rotor helicopter 1000. For example, for a multi-rotor helicopter 1000 with n thrusters, the net angular acceleration can be expressed as:

$$\bar{\alpha} = \frac{\overline{M^{xyz}}}{J} = \frac{1}{J}\sum_{i=1}^{n}\left(R_i\begin{bmatrix}0\\0\\\tau_i\end{bmatrix} + R_i^{\psi}\begin{bmatrix}\ell\\0\\0\end{bmatrix} \times R_i\begin{bmatrix}0\\0\\f_i\end{bmatrix}\right)$$

Based on the above model of the multi-rotor helicopter 1000, it should be apparent to the reader that the magnitudes and directions of the overall translational acceleration vector $\bar{\alpha}$ and the overall angular acceleration vector $\bar{\alpha}$ can be individually controlled by setting appropriate values for the angular speeds, $\omega_i$ for the motors 1008 of each of the n thrusters 1008.

Figure 36:
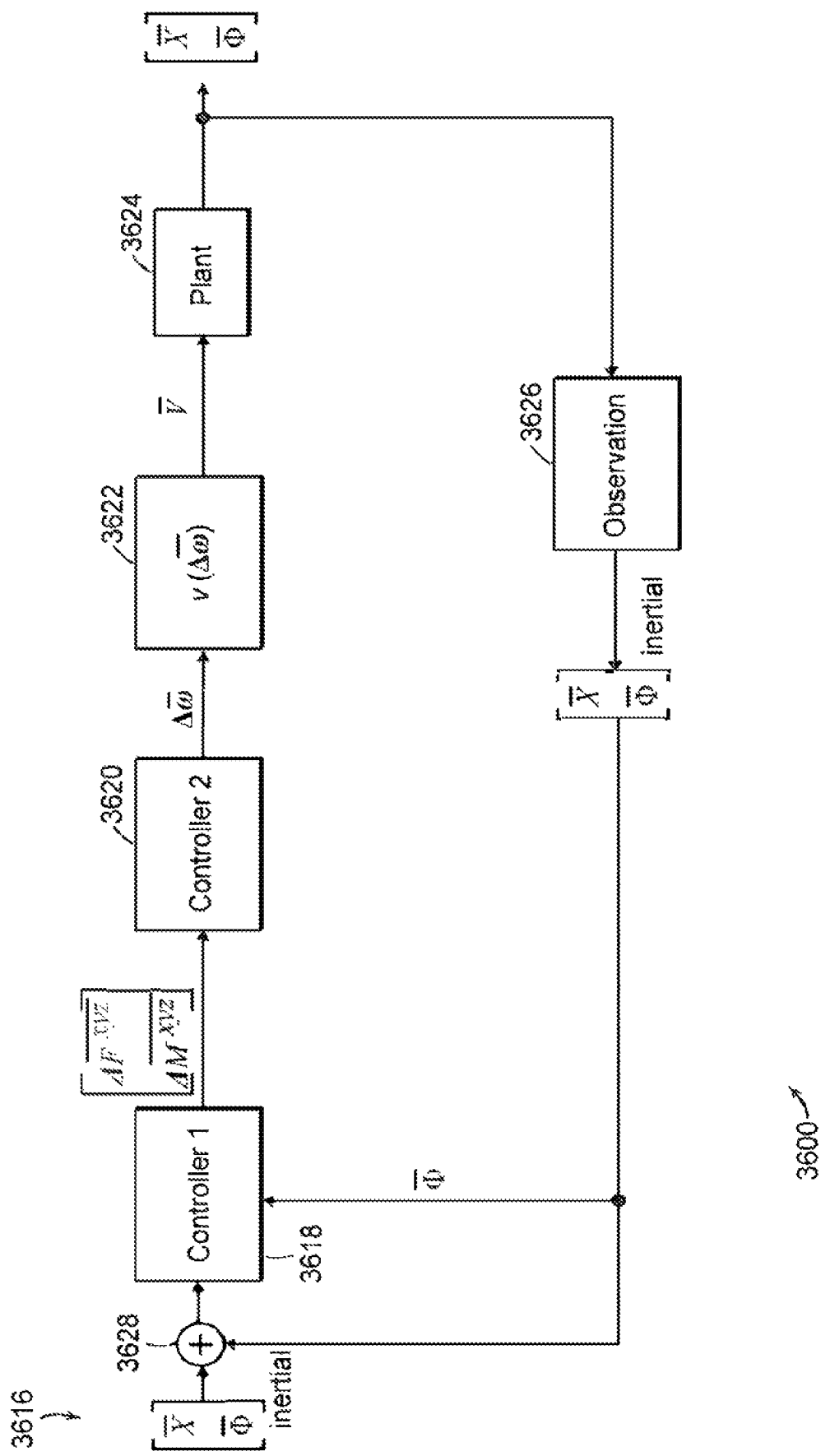
FIG. 36 shows a portion of the flight control system used to control thrust vectoring.

FIG. 36 is an exemplary approach to controlling a vehicle, a multi-rotor helicopter control system 3600 receives a control signal 3616 including a desired position, X in the inertial frame of reference (specified as an n, w, h (i.e., North, West, height) coordinate system, where the terms "inertial frame of reference" and n, w, h coordinate system are used interchangeably) and a desired rotational orientation, $\bar{\Phi}$ in the inertial frame of reference (specified as a roll (R), pitch (P), and yaw (Y) in the inertial frame of reference) and generates a vector of voltages $\bar{V}$ which are used to drive the thrusters 3308 of the multi-rotor helicopter 3300 to move the multi-rotor helicopter 3300 to the desired position in space and the desired rotational orientation.

The control system 3600 includes a first controller module 3618, a second controller module 3620, an angular speed to voltage mapping function 3622, a plant 3624 (i.e., the multi-rotor helicopter 3300), and an observation module 3626. The control signal 3616, which is specified in the inertial frame of reference is provided to the first controller 3618 which processes the control signal 3616 to determine a differential thrust force vector, $\Delta\overline{F^{xyz}}$ and a differential moment vector, $\Delta\overline{M^{xyz}}$, each specified in the frame of reference of the multi-rotor helicopter 3300 (i.e., the x, y, z coordinate system). In some examples, differential vectors can be viewed as a scaling of a desired thrust vector. For example, the gain values for the control system 3600 may be found using empiric tuning procedures and therefore encapsulates a scaling factor. For this reason, in at least some embodiments, the scaling factor does not need to be explicitly determined by the control system 3600. In some examples, the differential vectors can be used to linearize the multi-rotor helicopter system around a localized operating point.

In some examples, the first controller 3618 maintains an estimate of the current force vector and uses the estimate to determine the differential force vector in the inertial frame of reference, $\Delta\overline{F^{inertial}}$ as a difference in the force vector required to achieve the desired position in the inertial frame of reference. Similarly, the first controller 3618 maintains an estimate of the current moment vector in the inertial frame of reference and uses the estimate to determine the differential moment vector in the inertial frame of reference, $\Delta\overline{M^{inertial}}$ as a difference in the moment vector required to achieve the desired rotational orientation in the inertial frame of reference. The first controller 3618 then applies a rotation matrix to the differential force vector in the inertial frame $\Delta\overline{F^{inertial}}$ to determine its representation in the x, y, z coordinate system of the multi-rotor helicopter 3300, $\Delta\overline{F^{xyz}}$. Similarly, the first controller 3618 applies the rotation matrix to the differential moment vector in the inertial frame of reference, $\Delta\overline{M^{inertial}}$ to determine its representation in the x, y, z coordinate system of the multi-rotor helicopter 3300, $\Delta\overline{M^{xyz}}$.

The representation of the differential force vector in the x, y, z coordinate system, $\Delta\overline{F^{xyz}}$ and the representation of the differential moment vector in the x, y, z coordinate system, $\Delta\overline{M^{xyz}}$ are provided to the second controller 3620 which determines a vector of differential angular motor speeds:

$$\Delta\bar{\omega} = \begin{bmatrix}\Delta\omega_1\\\Delta\omega_2\\\vdots\\\Delta\omega_n\end{bmatrix}$$

As can be seen above, the vector of differential angular motor speeds, $\Delta\bar{\omega}$ includes a single differential angular motor speed for each of the n thrusters 3306 of the multi-rotor helicopter 3300. Taken together, the differential angular motor speeds represent the change in angular speed of the motors 3308 required to achieve the desired position and rotational orientation of the multi-rotor helicopter 3300 in the inertial frame of reference.

In some examples, the second controller 3620 maintains a vector of the current state of the angular motor speeds and uses the vector of the current state of the angular motor speeds to determine the difference in the angular motor speeds required to achieve the desired position and rotational orientation of the multi-rotor helicopter 3300 in the inertial frame of reference.

The vector of differential angular motor speeds, $\Delta\bar{\omega}$ provided to the angular speed to voltage mapping function 3622 which determines a vector of driving voltages:

$$\bar{V} = \begin{bmatrix}V_1\\V_2\\\vdots\\V_n\end{bmatrix}$$

As can be seen above, the vector of driving voltages, $\bar{V}$ includes a driving voltage for each motor 3308 of the n thrusters 3306. The driving voltages cause the motors 3308 to rotate at the angular speeds required to achieve the desired position and rotational orientation of the multi-rotor helicopter 3300 in the inertial frame of reference.

In some examples, the angular speed to voltage mapping function 3622 maintains a vector of present driving voltages, the vector including the present driving voltage for each motor 3308. To determine the vector of driving voltages, $\bar{V}$, the angular speed to voltage mapping function 3622 maps the differential angular speed $\Delta\omega_i$ for each motor 3308 to a differential voltage. The differential voltage for each motor 3308 is applied to the present driving voltage for the motor 3308, resulting in the updated driving voltage for the motor, $V_i$. The vector of driving voltages, $\bar{V}$ includes the updated driving voltages for each motor 3308 of the i thrusters 3306.

The vector of driving voltages, $\bar{V}$ is provided to the plant 3624 where the voltages are used to drive the motors 3308 of the i thrusters 3306, resulting in the multi-rotor helicopter 3300 translating and rotating to a new estimate of position and orientation:

$$\begin{bmatrix} \bar{x} \\ \bar{\Phi} \end{bmatrix}$$

Figure 37:
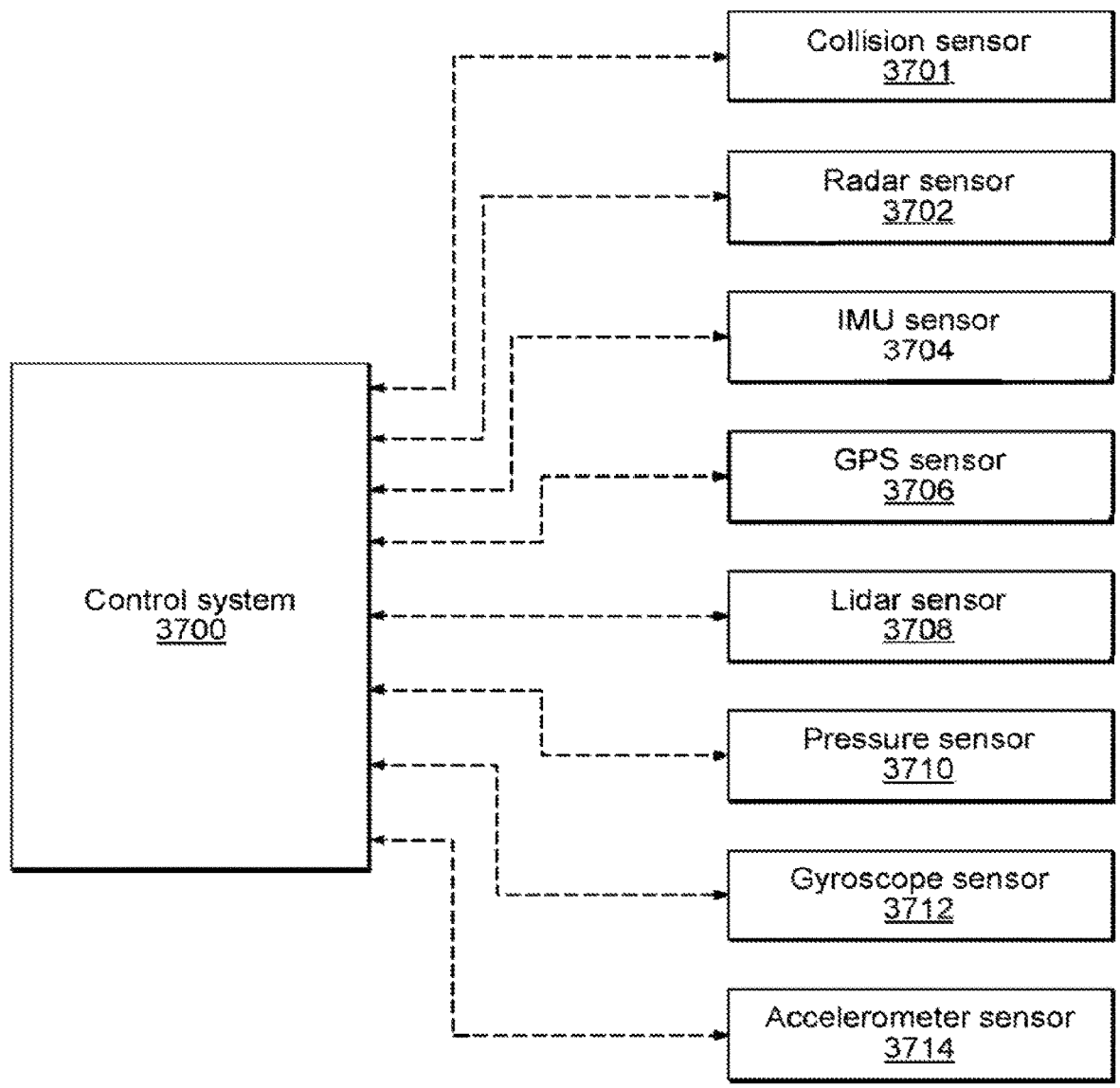
FIG. 37 illustrates the control system including a plurality of sensors.

At least one sensor 3626 includes one or more of an inertial measurement unit (IMU) sensor, gyroscope and accelerometer sensors, a GPS sensor, a Lidar sensor, or a radar sensor, as further described in FIG. 37. The sensor 3626 obtains data and feeds it back to a combination node 3628 as an error signal. The control system 3600 repeats this process, achieving and maintaining the multi-rotor helicopter 3300 as close as possible to the desired position and rotational orientation in the inertial frame of reference.

FIG. 37 is a schematic block diagram of the at least one sensor 3626 shown in FIG. 36 used in the multi-rotor helicopter control system 3600 for controlling a vehicle. Sensor 3626 includes one or more of a collision sensor 3701, a radar sensor 3702, an inertial measurement unit (IMU) sensor 3704, a GPS sensor 3706, a Lidar sensor 3708, a pressure sensor 3710, a gyroscope sensor 3712, and an accelerometer sensor 3714.

The data collected from the IMU sensor 3704 enables the control system 3600 to track the UAV's position, i.e., using, for example, dead reckoning, or to adjust for wind.

The pressure sensor 3710 measures atmospheric pressure. Data provided by the pressure sensor 3710 enabling the control system 3600 to adjust other parameters (i.e., rotor speed, tilting angle, etc.) based on the atmospheric pressure.

The radar sensor 3702 provide detection of objects, reliable distance measurement, collision avoidance and driver assistance. Data provided by the radar sensor 3702 is used by the control system 3600 to compute updated rotor speed to avoid collisions.

The GPS sensor 3706 provides accurate position and velocity information. Data provided by the GPS sensor 3706 is used by the control system 3600 to compute updated location and velocity information.

The Lidar sensor 3708, which measures distance to a target by illuminating that target with a laser light, provide detection of objects, reliable distance measurement, collision avoidance, and driver assistance. Data provided by the Lidar sensor 3702 is used by the control system 3600 to compute updated rotor speed to avoid collisions.

The gyroscope sensor 3712 measures the angular rotational velocity, and assists with orientation and stability in navigation. The accelerometer sensor 3714 measures linear acceleration of movement. Data provided by the gyroscope sensor 3712 and accelerometer sensor 3714 is used by the control system 3600 to compute updated linear and rotation velocity. Cameras report pixels and Lidars report times of flight, and other sensors report other raw data, as described above. Algorithms are applied to the raw data to extract higher level information. Preferably, all of the raw data from the sensors (e.g., cameras, radar, Lidars, IMU, etc.) is combined together using a centralized processing architecture. The centralized processing may be performed on the main flight processor or a separate processor.

Figure 38:
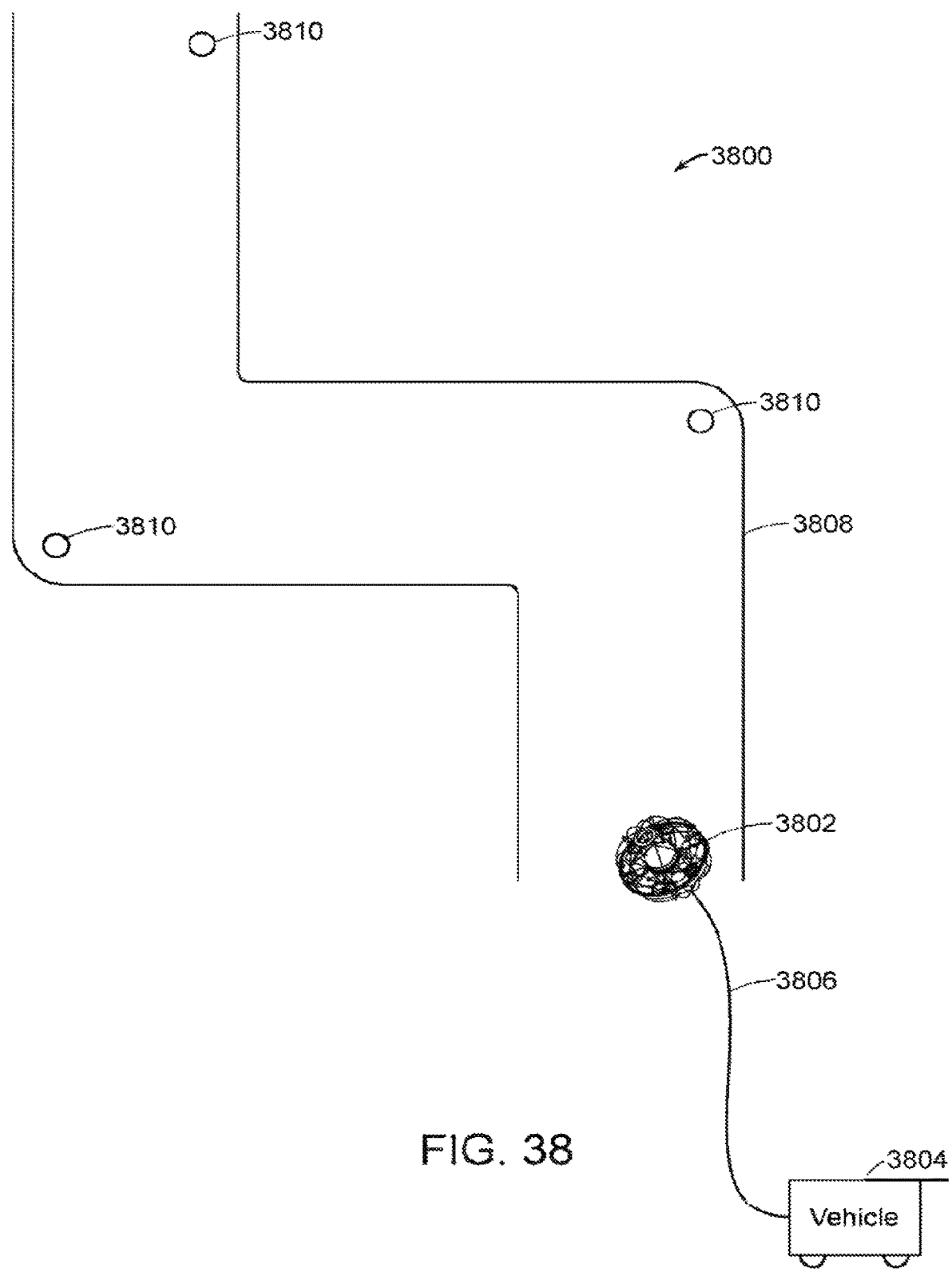
FIG. 38 illustrates a system to perform industrial inspections using an unmanned aerial vehicle.

FIG. 38 illustrates a system 3800 for industrial inspections using an UAV 3802, according to an exemplary embodiment. There are a wide variety of industrial inspection in spaces where it is inconvenient, dangerous or costly to send in a human inspector. Operating in many of these environments currently requires specialized training, permitting, or support equipment. The system 3800 addresses these short comings through the UAV 3802, which includes a suite of onboard sensors for navigation, perception, and inspection. In an exemplary embodiment, system 3800 includes a vehicle 3804 for launching the UAV 3802 and/or acting as aground station to provide power and data communications. The system 3800 includes supporting ground equipment that manages data and power for a tether 3806 connecting the UAV 3802 to the vehicle 3804 and provides interfaces for the user to plan, execute and monitor the inspection process.

The general use case is to plan a mission based on user goals and external data, initiate a mission by sending the UAV 3802 into the area of interest, execute a flight plan to collect sensor data in the area of interest, process sensor data to aid navigation and to inspect and evaluate the environment, identify the location and nature of defects or other environment features, present data to the user, update the flight plan based on detected automatically detected conditions or based on user command, and to save data for future purposes.

Example applications cases of this the embodiments described herein include: enclosed space inspection for chemical, oil, and gas; inspection of interior and exterior of tanks, pumps, and other process equipment and supporting infrastructure; inspection of pipelines, such as inspecting an interior or exterior of the pipelines; inspection of transportation infrastructure, such as inspecting bridges and subways; inspection of mines, such as underground tunnels, quarries, equipment, and infrastructure; inspection of utilities infrastructures, such as power and cellular tower, underground tunnels or pipes, water pumping stations and towers, and power generation facilities; inspection of marine structures, such as inspecting ship exteriors, mechanical rooms, or cargo holds; inspection of interior and exterior spaces of offshore drilling and support equipment; and inspection of building construction, such as inspecting interior and exteriors of buildings to provide additional quality oversight during the construction process.

The key challenges posed by these environments include one or more of GPS denial, limited RF capability, difficult physical access, and long duration. The use of a tethered UAV 3802 provides significant advantages over a human or ground robotics system to overcome these challenges. Using the UAV 3802 provides mobility for fast transit or observing difficult to reach locations such as ceilings or crevices. The tether 3806 provides continuous power to enable virtually unlimited flight times, compared to battery power systems that typically fly around 30 minutes. The communications over the tether 3806 also enables the vehicle to operate in environments where RF communications are not possible. The tether communications also enables ground processing of video and sensor data for advanced supplementary perception and real time updates of a mission plan from ground processing or from human supervisory control inputs.

Other potential applications may include integration with another vehicle (e.g., ground vehicle 3804, marine vehicle, crawling/climbing vehicle) to provide additional mobility. Some applications may require several systems with coordinated operations.

In some embodiments, mission planning may be provided. Mission planning includes setting up a mission plan for a particular area, defining high level behaviors (slow scan of a designated vs exploring), fiducial points, designating preferred approach directions, and/or keep out zones. This can include auxiliary data such as building/structure plans, terrain maps, weather or solar data, and autonomous execution. Autonomous execution includes, but is not limited to, onboard stabilization, collision avoidance, broad exploration, detailed scanning, go home, and land/perch.

In an exemplary embodiment, the mission planning software resides on the ground station. The software uses user provided inputs and external data to produce a nominal mission plan in the form of flight fiducial points and pointing directions for the flight. The user provided inputs include, but are not limited to: a list of target locations and payload pointing directions in either absolute or relative coordinates. This information may be specified relative to maps, imagery, or other models that may be available, and overlaid onto the same information so that the user can visualize the mission; keep-out zones, preferred direction, or other constrains for the vehicle path; vehicle flight constraints, such as height or speed limits; autonomous behaviors, such as scanning a specified area at a specified distance, exploring and mapping an area, returning to home, or land/perch for a specified period; enabling or disabling event driven macro responses, such as rescanning an area with higher resolution if an anomaly is detected or returning home if a vehicle malfunction is detected.

The mission planning calculates a nominal flight plan that describes the trajectory fiducial points and pointing directions. The optimization software includes terms to account for the tether length and spooling rate constraints, as well as planning to avoid or minimize tether entanglement.

The mission planning software may also use external data to create the mission plan, including static information (maps or models of the physical structure, terrain maps) or dynamic information (sun direction, wind, the location of other equipment or people).

In some conditions, the UAV 3802 operates in GPS-denied environments, like a confined area, such as a pipe 3808 (the depictions in FIG. 38 may not be to scale). In this case, the system may (1) initializes absolute position on the outside/exterior of the tank where GPS is available and then sends the UAV 3802 into the confined flight pace, (2) operates in a relative frame of reference, (3) a user inputs an initial relative absolute position, and/or (4) use geo-referenced visual landmarks, to complete an inspection. For example, the UAV 3802 may use beacons 3810 to navigation in the confined space. In another embodiment, where GPS signals are extremely weak, imprecise and highly susceptible to interference the UAV 3802 may use simultaneous localization and mapping (SLAM). SLAM is a technique allowing an autonomous vehicle to simultaneously build a map of a previously unknown environment while also localizing itself within this map. This enables the UAV 3802 to operate semi-autonomously or completely autonomously.

Figure 39:
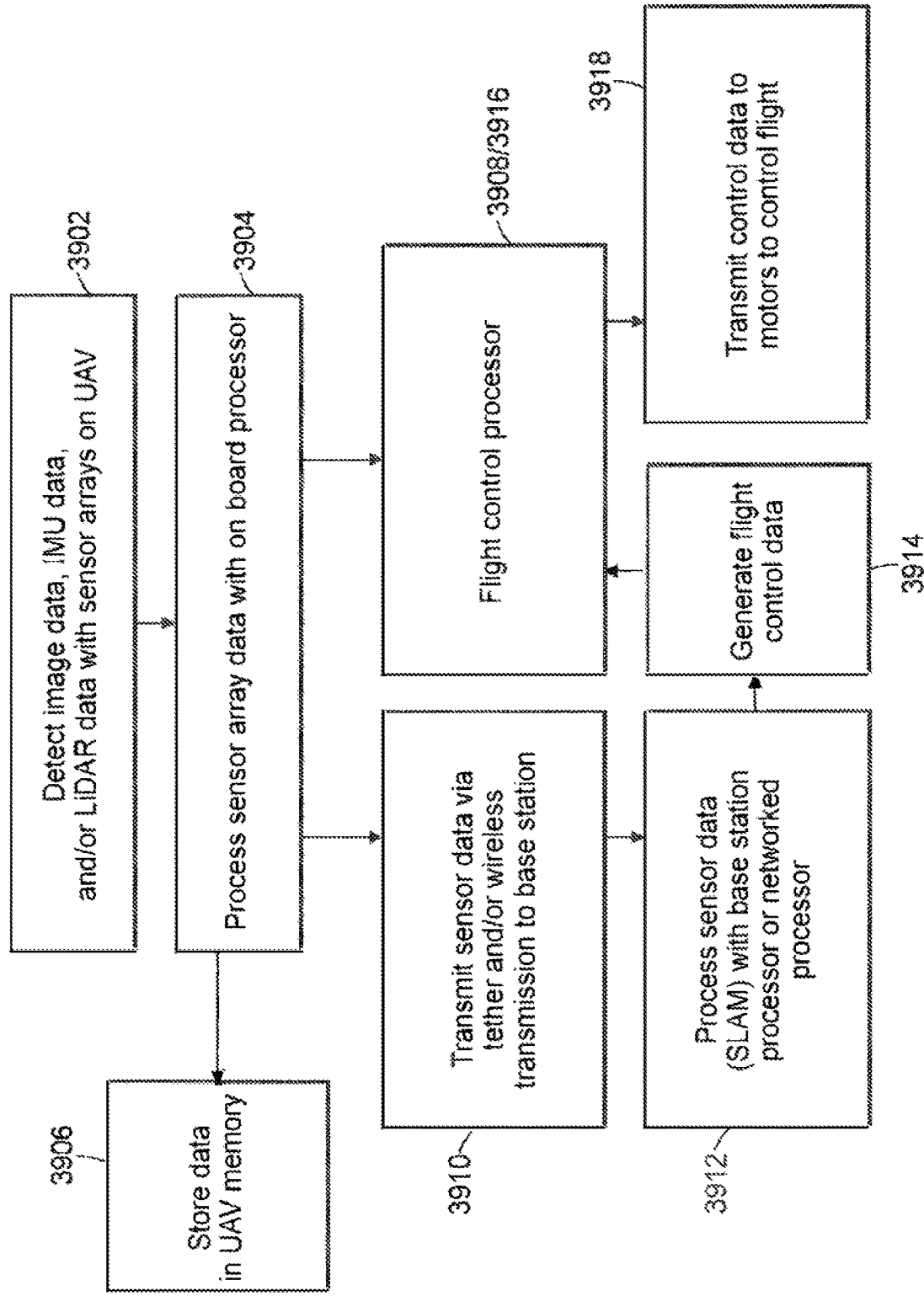
FIG. 39 is a process flow sequence for generating flight control data.

FIG. 39 is a process flow sequence for generating flight control data. At step 3902, sensor arrays on an UAV detects sensor data, including image data, IMU data, and/or Lidar data. At step 3904, a processor onboard the UAV processes the sensor data. At step 3906, the onboard processor stores the sensor data in an onboard memory. At step 3908, the sensor data is transmitted to a flight control processor. At step 3910, the UAV transmits the sensor data via tether and/or wireless transmission to a base station. At step 3912, a base station processor or a networked processor processes the sensor data. At step 3914, the base station processor or the networked processor generates flight control data. At step 3916, the base station processor or the networked processor transmits the flight control data to the flight control processor. At step 3918, the flight control processor transmits control data to motors on the UAV to control flight.

Figure 40:
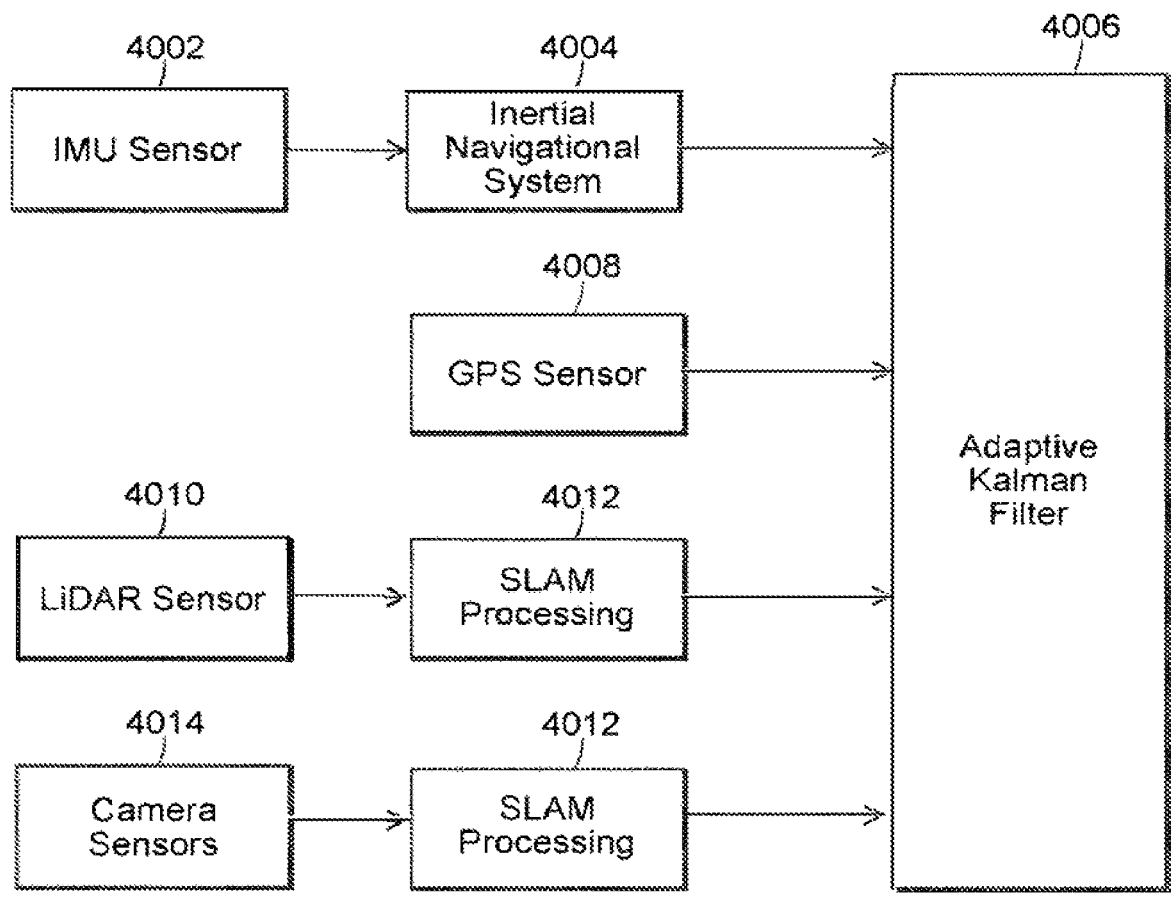
FIG. 40 is a process flow sequence for processing sensor data using a SLAM-based approach.

In one embodiment, the base station processor or the networked processor processes the sensor data using SLAM, which takes information from multiple different kinds of sensors in order improve the quality of position and velocity estimation, as further shown by FIG. 40. SLAM is discussed at Sebastian Hening, Corey A. Ippolito, Kalmanje S. Krishnakumar, Vahram Stepanyan, and Mircea Teodorescu. "3D Lidar SLAM Integration with GPS/INS for UAVs in Urban OPS-Degraded Environments", AIAA Information Systems-AIAA Infotech @ Aerospace, AIAA SciTech Forum, (AIAA 2017-0448) (the contents of which is incorporated herein by reference in its entirety), and Munguia, R, Urzua, S, Bolea, Y "Vision-based SLAM system for unmanned aerial vehicles." Sensors 2016; 16: 372. (the contents of which is incorporated herein by reference in its entirety).

FIG. 40 is a process flow sequence for processing sensor data using a SLAM-based approach, according to an exemplary embodiment. In the described embodiment, the UAV includes at least an IMU sensor 4002, an inertial navigational system 4004, a Lidar sensor 4010, a GPS sensor 4008, and a camera sensor 4014. The IMU sensor 4002 generates and transmits data to the inertial navigational system (INS) 4004. The INS 4004 generates and transmits INS data to an adaptive Kalman filter 4006. GPS sensor 4008 generates and transmits GPS data to the adaptive Kalman filter 4006. Lidar sensor 4010 generates and transmits Lidar data to SLAM processing device 4012. The SLAM processing device 4012 generates and transmits Lidar SLAM data to the adaptive Kalman filter 4006. In some embodiments, the camera sensor 4014 generates and transmits camera data to SLAM processing device 4012. The SLAM processing device 4012 generates and transmits camera SLAM data to the adaptive Kalman filter 4006. The fusion of the GPS data, the Lidar SLAM data, the optional camera SLAM data, and the INS data is combined by the Adaptive Kalman Filter 4006 to provide accurate state estimates of the position and velocity of the UAV.

Aspects relating to the above procedure are further described in Sebastian Hening, Corey A. Ippolito, Kalmanje S. Krishnakumar, Vahram Stepanyan, and Mircea Teodorescu. "3D Lidar SLAM Integration with GPS/INS for UAVs in Urban GPS-Degraded Environments", AIAA Information Systems-AIAA Infotech @ Aerospace, AIAA SciTech Forum, (AIAA 2017-0448) and Munguia, R, Urzua, S, Bolea, Y "Vision-based SLAM system for unmanned aerial vehicles." Sensors 2016; 16: 372. Referenced above, however, these do not describe tethered operation as set forth herein.

Figure 41:
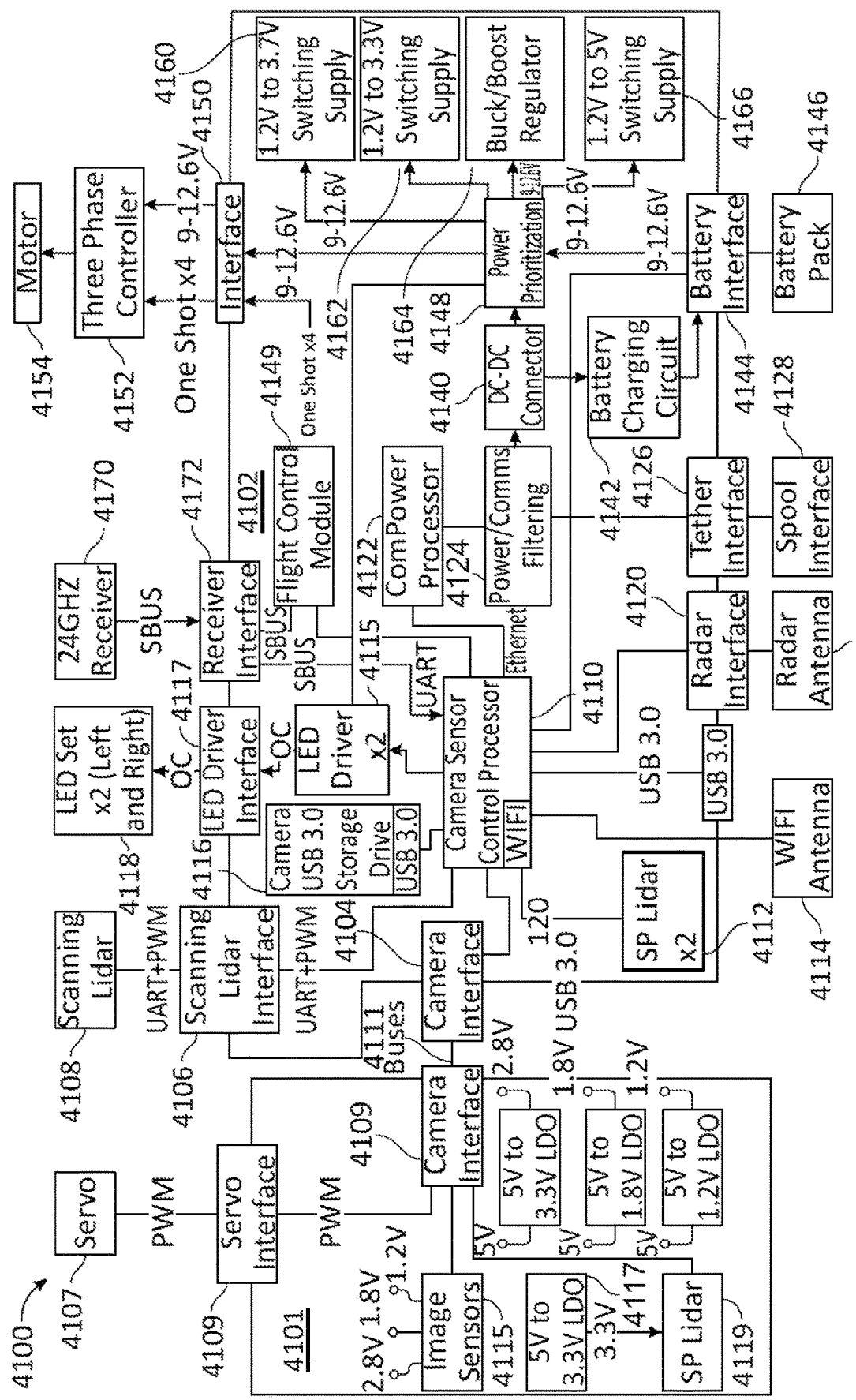
FIG. 41 illustrates an embodiment of a control system for an aerial vehicle.

A further embodiment of a tethered aerial vehicle for detecting and inspecting objects along a flight path is described in connection with FIGS. 41-50. Shown in FIG. 41 is a control system 4100 on the aerial vehicle in which a first circuit board 4101 controls sensors including one or more cameras and one or more Lidars, for example. A second circuit board 4102 includes an interface circuit 4104 connected to the first board interface circuit 4105 via one or more buses 4111. A plurality of cameras or image sensors 4115 acquire image data that are transmitted to data processors 4110 for processing and storage. Additional sensors including ultrasonic transducers can be mounted on the vehicle to perform contact measurements of wall thickness and further diagnostic measurements. The vehicle can include a fluid reservoir to deliver one or more fluids onto the surface of the object being measured or inspected. An ultrasound gel, for example, can be pumped from the reservoir and delivered by a tube onto a surface for a contact measurement. One or more chemical sensors can also be mounted to the vehicle to detect the presence of corrosive or explosive gases or liquids. As the tether can operate at voltages in a range of 200-1000 volts, the detection of trace amounts of chemicals in the operational space can trigger shut off of the power and cause an emergency landing of the vehicle under battery power. Line driver circuit 4117 is connected to a single point Lidar 4119 element to measure a distance from one of the cameras or image sensors to the object or surface being imaged. A plurality of additional single point or multielement Lidar devices can measure the distances to objects along one or more axes. A camera mounted on a gimbal can be positionally adjusted using servo interface circuit 4109 and servo device 4107. Lidar element 4119 can be mounted with the camera mount and can be directed along the field of view axis of the rotating camera. The gimbal can also include a second camera that is mounted side-by-side with the second camera with one having a large POV relative to the second which is used for high resolution imaging. As described previously herein, additional cameras can be statically mounted around the airframe to provide situational awareness that cover a spherical volume surrounding the vehicle. A radar control circuit 4120 operates a millimeter wave transmitter and receiver device 4122 that can optionally be mounted at one or more locations around the frame of the air vehicle. Such devices are available from Texas Instruments, Dallas, Tex., and can include the IWR1612 transmit and receive subsystem, for example. A flight control processor 4149 receives data from a receiver 4170 which can be a 2.4 GHz telemetry receiver, for example, that generates a low latency pulse width modulated signal that is processed by receiver interface circuit 4172. Processor 4149 drives operation of the motor 4154 that spin the vehicle rotors. A three phase controller 4152 can be used to control rotors speeds in response to commands received from interface circuit 4150. The data processor 4122, can be a MegaChips Corporation application specific integrated circuit programmed to control power and communication for the vehicle. Processor 4122 receives Ethernet data from processor 4110, which is then filtered 4124 before being coupled to the tether via the tether interface 4126 and the spooler interface 4128. A DC-DC converter 4148 provides power to the system from the tether or a battery 4146. A battery interface circuit 4149 can facilitate charging of the battery with charging circuit 4142.

The MegaChips (IC controller) communications approach provides off-the-shelf availability, higher bandwidth capability, and better adaptability. The IC controller detects the power line channel characteristics and determines the preferred rate. It also can include error correction and selective transmission retry. These features provide robust performance across a range of transmission line lengths and qualities. This flexibility provides a system that can be adapted for a wide range of mission, vehicle, and tether configurations. The achievable data rate is dependent on the tether gage and length. These factors in turn impact the maximum flight altitude and payload weight capacity. A vehicle and mission configuration capability leverages this communications flexibility. The configuration presets allow the user to evaluate and choose compatible selections of payload weight, tether length and gage, and data rates.

The IC controller system also provides an indicator of communications errors. This signal can be used to dynamically adjust the bandwidth allocations on the air vehicle and adjust the payload data quality or data package selection.

The IC control system senses and adjusts to the optimal data rate and also improves the ability of the system to adapt to changes in the filament characteristics due to manufacturing variability, degradation from normal wear and tear, and kinks in the filament, for example.

Figure 42:
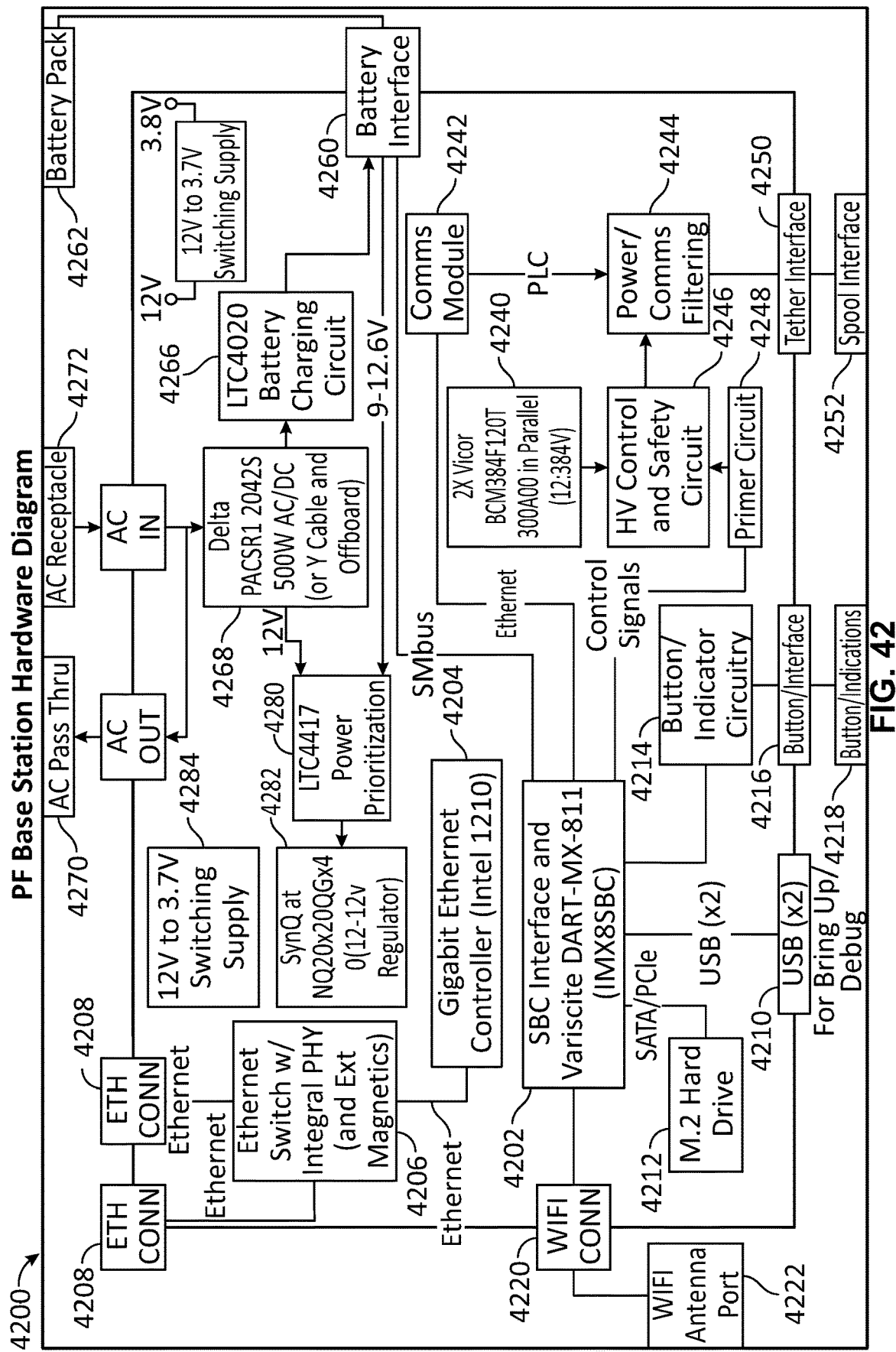
FIG. 42 illustrates a base station control system for the aerial vehicle of FIG. 41.
Figure 43:
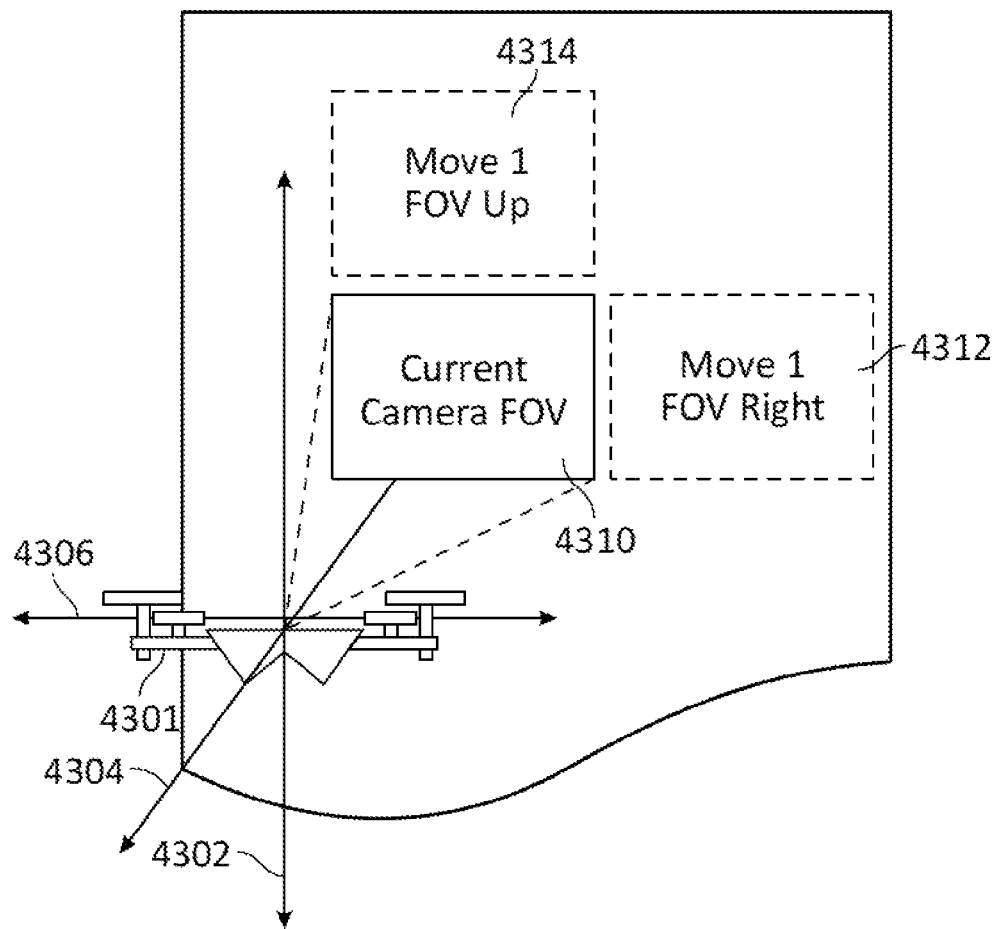
FIG. 43 illustrates a method for sequentially viewing distinct adjacent portions of a field of view grid wherein the vehicle automatically relocates to view the next grid element in sequence.

Shown in FIG. 42 is a base station control system 4200 that is connected to the air vehicle control system of FIG. 41 using a tether as previously described herein.

Multiple inspection assist features help the operator control the vehicle movements and camera pointing to take useful images for inspection. Control system 4200 has communication and power control functions. Data processor 4202 can be a Variscite DART MX811 system on module (SoM), for example which employs an NXP Semiconductor co-processor. Note that other computer systems can also be used. Processor 4202 is connected to a Gigabit Ethernet controller 4204 which can receive and transmit Ethernet data through one or more connectors 4208 using switch 4206. Ethernet data is directed to the tether via communication circuit module 4242, filter 4244, tether interface 4250 and spool interface 4252. A battery interface 4260 connects replaceable battery 4262 to the power management system in the event of AC power disruption.

Several motion assist options can be activated to apply constraints on the allowed vehicle motion. This makes it easier for the operator to position the air vehicle and point the camera at the desired location. In general, the vehicle has 6 degrees of freedom (6DOF), meaning that it can translate along 3 dimensions and rotate around 3 axes. A motion constraint limits the operator to movements in only a subset of all possible changes in position or rotation. These constraints can be enabled and disabled as the operator's purposes change over a flight mission or on successive missions.

In addition to translation and rotation, the operator also controls the camera angle. A camera mounted on a 1 or 2 degree of freedom gimbal provides additional variables for the operator to control in order to get a suitable inspection of an object. Some motion constraints combine the angle of the camera and the angle of the vehicle to achieve the operator goal.

1. Altitude hold—constrain the vertical translational motion. This has the effect of allowing the vehicle to be operated only in a horizontal plane. This is useful when the user wants to inspect surfaces at a single level.
2. Vehicle offset to surface—constrain the translational motion to remain at a user-defined offset from the nearest environmental structure surface. For example, if the environment is in a cylindrical tank, the vehicle could move vertically, but could only translate on the plane that is a given distance from the surface. This is useful when the operator wants to keep the vehicle at a constant distance from the surface.
3. Camera offset to surface—constrain the translational motion to remain at a user-defined offset between the camera and the surface. This is nearly the same as vehicle offset to surface when the camera is pointed level.
4. Rotation hold—constrain the rotational motion of the vehicle to maintain the current orientation in space. This is useful if the operator wants to move the vehicle around and keep the vehicle oriented in the same direction.
5. Auto rotate to surface, orthogonal—constrain the rotational motion of the vehicle to ensure the front of the vehicle is always pointed to the local environment surface. In the example of a cylindrical tank, the vehicle would be able to freely translate, while always pointing to camera to the tank wall. If the camera pointing direction is not orthogonal to the surface when this mode is enabled, the vehicle will attempt to rotate the vehicle and camera to maintain an orthogonal view to the wall. An average surface orientation in the central area of the camera field of view is used as a reference point to calculate the orthogonal.

6. Auto rotate to surface, snap to current angle—this mode is similar to "Autopoint to surface, orthogonal," but the system holds the current angle rather than attempting to maintain a normal angle to the surface. This mode is useful if the user wants to scan along a wall at an oblique angle.

7. Auto rotate to point—constrain the rotational motion of the vehicle as well as the pointing of the camera gimbal to keep the camera pointed at the set location on the environment surface. This would be useful for the operator to freely move the vehicle around, while looking at the same feature from multiple angles.

8. Snap to camera Field of View grid—constrain the translational motion to move by quantized horizontal 4306 or vertical distances, 4302 that are defined by a percentage of the field of view (FOV) of the camera along axis 4304 at the current distance to a surface of an object. For example, when the vehicle 4301 is looking at a tank wall, the camera outputs an image of the tank wall. A FOV 4310 quantized to move up 4314 or down moves the vehicle so that the camera image is exactly on top or on the bottom of the starting field of view. Similarly, a horizontal FOV quantized translation moves the vehicle left or right by one field of view 4312. The user may specify the desired amount of overlap. Shown in FIG. 43, for example, is an illustration of quantized translation using the FOV or a portion thereof to provide selected overlap.

9. Feature follow: this mode would use computer vision processing techniques to identify a linear or curve feature in the environment and constrain the translational and rotational motion to follow that feature. The operator can use this feature to follow features like a weld seam or edge of a wall.

Figure 44:
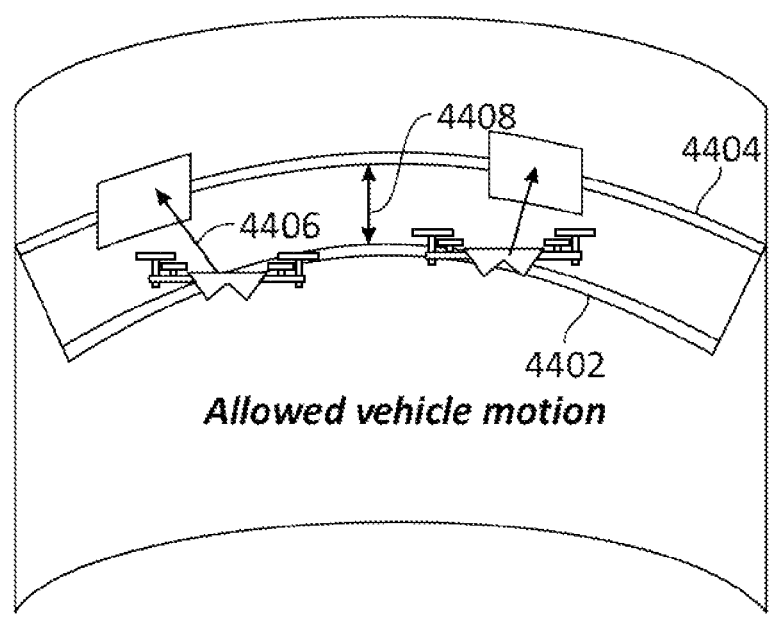
FIG. 44 illustrates an automated flight pattern where the vehicle follows the contour of a surface being inspected at a fixed distance and angle of orientation.
Figure 45:
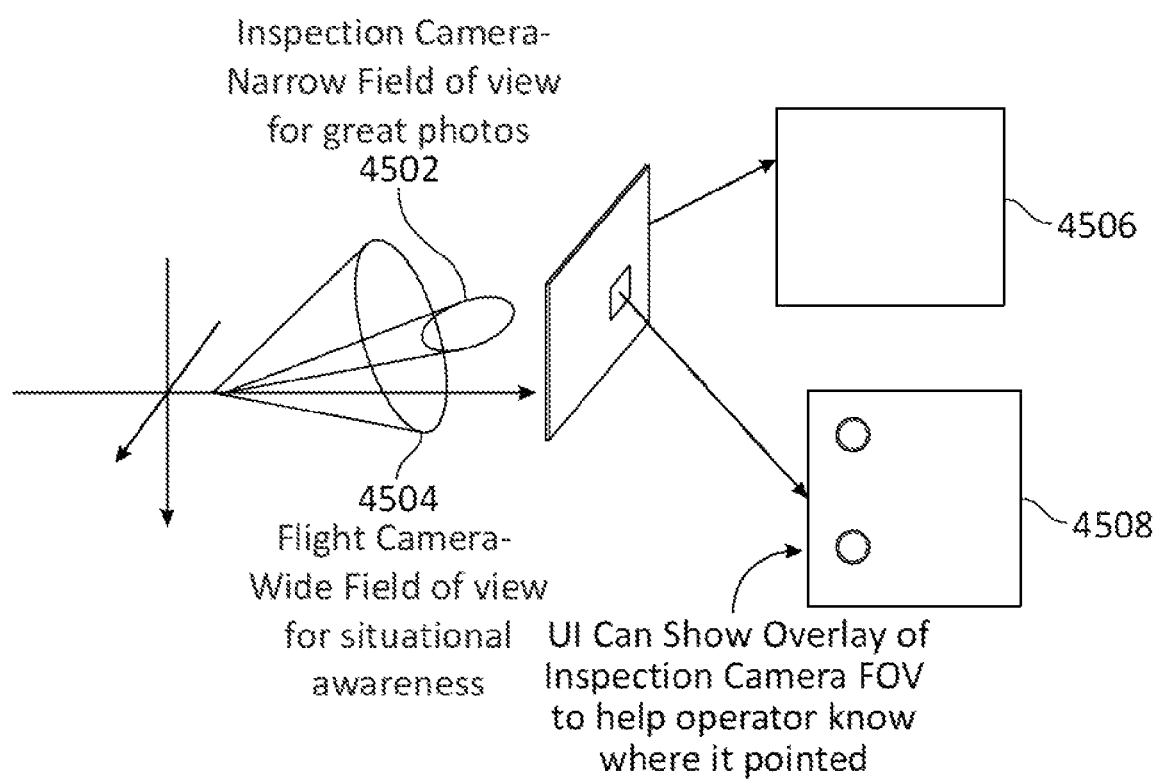
FIG. 45 illustrates overlapping fields of view for a plurality of cameras for high and low resolution images.

Multiple options can be enabled at once for a combinatorial constraint. For example, enabling options [Altitude hold]+[Surface offset]+[Autopoint to surface] can have the effect of constraining translational motion to the curve 4402 that is on the horizontal plane defined by the altitude hold toggle, and the distance from the surface 4408 defined by the surface offset toggle. The rotation of the vehicle can be constrained to keep the camera pointed at the local surface 4404. This is illustrated in FIG. 44. The angle 4406 of the camera orientation relative to the surface 4404 can also be constant or scanned through a selected range between about 10-80 degrees, for example.

In general, the operator is often not physically located in the same space where the object inspection is being conducted. It is very difficult for the operator to maintain awareness of the environment through a single first-person view camera. Embodiments provide situational awareness feedback mechanisms to help the operator maintain greater understanding of the local environment, and the inspection images that are being collected in that environment.

1. Haptic proximity indicator. Proximity to structures in the environment is communicated through haptic feedback in the joystick and other hand controllers. The intensity of the haptic signal may be used to indicate the nearness to the structure. Directional haptic signals may be used to indicate the direction of the hazard.

2. Visual proximity indicator. Proximity to structures in the environment is communicated through visual cues overlaid on top of the realtime video feed from the air vehicle. Indicator color, size, and blinking pattern of the signal may be used to indicate the nearness to the structure. Directional signals may be used to indicate the direction of the hazard.

3. Auditory proximity indicator. Proximity to structures in the environment is communicated through audio cues played through the ground control size. Pitch and sound patterns may be used to indicate the nearness to the structure. Directional audio signals may be used to indicate the direction of the hazard.

4. Field of View indicator. In some configurations, a high resolution, narrow field of view 4502 inspection camera may be used in conjunction with a lower resolution, wider field of view 4504 flight situational awareness camera. The high-resolution camera provides high quality images 4508 used to support inspection determinations, but may have higher latency. The low-resolution camera video has lower latency and wider field of view 4506, both of which are important for manual or assisted-manual flight by a human operator. To help the operator understand where the high-resolution camera is pointed, a visual overlay can be displayed to the operator to see a bounding box for the high resolution camera on top of the low resolution video display. Such a system is shown schematically in FIG. 45.

5. Situational awareness map Maintaining awareness of the physical structure is also important. In some cases, the navigation sensor may not be sufficient to produce a high accuracy map of the environment, but still provide a depiction or indication of the shape of surfaces in the environment. Visual displays that provide partial or full information of the shape of the environment and the vehicle position and orientation in the environment are included. These maps may be two dimensional or three dimensional, and include point clouds or rendered structure models. Because the map is intended for situational awareness, the map may be constructed with partial or noisy information, and rely on human cognition to understand the context of the information. For example, a partial two-dimensional point cloud showing part of a cylindrical tank is enough to provide an operator context to understand how large of a space the vehicle is in, and how close to the wall the vehicle is flying.

6. Direction of exit. It is important for the operator to maintain awareness of the direction of the exit. This is especially important at night when it is dark outside and there is not bright indicator of where the exit is. A direction to exit visual indicator will be included in the visual displays.

7. Safety indicators. Some configurations may carry additional sensors for safety and hazard detection, such as a gas detector. In this case, it is important to communicate that information with a high priority. Visual, audio, or haptic signals may be used to alert the user. A display illustrating these features is shown in FIGS. 46A-46Q.

Figure 46A:
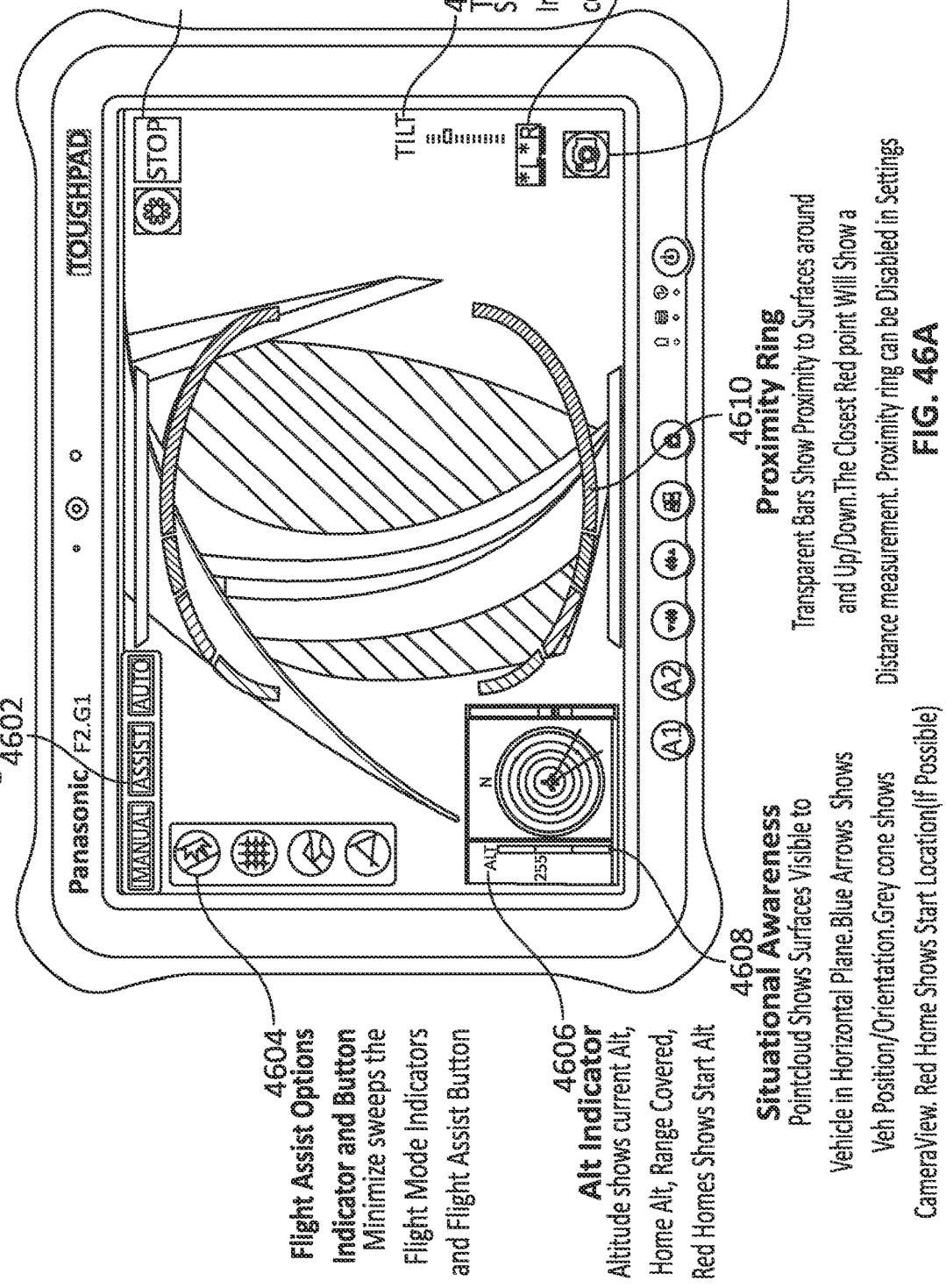
FIGS. 46A-46Q depict screenshots of the operator control unit (OCU) display.

FIG. 46A depicts an operator control unit (OCU) display 4600 for an unmanned aerial vehicle in an exemplary embodiment. The OCU display 4600 includes a flight mode indicator 4602 indicating whether the flight mode is in manual, assist, or automatic. The OCU display 4600 includes flight assist options 4604. The OCU display 4600 includes an altitude indicator 4606 indicating a current altitude, a home altitude, a range covered during flight, and the starting altitude. The OCU display 4600 includes a situational awareness map 4608, which is a cloud point map showing a surface visible to the unmanned aerial vehicle in a horizontal plane. An arrow on the situational awareness map 4608 indicates the vehicle's position and orientation. A cone on the situational awareness map 4608 shows the camera's view. A dot or house on the situational awareness map 4608 indicates a start location.

The OCU display 4600 further includes a proximity ring 6410 that includes transparent bars that show a proximity of the unmanned aerial vehicle to surface around and above and below. The closest red point will show a distance measurement. The proximity ring 4610 can be disabled in settings.

The OCU display 4600 includes an emergency stop 4612. A user can hold down the emergency stop 4612 for a predetermined amount of time, and a tunneling bar will appear. Tunneling is used to prevent an accidental shutdown. The OCU display 4600 includes tilt indicators 6414 that show camera tilt. The OCU display 4600 includes left/right LED indicators 4616 that shows left and right brightness of LEDs. The OCU display 4600 includes a photo button 4618 to trigger the camera on the unmanned aerial vehicle to take a picture.

Figure 46B:
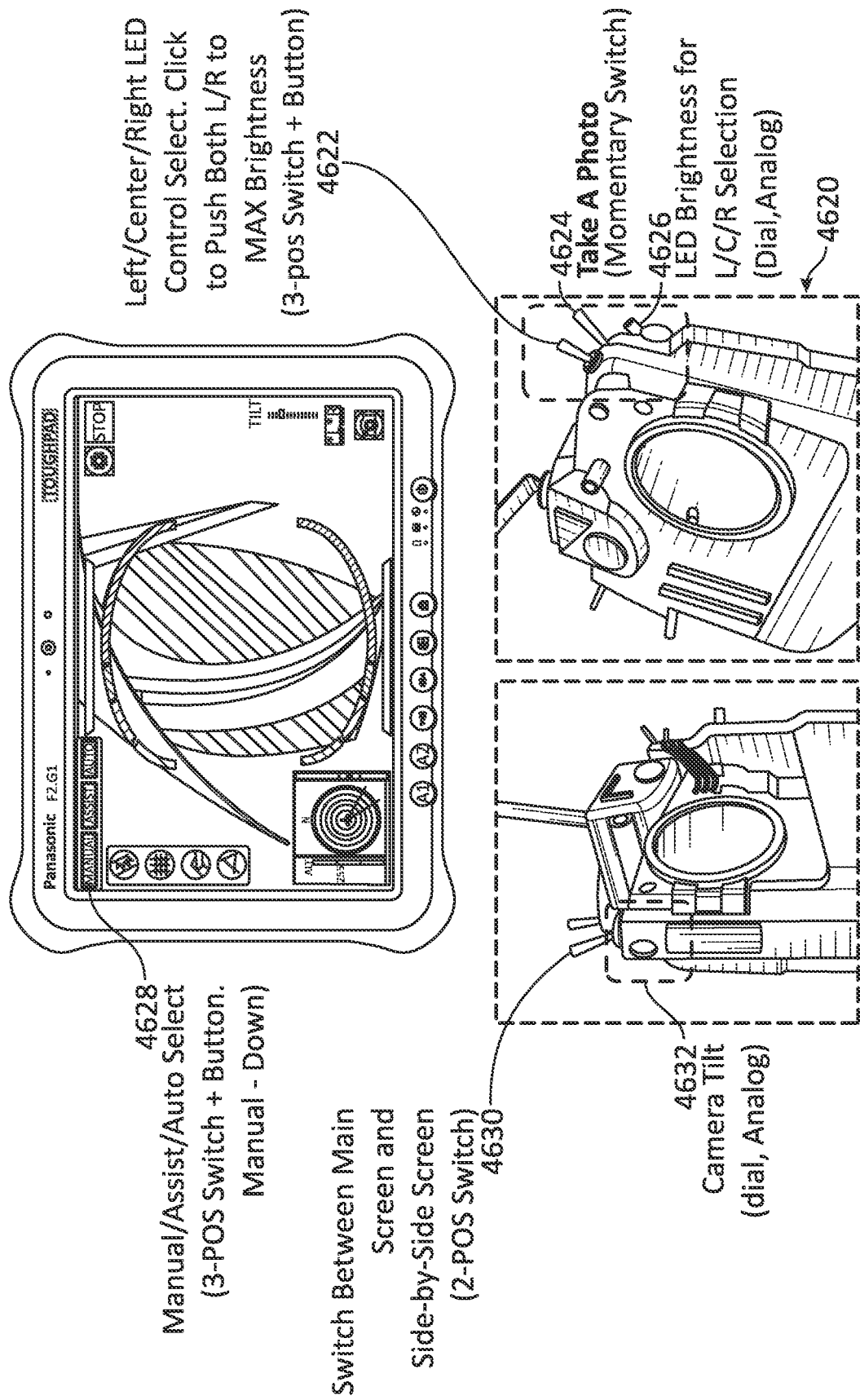

FIG. 46B depicts screenshots of a handheld control console 4620 associated with the OCU display 4600 shown in FIG. 46A. The control unit 4620 includes a switch 4628 for switching between manual, assist, and automatic modes. The control unit 4620 includes a switch 4630 for switching between a main screen and a side-by-side screen. The control unit 4620 includes a left/right/center LED control 4622, which is used to control brightness. The control unit 4620 includes a photo switch 4624 to take a photograph. The control unit 4620 includes a LED brightness switch 4626 for left/right/center selecting. As the display can comprise a tablet display with a touchscreen control panel, a user can actuate the operation described herein by touch gestures on the display screen.

FIGS. 46C-46F depict screenshots of the OCU display 4600 of user interfaces for entering mission details 4640 and beginning a mission.

Figure 46C:
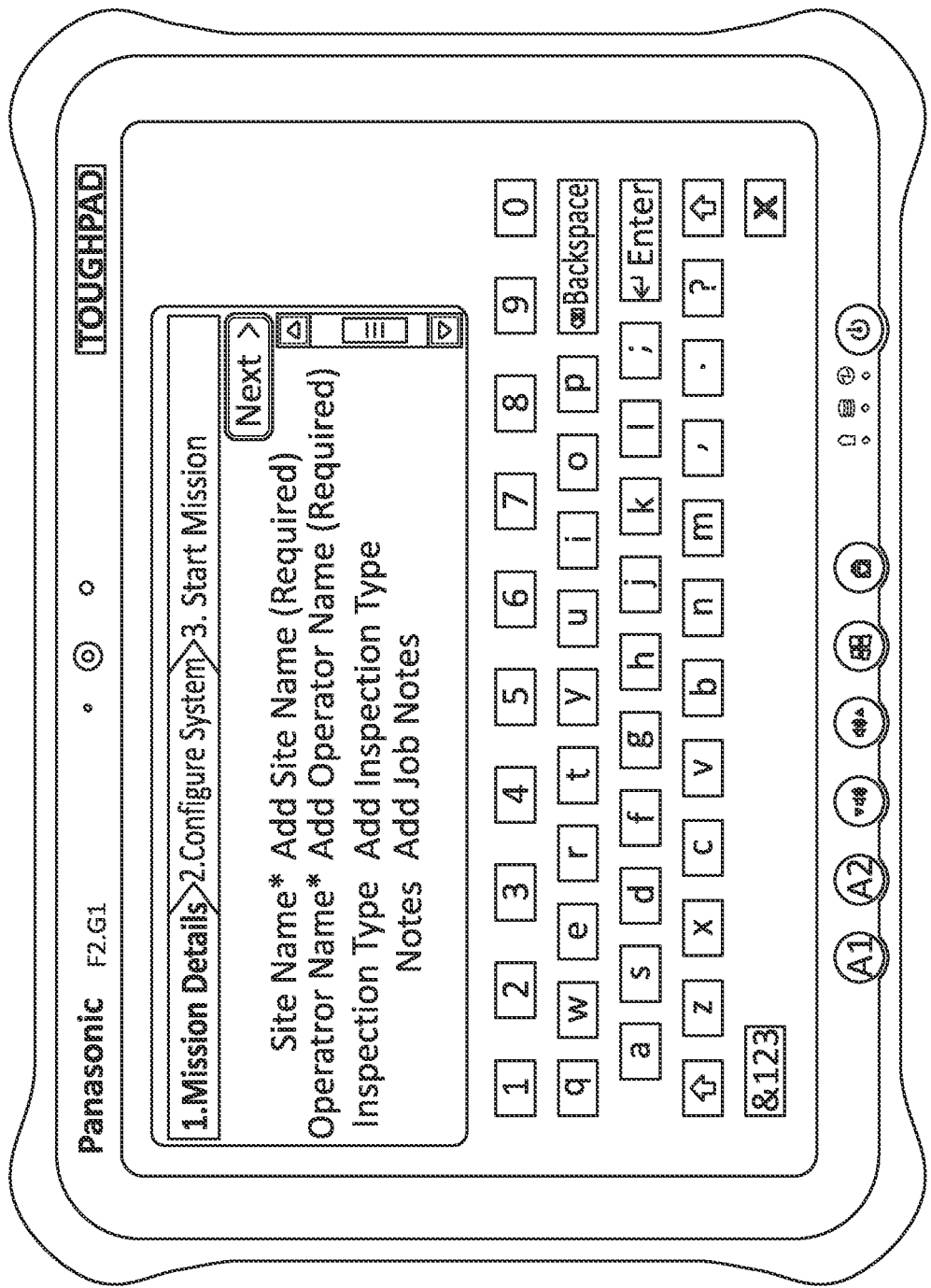

FIG. 46C depicts a screenshot of the OCU display 4600 displaying a screen for entering mission details. The user can type using the virtual keyboard.

Figure 46D:
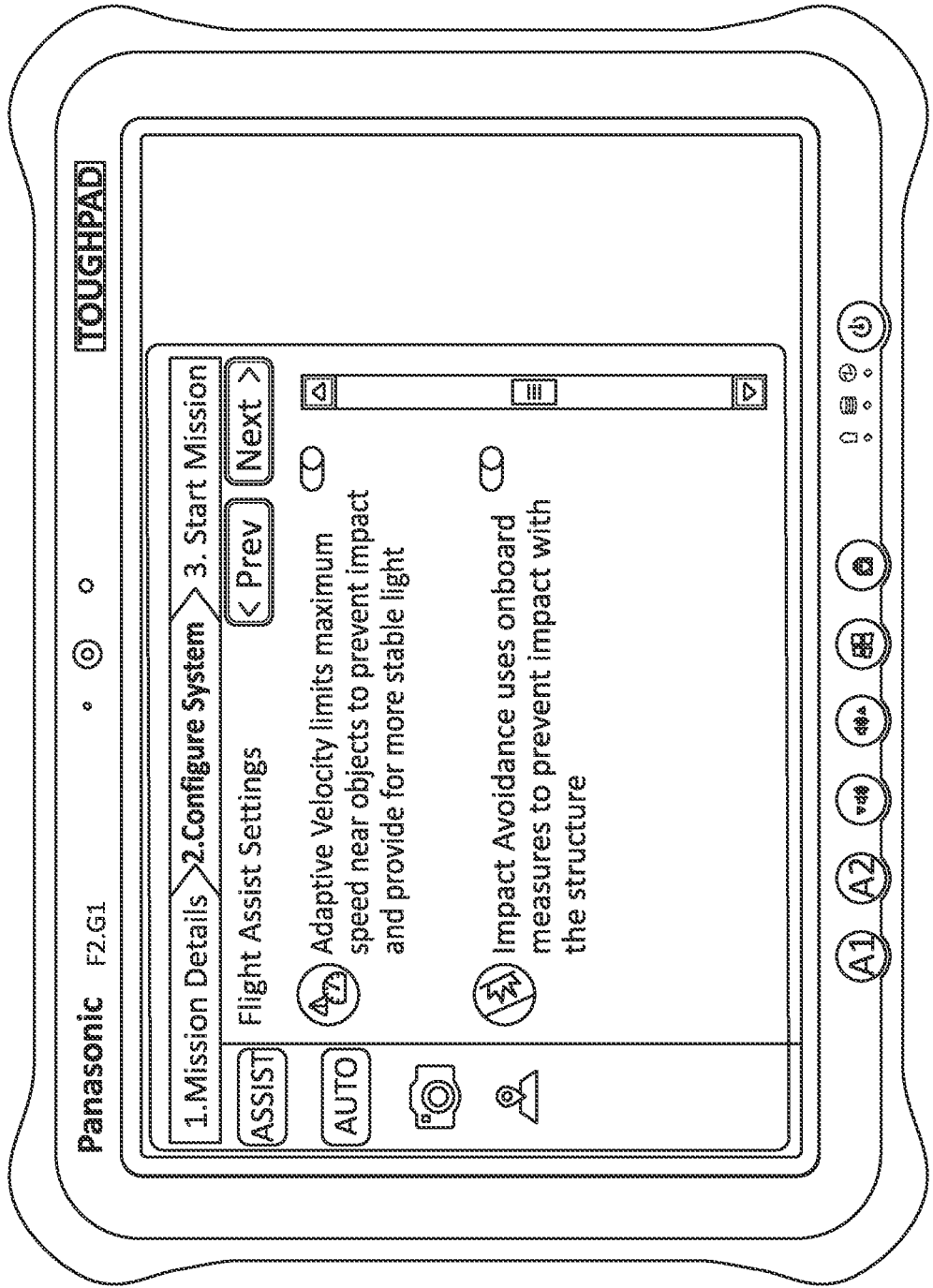

FIG. 46D depicts a screenshot of the OCU display 4600 displaying a screen for configuring 4650 the system, for example, user settings associated with flight assistance and automatic controls.

Figure 46E:
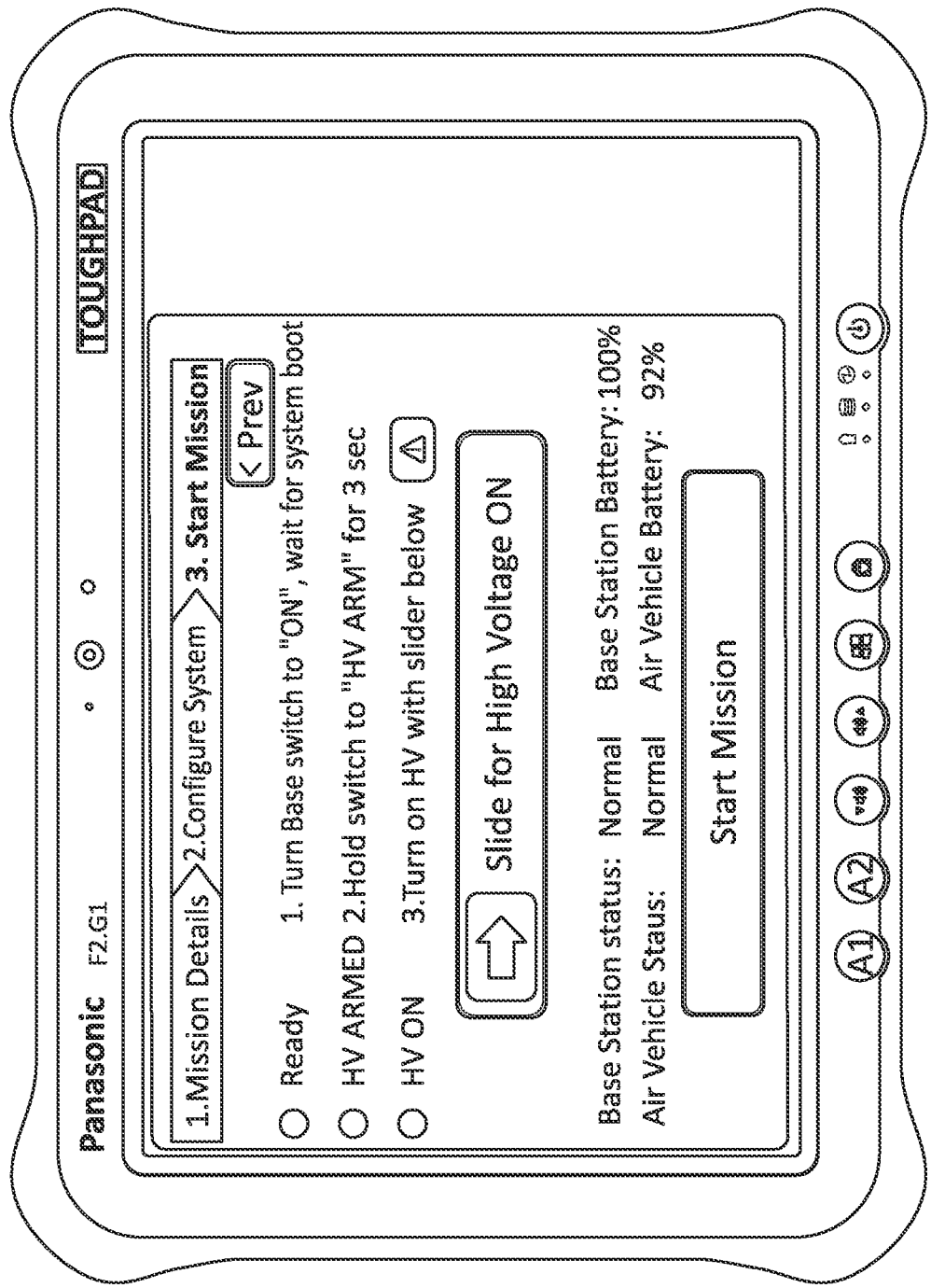

FIG. 46E depicts a screenshot of the OCU display 4600 displaying a screen for starting a mission, including 4660 an option for turning on high voltage to the unmanned aerial vehicle, an option for starting the mission, vehicle status and battery indicators.

Figure 46F:
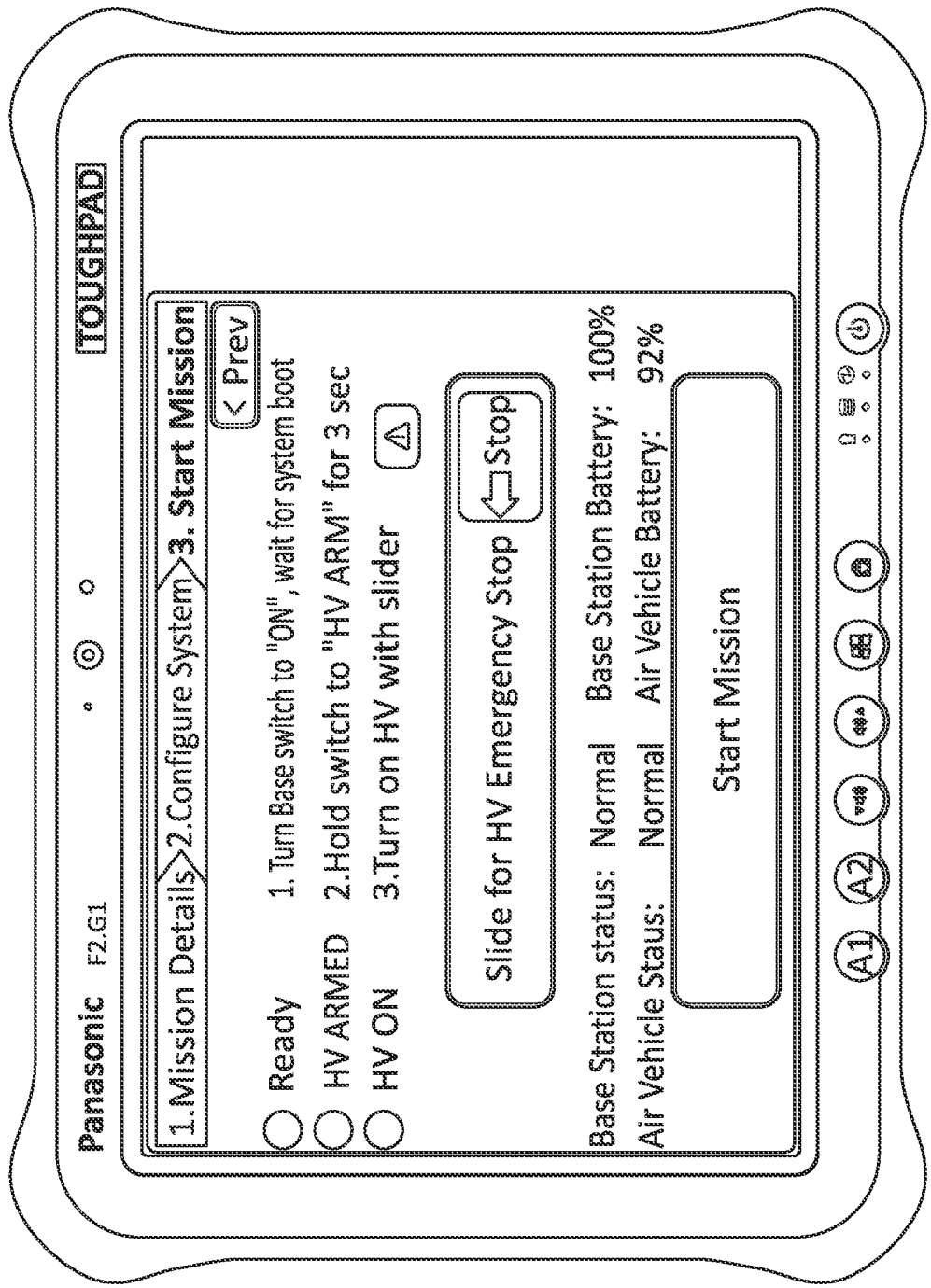

FIG. 46F depicts a screenshot of the OCU display 4600 displaying an option for shutting down 4662 the high voltage transmitted via the tether.

Figure 46G:
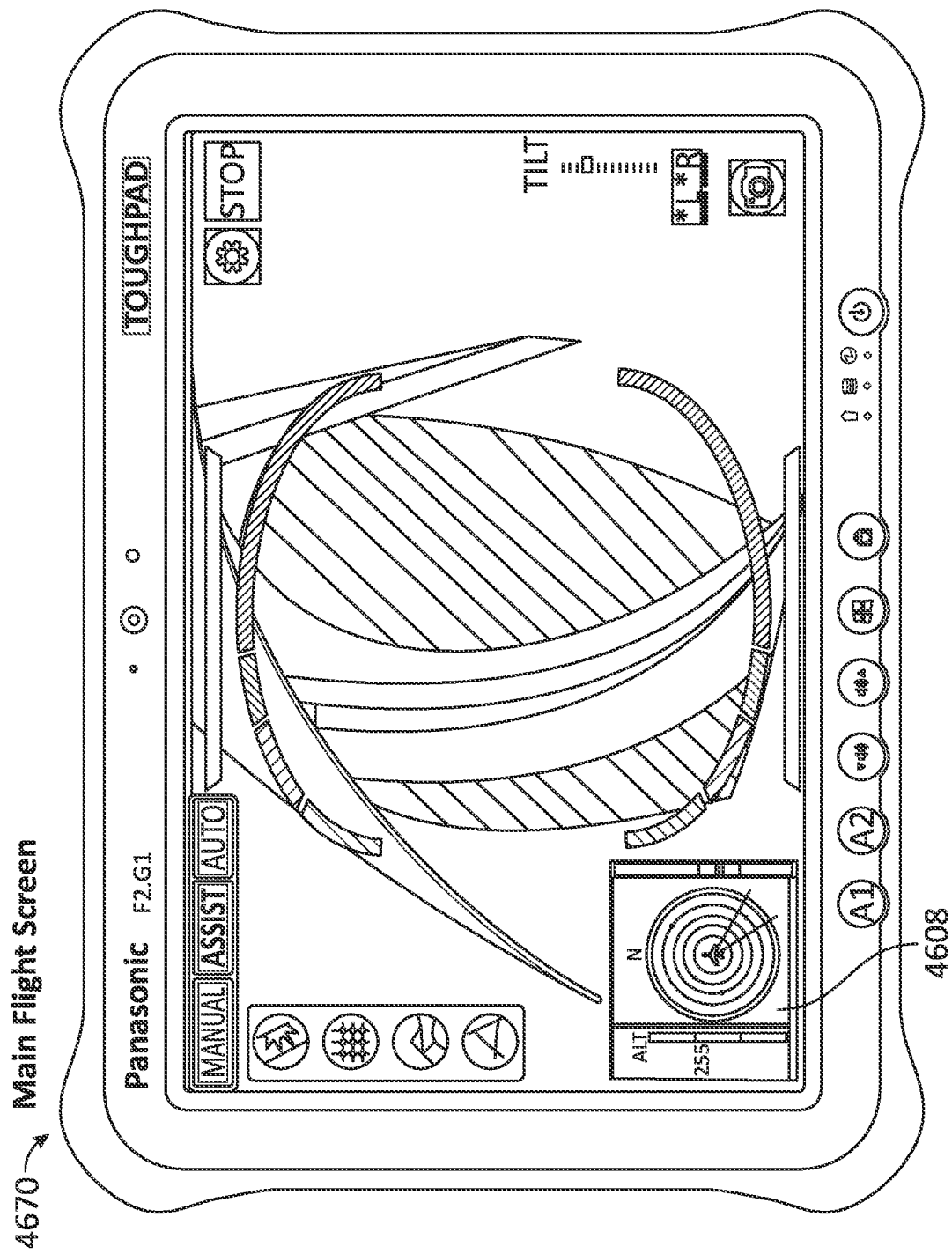

FIG. 46G depicts a screenshot of the OCU display 4600 displaying an image taken by a video camera on the unmanned aerial vehicle while the unmanned aerial vehicle is in assist mode. Bars located on the screen of the image indicate a distance 4670 between the unmanned aerial vehicle and objects, such as walls. In an exemplary embodiment, each bar is color coded to indicate a distance. The OCU display 4600 includes the situational awareness map 4608 showing a surface visible to the unmanned aerial vehicle in a horizontal plane. An arrow on the situational awareness map 4608 indicates the vehicle's position and orientation. A cone on the situational awareness map 4608 shows the camera's view.

Figure 46H:
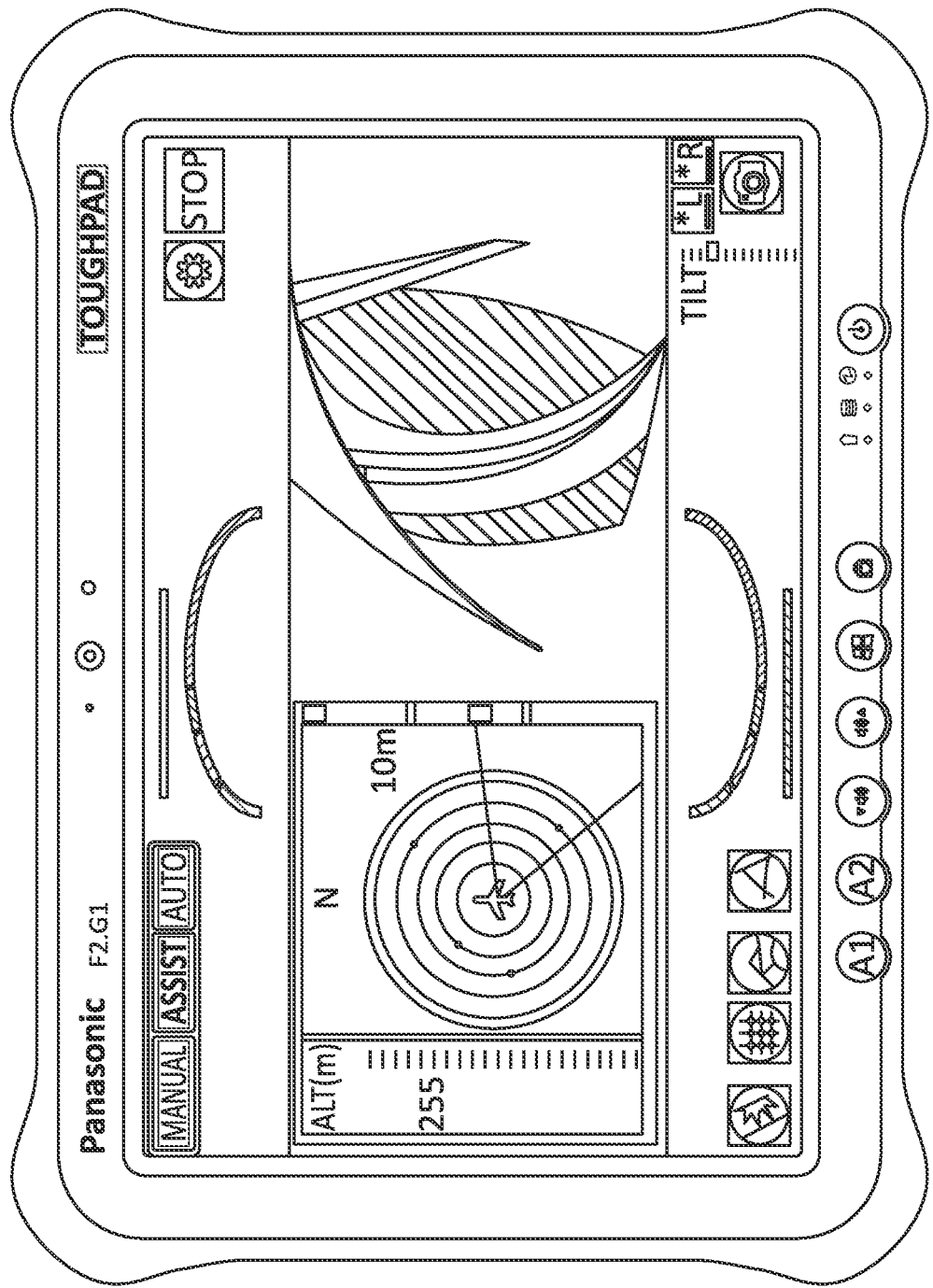

FIG. 46H depicts a screenshot of the OCU display 4600 displaying side-by-side screens 4672 of the image taken by a video camera and the situational awareness map 4608.

Figure 46I:
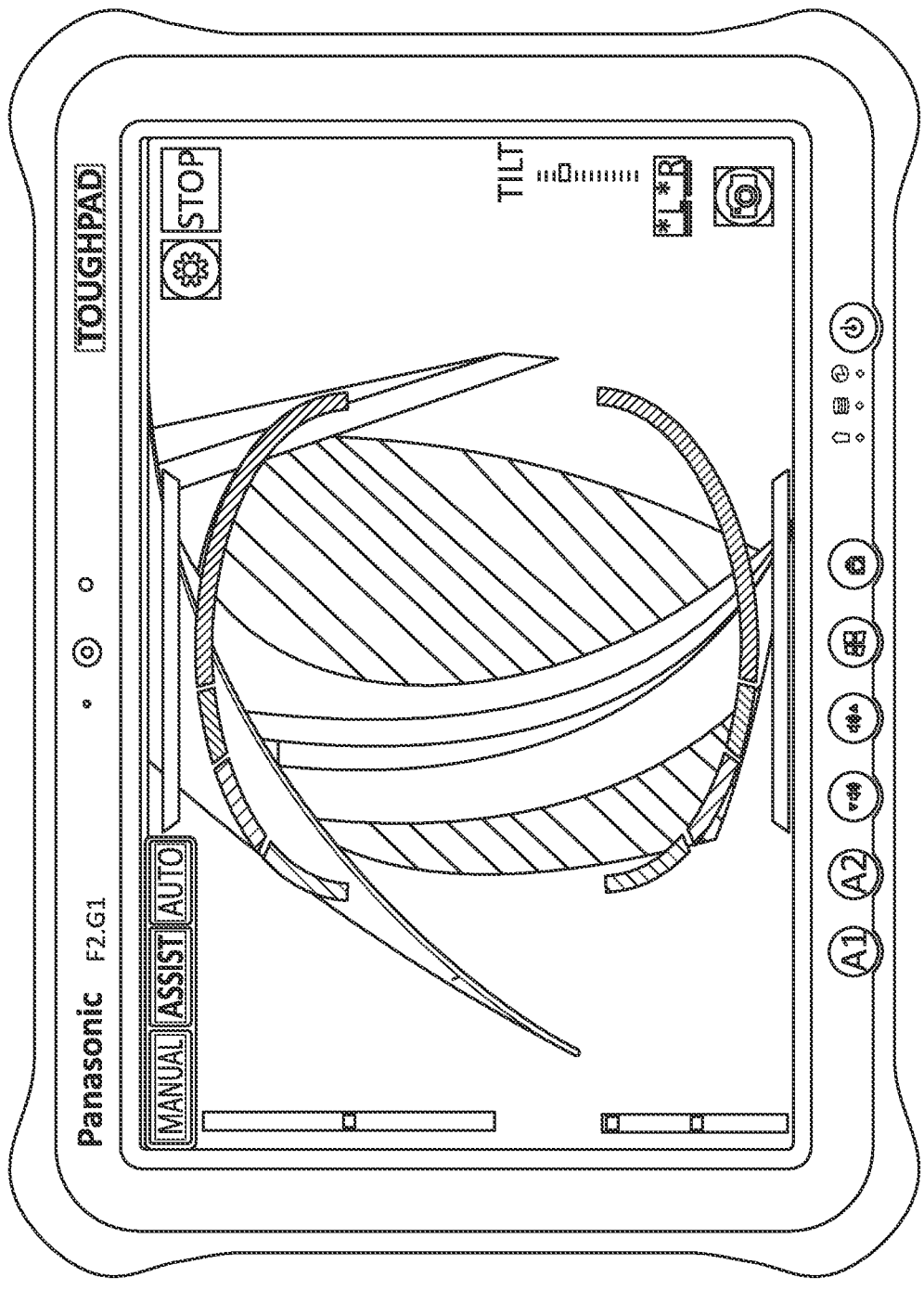

FIG. 46I depicts a screenshot of the OCU display 4600 displaying an image 4674 taken by a video camera with minimized options displayed on the display 4600.

Figure 46J:
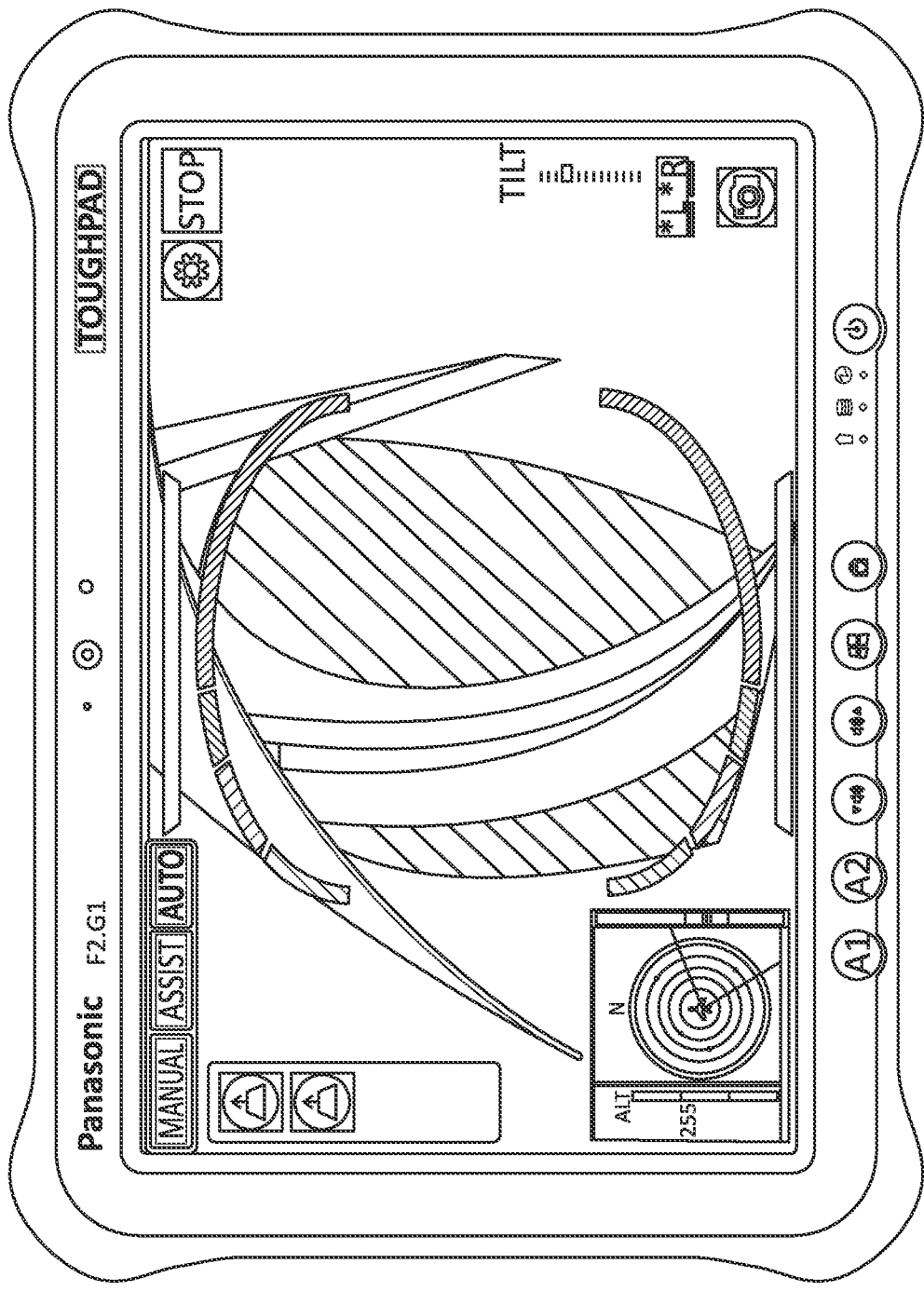

FIG. 46J depicts a screenshot of the OCU display 4600 displaying an image taken by a video camera on the unmanned aerial vehicle while the unmanned aerial vehicle is in automatic mode 4676.

Figure 46K:
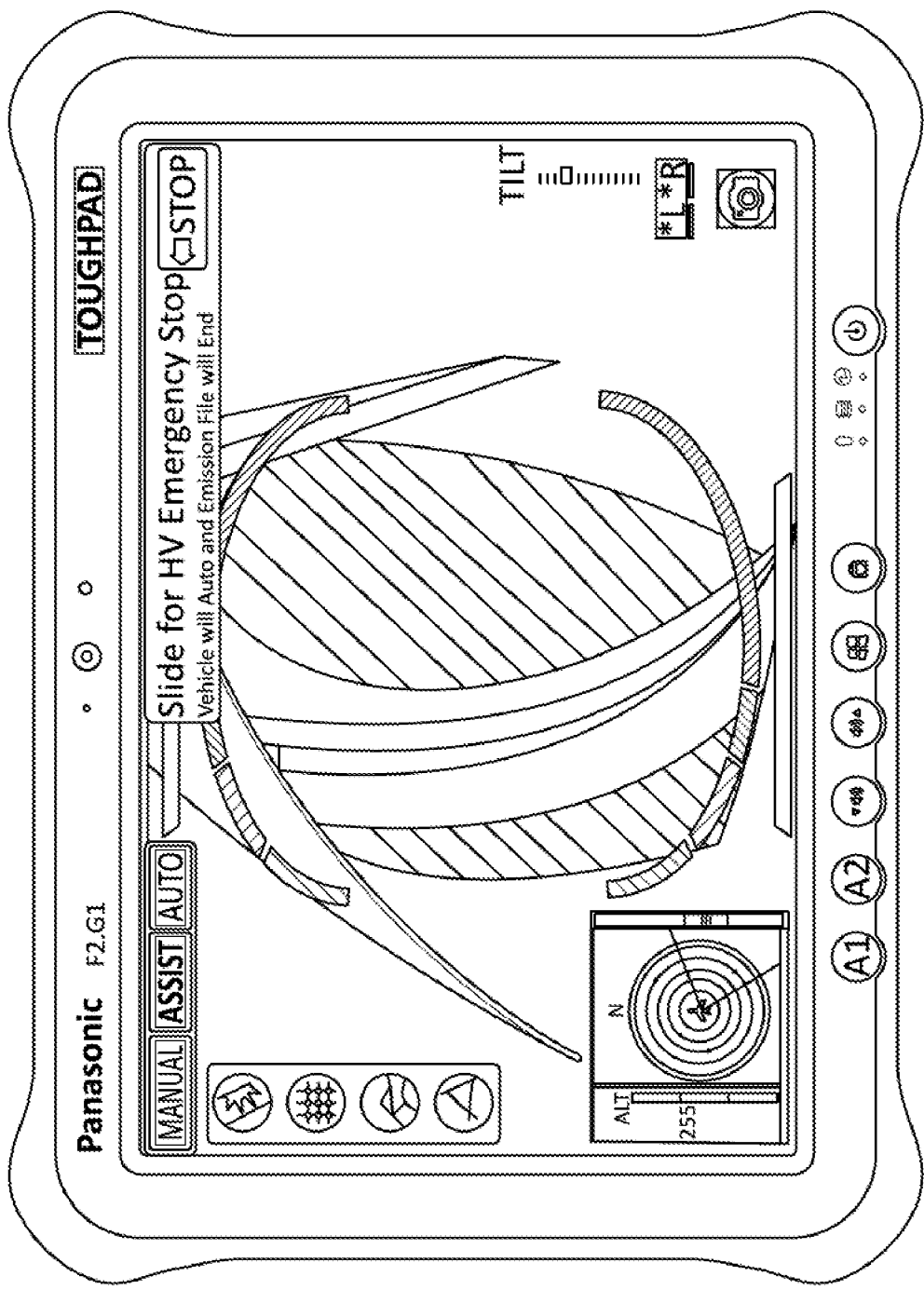

FIG. 46K depicts a screenshot of the OCU display 460 displaying an image taken by a video camera and an option overlaid 4678 on the image for shutting down the high voltage and performing an automatic landing.

Figure 46L:
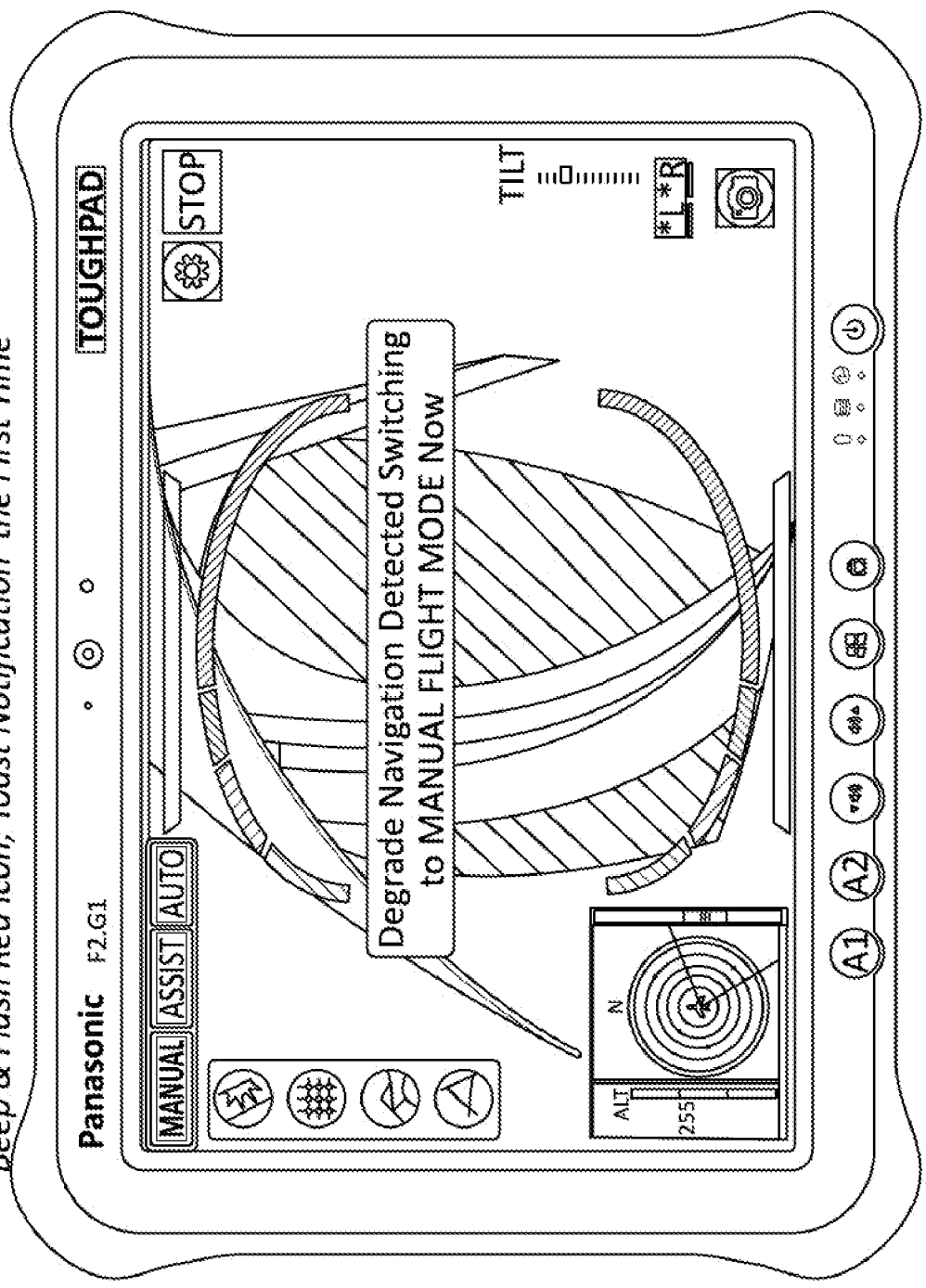

FIG. 46L depicts a screenshot of the OCU display 4600 displaying an image taken by a video camera and a notification overlaid 4680 on the image that the unmanned aerial vehicle is experiencing degraded navigation. The notification may notify the user that the unmanned aerial vehicle is switching to manual flight mode.

Figure 46M:
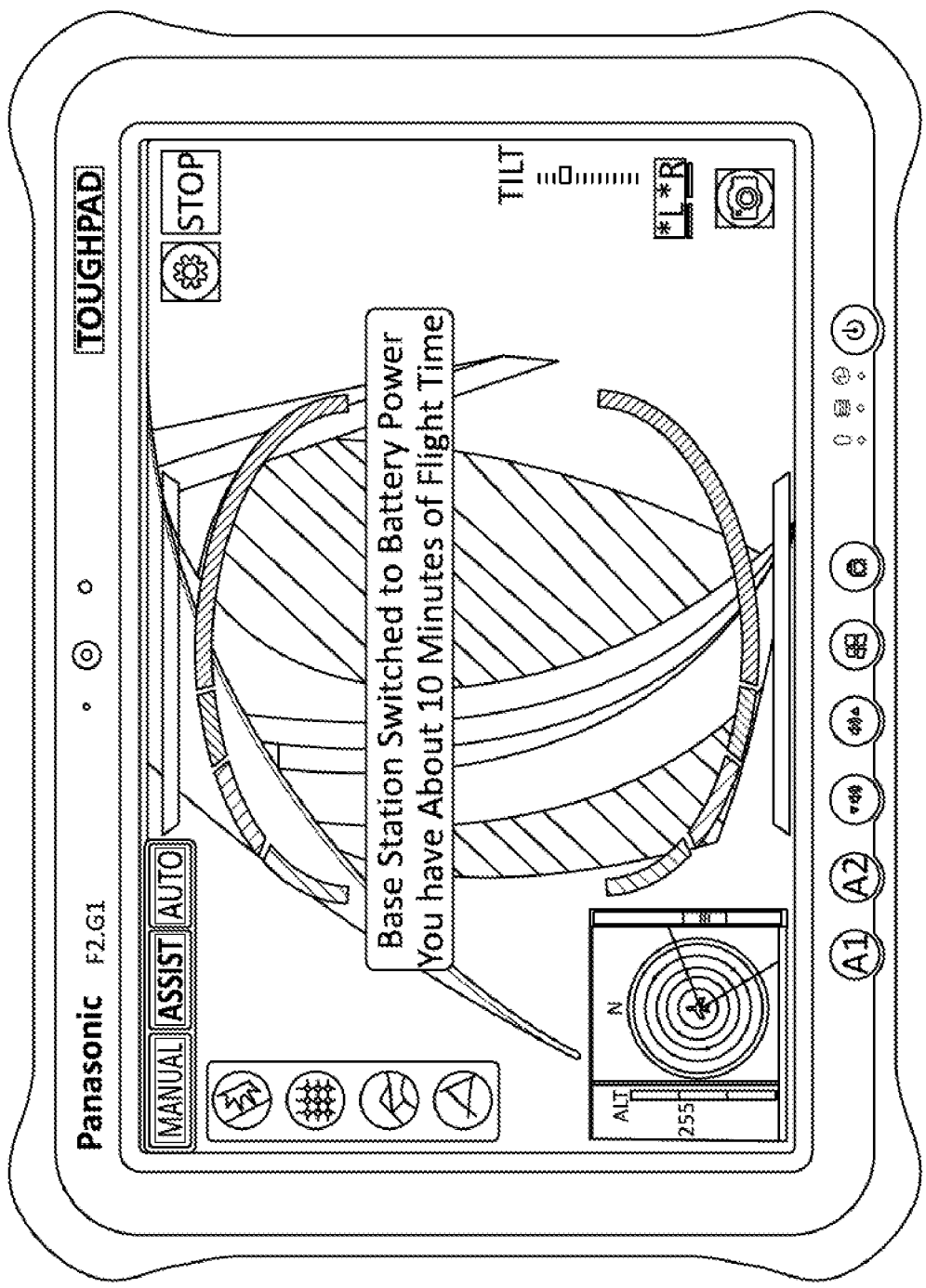

FIG. 46M depicts a screenshot of the OCU display 4600 displaying an image taken by a video camera and a notification overlaid on the image that the base station switched to battery power 4682 and there is a preset time period such as 10 minutes of flight time left.

Figure 46N:
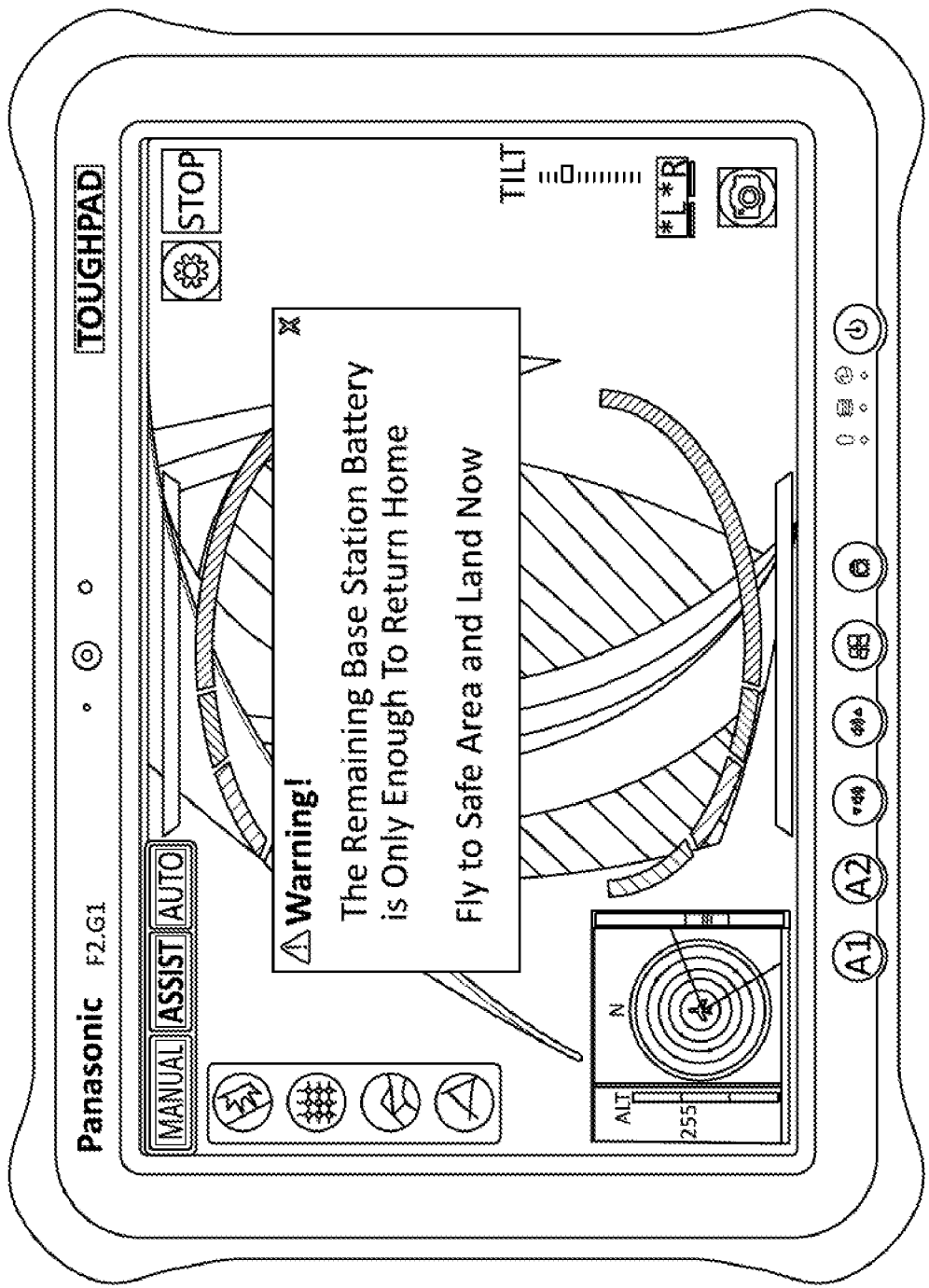

FIG. 46N depicts a screenshot of the OCU display 4600 displaying an image taken by a video camera and a base station battery low warning 4684 overlaid on the image. For example, the notification may indicate that the remaining base station battery is only enough to return home and to fly to a safe area and land.

Figure 46O:
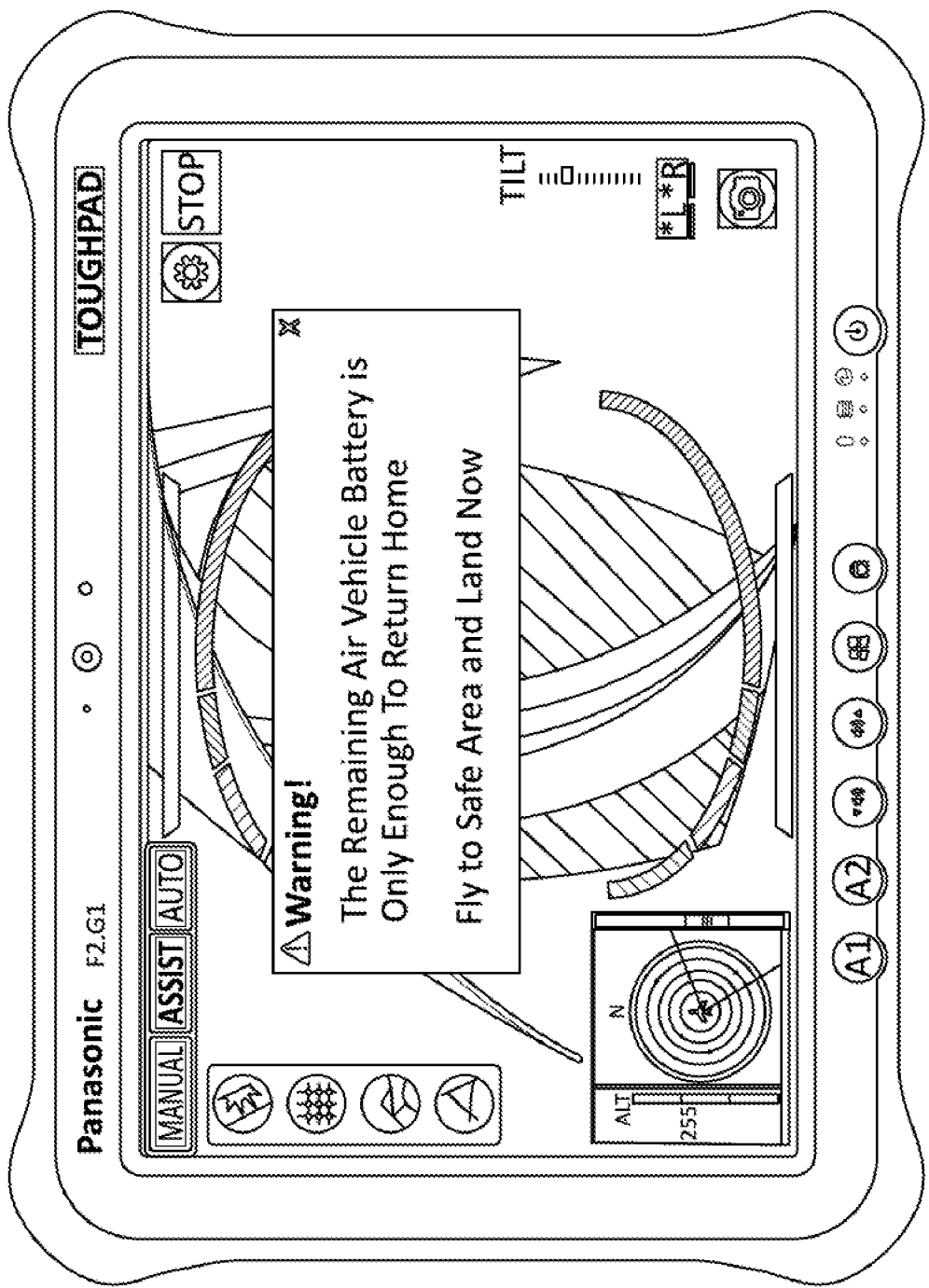

FIG. 46O depicts a screenshot of the OCU display 4600 displaying an image taken by a video camera and an air vehicle battery low warning overlaid on the image. For example, the notification may indicate that the remaining air vehicle battery is only enough to return home and to fly to a safe area 4686 and land.

Figure 46P:
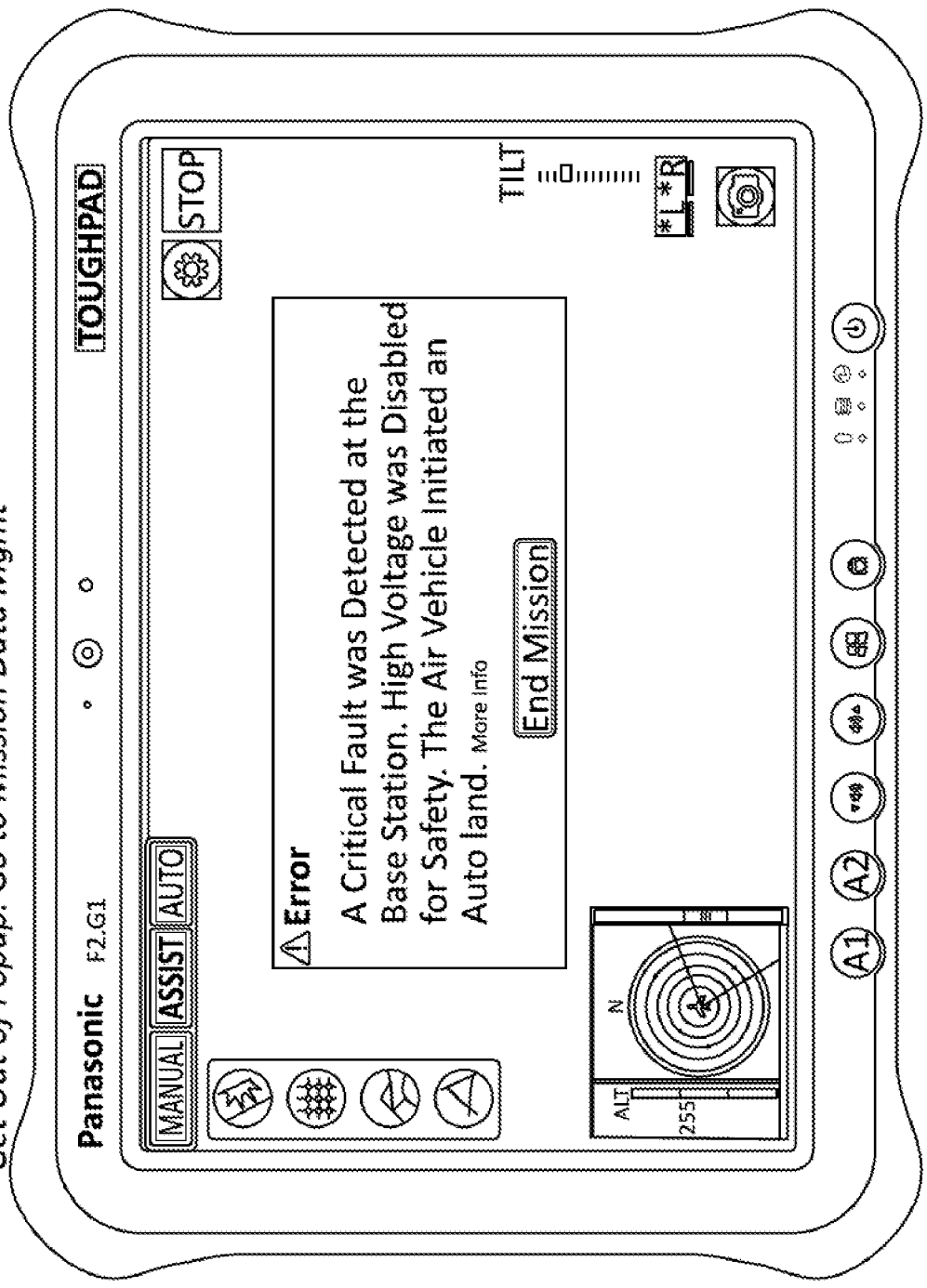
Figure 46Q:
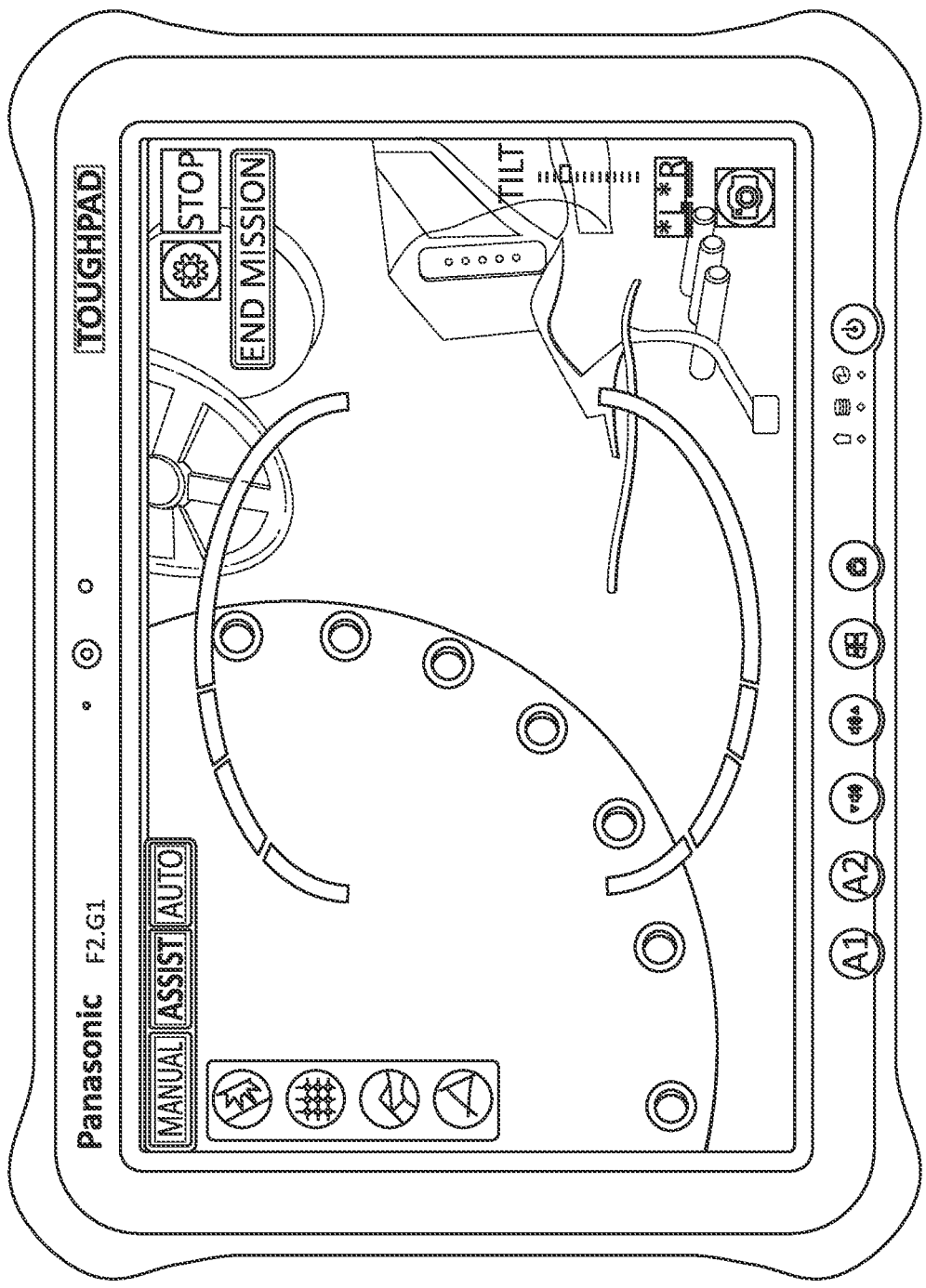
Figure 47:
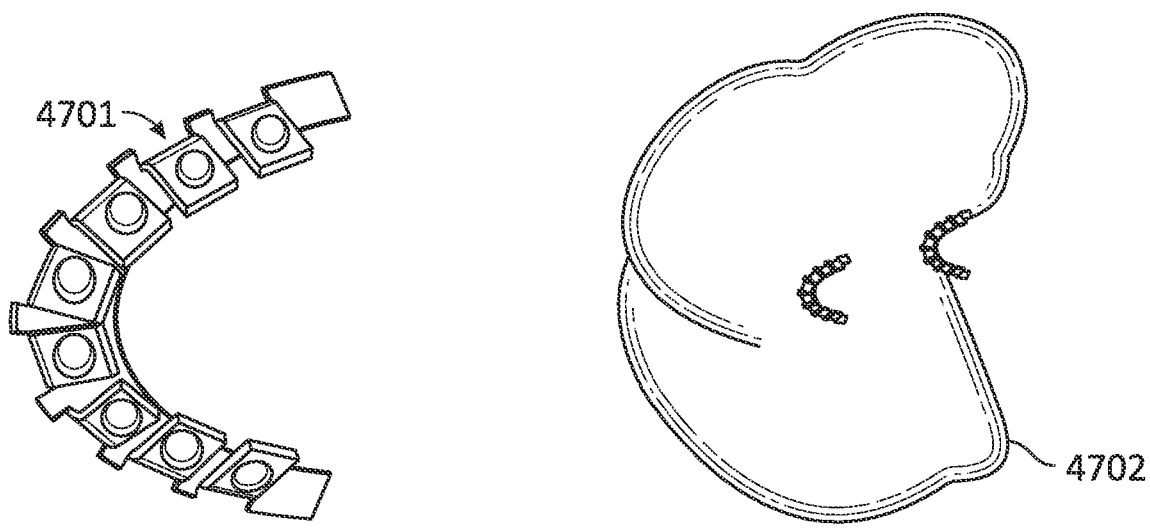
FIG. 47 illustrates an array of light source elements mounted on an aerial vehicle.

FIG. 46P depicts a screenshot of the OCU display 4600 displaying an image taken by a video camera and a base station high voltage fault warning 4688 overlaid on the image. For example, the notification may indicate that a critical fault was detected at the base station and the high voltage was disabled for safety.

FIG. 46Q depicts a screenshot of the OCU display 4600 displaying an image taken by a video camera and an option to end the mission when the system detects 4690 that the unmanned aerial vehicle is on the ground.

Most enclosed space inspections are conducted in locations that are unlit. An important aspect of our inspection drone is flexible and adaptive lighting. This is critical to ensuring the operators can capture the proper views of the surfaces they are inspecting.

A significant challenge to enclosed space inspection with drones is the particulates in the area. Many spaces are dusty or have particulate residue from the industrial process. The drone or natural airflow can stir up the particulates. If the camera and light source are nearly co-located, the resulting video can have significant particulate reflections. Preferred embodiments include a bank of individually controllable lights or LEDs 4701 that are positioned at a variety of angles, so that light can be produced directly towards the surface of interest, or side-lighting the surface of interest. Some defects are more readily observable with side lighting. The lights are also are installed at an offset from the camera. One embodiment is shown FIG. 47 wherein a curved array of lighting elements (LEDs) 4701 can be mounted at one or more locations on the vehicle, preferably in symmetric alignment with the camera position and FOV axis, optionally on the gimbal used to position the camera. As the vehicle moves from a first to a second position, the field of the illumination pattern 4702 moves in a corresponding manner.

This approach has several advantages:

Reduced reflections. Multiple lights at varied angles produces more diffuse light, reducing particulate reflections.

Steerable light. The lights can be automatically steered to coordinate with the camera gimbal. This produces light in the correct direction while conserving power.

Automatically adapt to improve image quality in closed-loop fashion, based on the image quality. Image processing algorithms can detect over exposure or the quality of the available features and produce an output signal to control the light array.

Automatically sweep through multiple light conditions. The lighting pattern can also be controlled to step through a series of configurations and timed to correspond to the high resolution inspection camera. This will allow the operator to rapidly acquire a set of images of the surface or object of interest under a range of lighting conditions.

Merge images with different light conditions. Images with multiple light conditions may be synthesized into a single enhanced image to provide more information to the user.

Figure 48A:
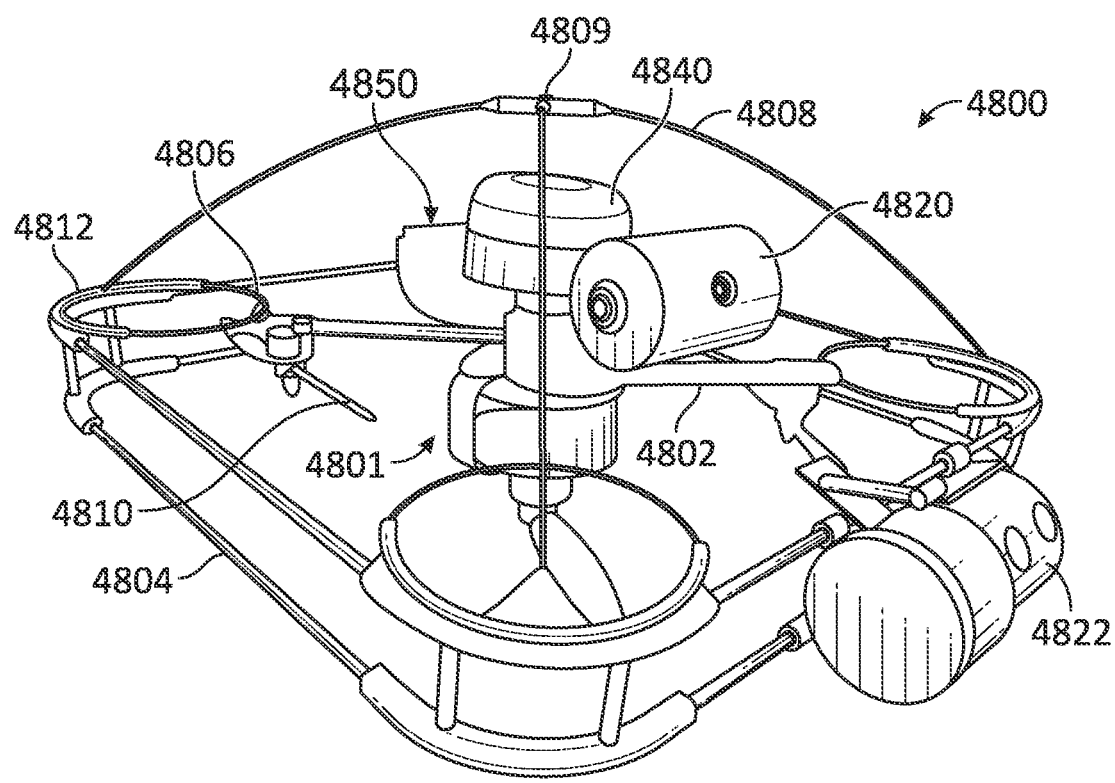
FIGS. 48A-48C illustrate an embodiment of an aerial vehicle in accordance with the invention.
Figure 48B:
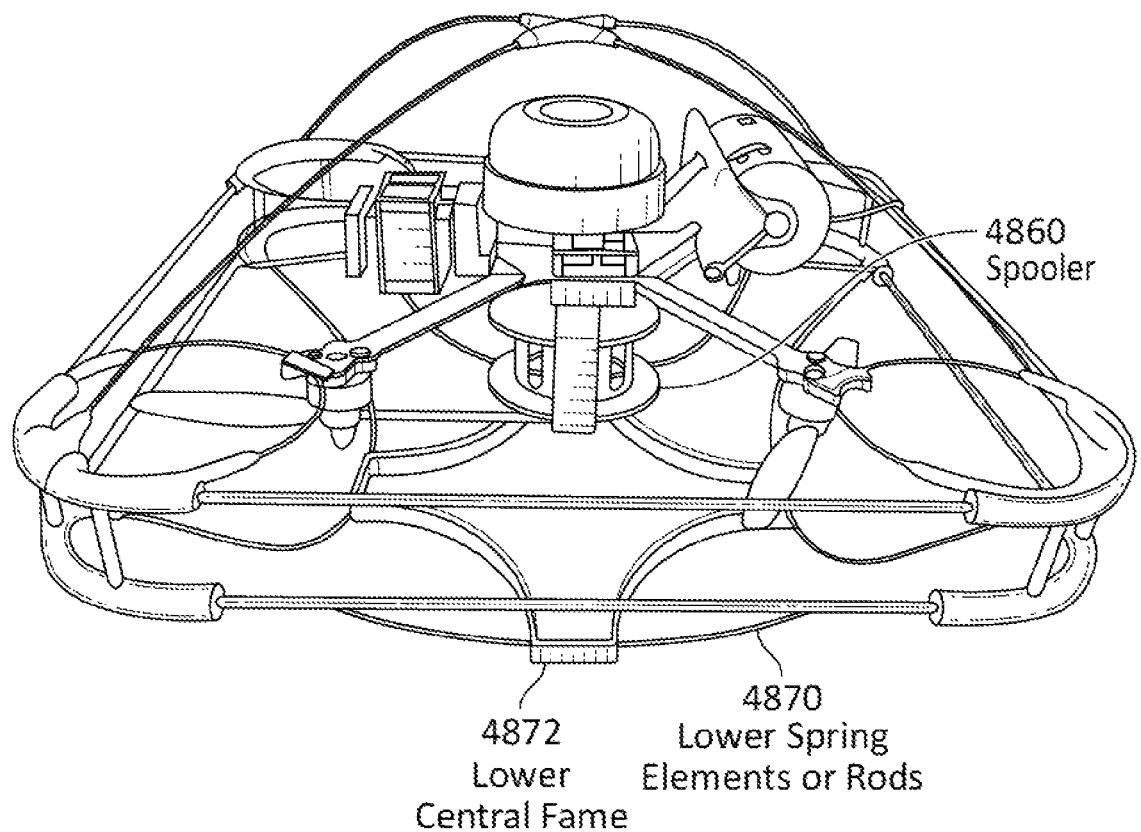
Figure 48C:
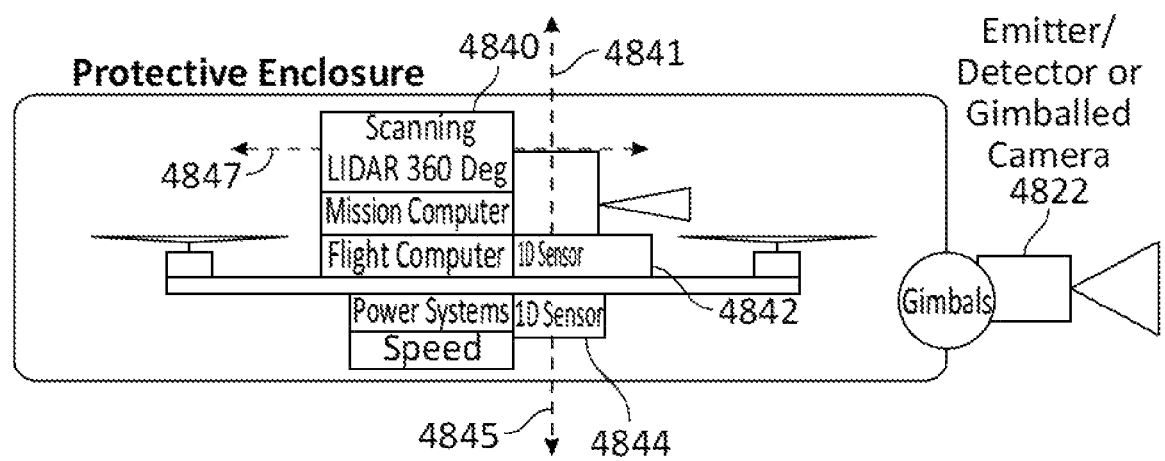

The aerial vehicle can include a protective cage to make it robust to maintain flight during impacts and to prevent ingestion of the tether. The cage is mounted to the airframe with a series of wires springs, currently in the form of a hoop. These springs provide shock absorption for impacts with the environment. The cage design also includes upper protection in the form of arches over the top of the vehicle. The arch elements provides strength against bumps with the ceiling. The landing structure on the lower part of the cage is a wire arch or hoop. It is placed to minimize interference with the airflow and with downward pointing sensors. A preferred embodiment is illustrated in FIGS. 48A-48C. Air vehicle 4800 in this embodiment is a small four rotor 4810 system with an external frame 4804 or cage that extends around the vehicle in the central horizontal plane. The frame 4804 can be spring mounted to the rotor struts 4802 with springs 4806 which, in this example, are at the four corners corresponding to the rotor mount positions. The protective frame, bumper system or cage can have spring rods 4808 extending above the vehicle to protect from an impact on the top of the vehicle. A sensor 4809 can be mounted at the top to detect impact and stop the vehicle. An optional contact sensor, radar emitter/detector or gimballed camera 4822 can be mounted to the frame. Preferably a gimballed camera 4820 is mounted on the central air frame 4850 with electronics and a central scanning Lidar 4840 that detects objects in a horizontal plane 4847 above the frame 4804. Shown in FIG. 48B are the centrally mounted spooler 4860, the central lower frame 4872 through which the tether is deployed and the lower spring elements or rods 4870 that reduce the risk of impact. FIG. 48C shows Lidar 4840 scanning in the plane 4847 and 1D sensor 4842 detecting to one side of the vehicle along first direction 4841 and a second 1D sensor 4844 sensing in second direction 4845. Directions 4841 and 4845 can be on opposite sides of the vehicle, such as above and below the vehicle, for example.

The system cage is also capable of integrating sensors to enable contact sensor measurements in the inspection gage. For example, and ultrasonic thickness gage is used to provide wall thickness measurements, which are important in evaluating the state of a vessel.

In addition to providing situational awareness about the environment and motion constraints to assist user driven flight, several automated behavior modes are available.

Impact prevention—when a surface is detected to be closer to a settable distance to the air vehicle, the system will apply active control commands to prevent the vehicle from moving closer to the surface. The user can turn this feature on and off for situations when they are deliberately maneuvering in a tight space.

Waypoint navigation—when a known map of the environment is available, the vehicle can follow a series of waypoints defined in a mission planning tool or input file. A waypoint may define both a position in space, as well as the angle or series of angles. This enables the user to plan a series of critical inspection images take at multiple positions and/or angles.

Replay past inspection—use a previously collected environment map and flight history to repeat a prior flight. This is useful for when an inspector wants to collect the same flight path again to understand changes and do side-by-side comparisons.

Landmark relative navigation—when a map of the environment is not available, the vehicle will be able to follow landmark relative navigation. For example, in a pipe structure, the vehicle will be able to recognize that a pipe has a split, and follow instructions to take the first right.

Tether-aware path planning—use a map of the environment to plan a route that includes a factor in the optimization cost function to account for the tether location. This prevents wrapping the tether around objects and reduce likelihood of snagging the tether on objects in the environment.

Auto Explore—automatically search an expanding space to maximize coverage. Autoland—when an unsafe condition is detected, automatically land the vehicle. Turn off power depending on conditions.

Fully autonomous inspection—system autonomously explore a known or unknown space and response to features that are detected in the environment. A known space would have a map, while an unknown space would be explored systematically. The features that would be detected would include defects such as cracks or corrosion, missing bolts, unexpected objects or trash, or other user defined features. The response behaviors can include taking pictures at multiple angles/lighting conditions, alerting the user, collecting additional sensor measurements, conducting a surface contact measurement.

Figure 49A:
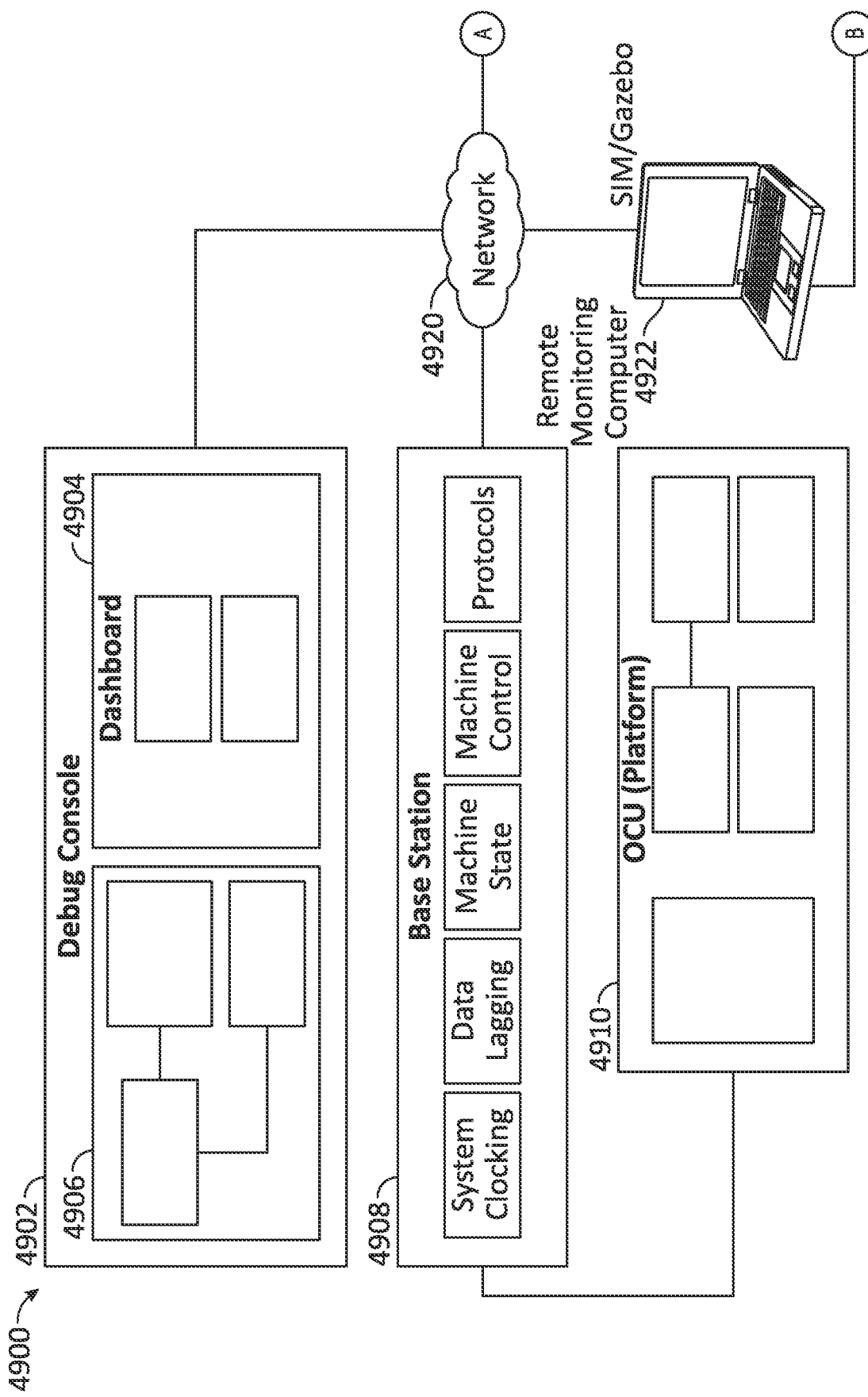
FIGS. 49A-49B illustrates a software control system.
Figure 49A:
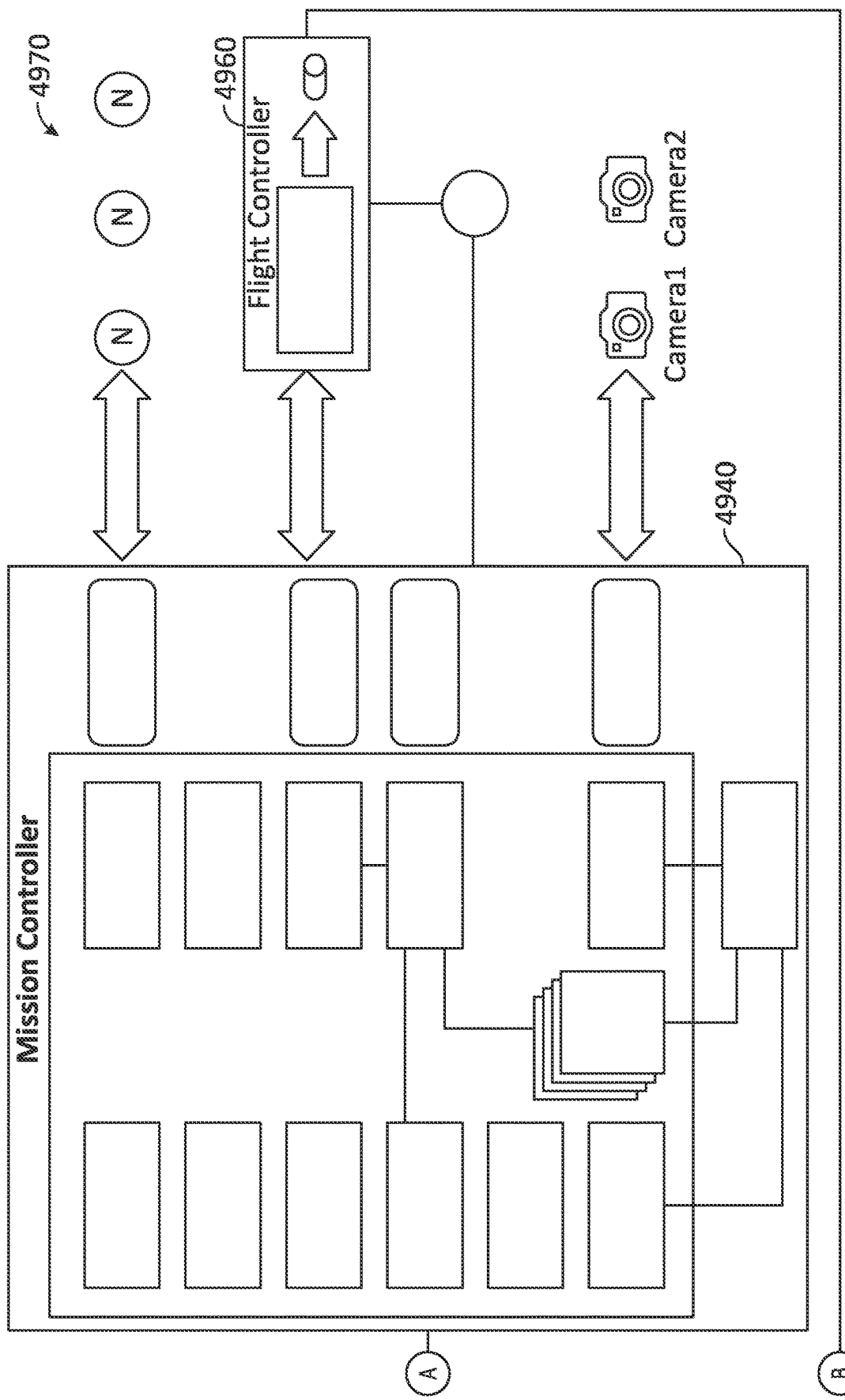
Figure 49B:
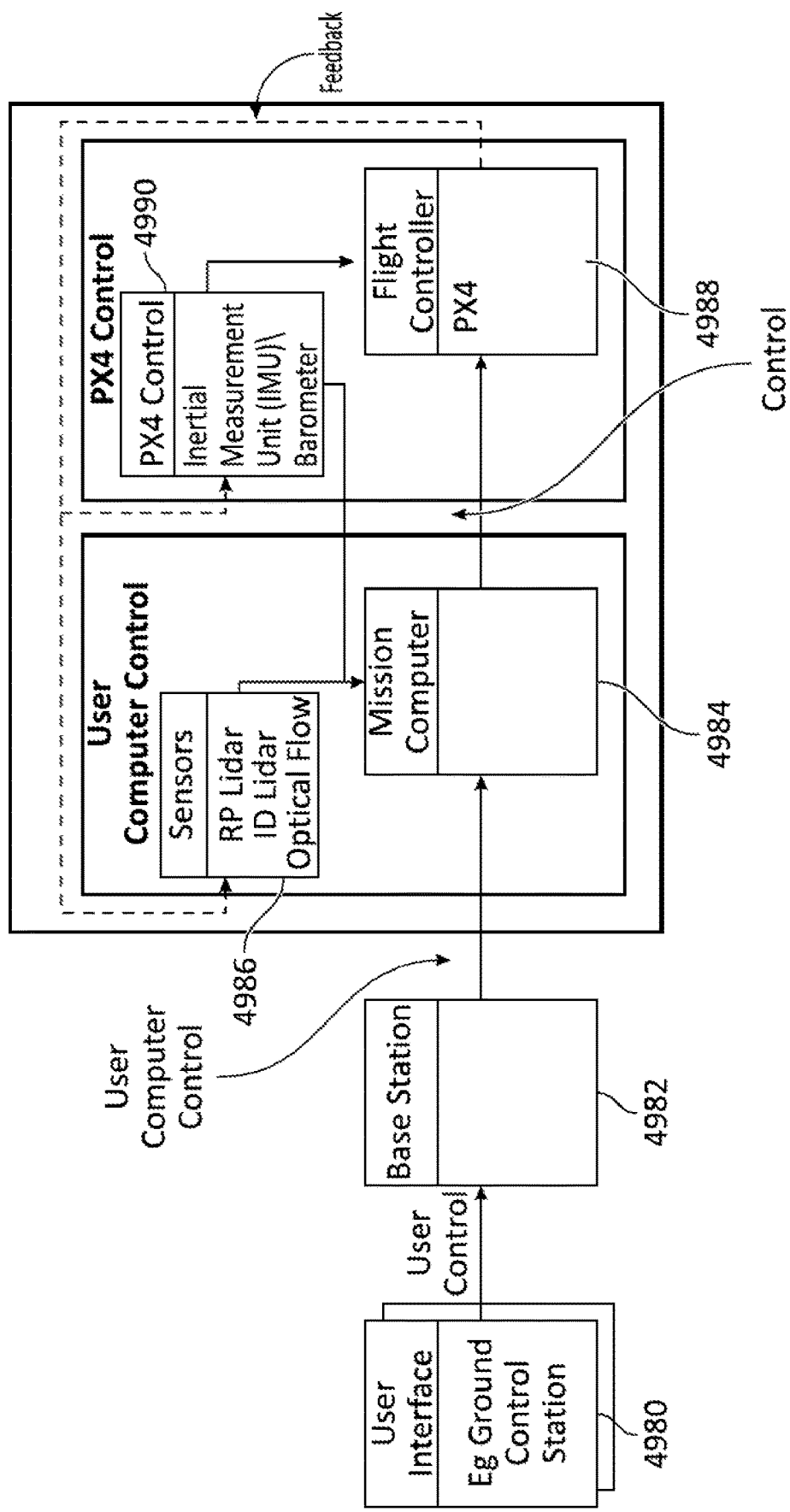

Illustrated in FIGS. 49A-49B are software control system 4900 details providing the user with tools to select system operating parameters. The software modules for those deployed on the handheld console 4902 in which a joystick and control panel operate a dashboard 4904. The base station 4908 features include data lagging, machine state and control, system clocking and protocols for operation. The OCU 4910 includes a graphical user interface operated via touchscreen and console control functions. The system elements can be connected via a network 4920 to a remote monitoring computer 4922. The mission control 4940, can have a central processor (GPU) connected to a code library, and operating modes with parts to sensor 4970, cameras and the flight controller 4960. The system is more generally illustrated in FIG. 49B as including a user interface 4980, the base station 4982 that is connected to the aerial vehicle control system 4984 using the tether. Flight controller 4988 receives commands from computer 4984 and inputs from flight control sensors 4990 (inertial measurement unit) IMU, barometer, etc. The Lidar and optical flow data 4986 are delivered to computer 4984.

Figure 50A:
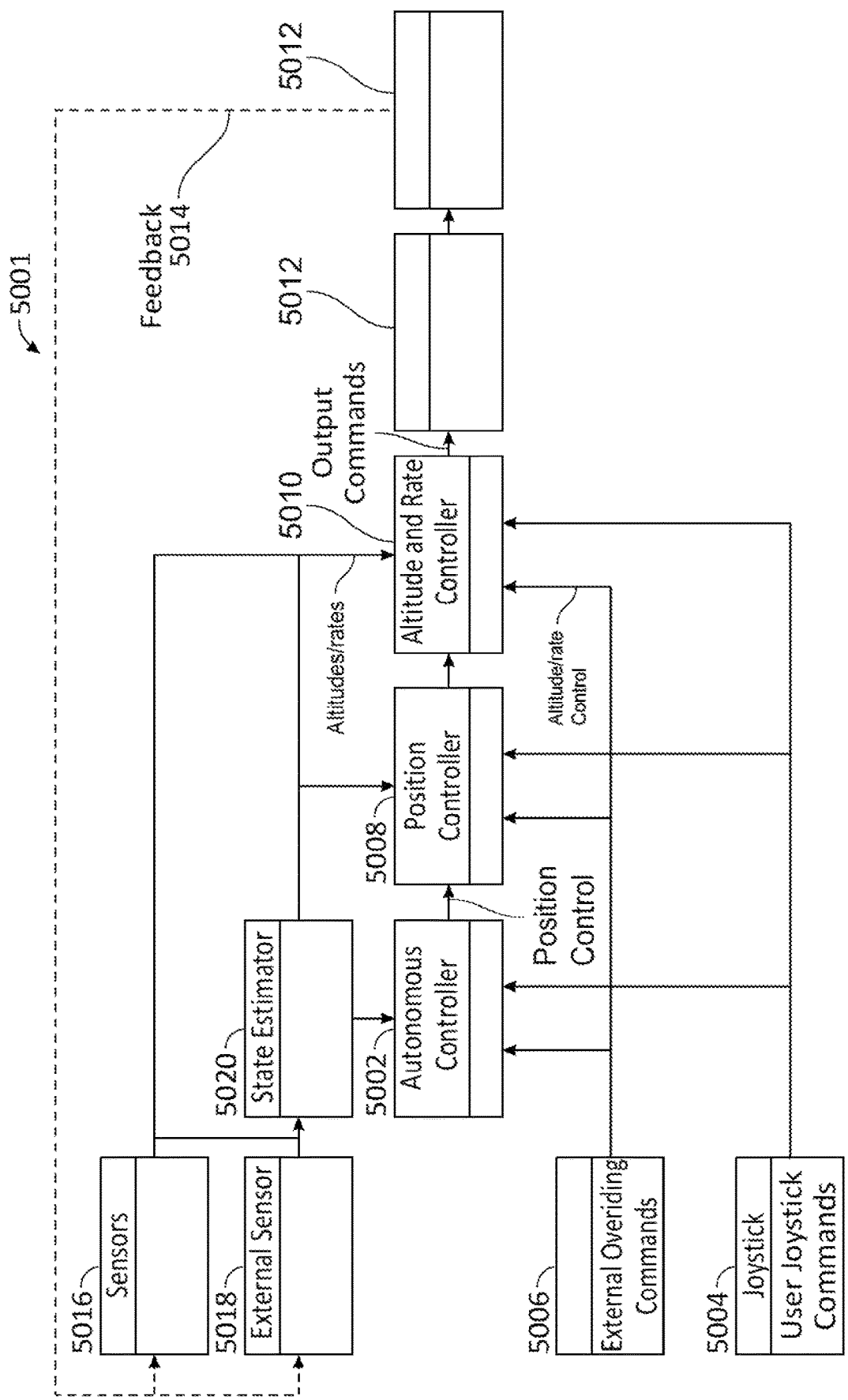
FIGS. 50A-50B illustrates flight control system software modules.
Figure 50B:
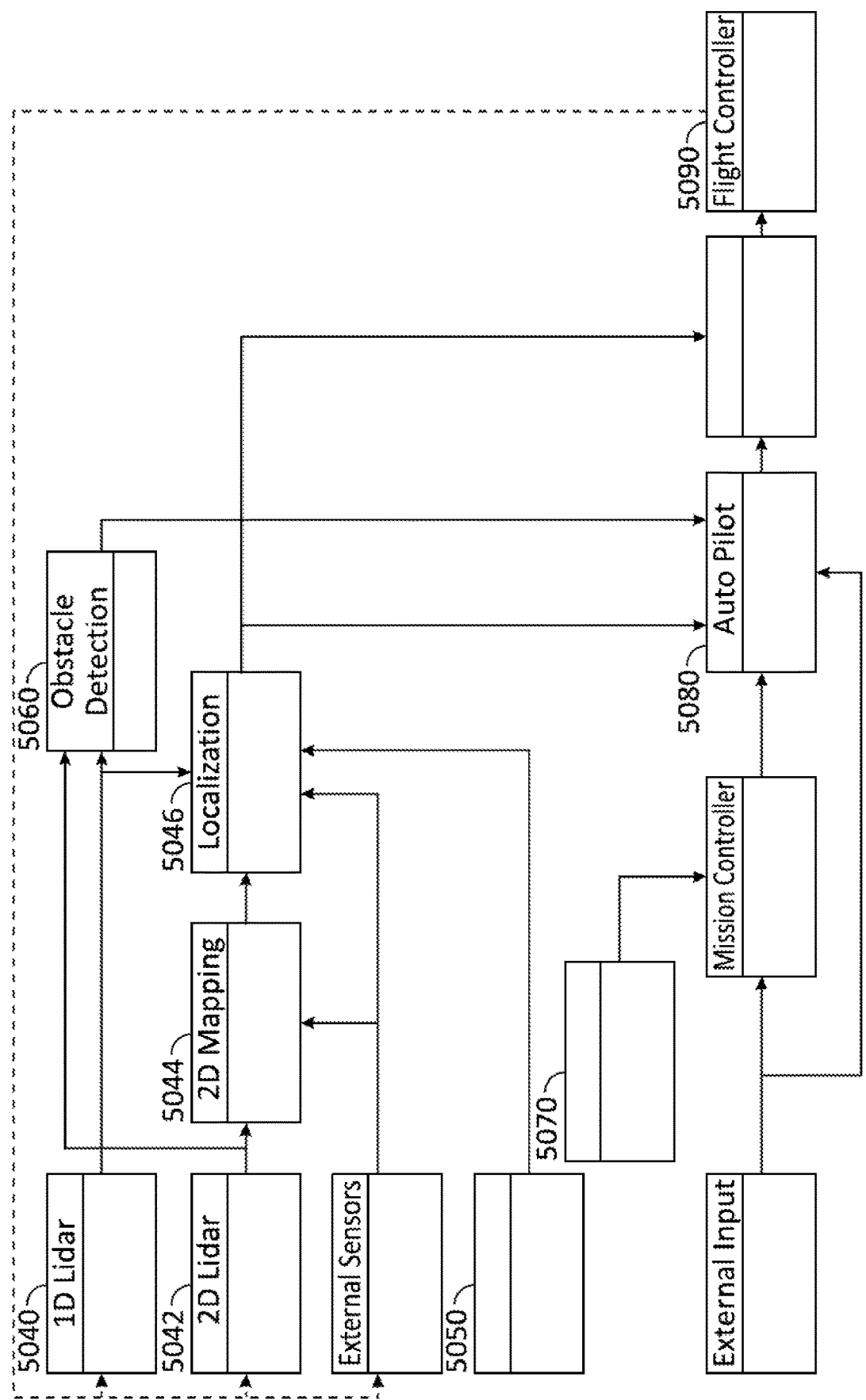

Shown in FIGS. 50A-50B are illustrations of flight controller operations for preferred embodiments. Depicted in FIG. 50A is the autonomous control feedback system 5001 in which controller 5002 receives data from state estimator 5020, external commands 5006 that provide overriding commands such as destination coordinates or preset flight path data, user commands 5004 such as from a joystick. These provide position control data to position control module 5008 which transmits altitude and rate control data to flight control module 5010. Module 5010 generates output commands which are routed at 5012 motor module 2012. Feedback signals 5014 are routed sensor modules 5016, 5018 to reset the state estimate for the next clock cycle.

Shown in FIG. 50B is a further set of processing modules that incorporate 1D Lidar 5040, 2D Lidar 5042 and/or 3D Lidar data to process obstacle detection 5060 and flight path data from mapping and localization modules 5046. Autopilot module 5080 utilizes heat status and external inputs from controller to generate flight control commands for module 5090.

Since certain changes may be made without departing from the scope of the present invention, it is intended that all matter contained in the above description or shown in the accompanying drawings be interpreted as illustrative and not in a literal sense. Practitioners of the art will realize that the sequence of steps and architectures depicted in the figures may be altered without departing from the scope of the present invention and that the illustrations contained herein are singular examples of a multitude of possible depictions of the present invention.

The foregoing description of example embodiments of the invention provides illustration and description, but is not intended to be exhaustive or to limit the invention to the precise form disclosed. Modifications and variations are possible in light of the above teachings or may be acquired from practice of the invention. For example, while a series of acts has been described, the order of the acts may be modified in other implementations consistent with the principles of the invention. Further, non-dependent acts may be performed in parallel and embodiments may be combined or separated in a manner not specifically discussed herein.

The invention claimed is:

1. A system comprising:
an unmanned aerial vehicle having a tether connector;
a bumper device comprising a cage extending around the unmanned aerial vehicle, wherein the cage has an opening, and wherein the tether connector is configured to connect to a tether extending through the opening of the cage;
one or more sensors coupled to the unmanned aerial vehicle and configured to detect sensor data associated with a flight operating space; and
one or more processors configured to control navigation of the unmanned aerial vehicle based on the sensor data.

2. The system of claim 1, wherein the one or more processors are configured to control the navigation by:
causing flight of the unmanned aerial vehicle according to a predetermined mission path; and
autonomously updating the predetermined mission path based on a position of the tether.

3. The system of claim 1, wherein the one or more sensors are configured to detect a signal from a beacon and generate the sensor data based on the signal.

4. The system of claim 1, wherein the one or more processors are onboard the unmanned aerial vehicle and are configured to control the navigation by:
transmitting the sensor data to a base station via the tether, wherein the base station is coupled to a moving vehicle;
receiving flight control data from the base station after transmitting the sensor data; and
controlling the navigation of the unmanned aerial vehicle based on the flight control data.

5. The system of claim 1, further comprising a plurality of motors, wherein each of the plurality of motors is connected to the unmanned aerial vehicle with a strut having a twist angle and a dihedral angle, and wherein controlling the navigation comprises controlling operation of the plurality of motors based on the sensor data.

6. The system of claim 1, wherein the one or more processors are configured to control the navigation by:
determining a position of the unmanned aerial vehicle relative to at least one object within the flight operating space based on the sensor data from the one or more sensors; and
generating, based on the position, a signal to cause the unmanned aerial vehicle to navigate around the at least one object.

7. The system of claim 1, wherein the one or more processors are configured to control the navigation further based on a position of the tether with respect to the unmanned aerial vehicle.

8. The system of claim 7, wherein the one or more processors are configured to monitor the position of the tether with respect to the unmanned aerial vehicle.

9. The system of claim 1, wherein the bumper device further comprises a plurality of spring elements coupled to one or more bumper elements extending around the unmanned aerial vehicle.

10. The system of claim 1, wherein the cage comprises a frame mounted to the unmanned aerial vehicle, and wherein the one or more sensors are mounted to the frame.

11. The system of claim 1, wherein the unmanned aerial vehicle comprises a spooler configured to rotate relative to the unmanned aerial vehicle to dispense the tether, and wherein the one or more processors are further configured to receive inertial measurement data to control dispensing of the tether from the unmanned aerial vehicle.

12. A method comprising:
detecting, by one or more sensors coupled to an unmanned aerial vehicle, sensor data associated with a flight operating space, wherein the unmanned aerial vehicle has a tether connector connected to a tether, and wherein a cage extends around the unmanned aerial vehicle and has an opening through which the tether extends to the tether connector; and
controlling, by one or more processors, navigation of the unmanned aerial vehicle based on the sensor data.

13. The method of claim 12, wherein the controlling the navigation comprises:
causing flight of the unmanned aerial vehicle according to a predetermined mission path; and
autonomously updating the predetermined mission path based on a position of the tether.

14. The method of claim 12, further comprising detecting, by the one or more sensors, a signal from a beacon, wherein the sensor data is further based on the signal.

15. The method of claim 12, wherein the one or more processors are onboard the unmanned aerial vehicle, and wherein the controlling comprises:
- transmitting the sensor data to a base station via the tether, wherein the base station is mounted on a moving vehicle;
- receiving flight control data from the base station after the transmitting; and
- controlling the navigation of the unmanned aerial vehicle based on the flight control data.

16. The method of claim 12, wherein the controlling comprises:
- determining a position of the unmanned aerial vehicle relative to at least one object within the flight operating space based on the sensor data from the one or more sensors; and
- generating, based on the position, a signal to cause the unmanned aerial vehicle to navigate around the at least one object.

17. The method of claim 12, further comprising monitoring, by the one or more processors, a position of the tether, wherein the controlling is further based on the position of the tether.

18. The method of claim 17, wherein the position of the tether includes a position of the tether following a detaching of the tether from the unmanned aerial vehicle.

19. The method of claim 12, wherein a plurality of spring elements is coupled to one or more bumper elements extending around the unmanned aerial vehicle.

20. The method of claim 12, wherein the cage comprises a frame mounted to the unmanned aerial vehicle, and wherein the one or more sensors are mounted to the frame.

\* \* \* \* \*

UNITED STATES PATENT AND TRADEMARK OFFICE
CERTIFICATE OF CORRECTION

| | |
|---|---|
| PATENT NO. | : 11,726,502 B2 |
| APPLICATION NO. | : 17/713196 |
| DATED | : August 15, 2023 |
| INVENTOR(S) | : Samuel A. Johnson et al. |

It is certified that error appears in the above-identified patent and that said Letters Patent is hereby corrected as shown below:

In the Specification

In the Cross-Reference to Related Applications:

In Column 1, Lines 7-8, change "patent application Ser. No." to --Patent Application No.--.

In Column 1, Line 14, change "patent application Ser. No." to --Patent Application No.--.

In Column 1, Lines 20-21, change "patent application Ser. No." to --Patent Application No.--.

In the Detailed Description:

In Column 6, Line 35, change "patent application Ser. No." to --Patent Application No.--.

In Column 17, Lines 46-48, change
"https://dspace.mitedu/bitstream/handle/1721.1/98678/ 920682960-MIT.pdf?sequence=1" to
--https://dspace.mit.edu/bitstream/handle/1721.1/98678/ 920682960-MIT.pdf?sequence=1--.

In Column 22, Lines 1-2, change "patent application Ser. No." to --Patent Application No.--.

In Column 24, Lines 6-7, change "application Ser. No." to --Patent Application No.--.

In Column 27, Line 23, change "$X$" to --$\bar{X}$--.

In Column 30, Line 3, change "aground" to --a ground--.

In Column 36, Line 26, change "Situational awareness map" to --Situational awareness map.--.

Signed and Sealed this
Fourteenth Day of November, 2023

Katherine Kelly Vidal
*Director of the United States Patent and Trademark Office*